United States Patent
Kanemaki et al.

(10) Patent No.: US 6,785,281 B1
(45) Date of Patent: Aug. 31, 2004

(54) METHOD OF TRANSFERRING DATA VIA BYPASS LINE IN CONNECTION-TYPE NETWORK

(75) Inventors: Hideyasu Kanemaki, Kawasaki (JP); Hideki Inoue, Kawasaki (JP); Masaru Murakami, Kawasaki (JP); Ikuo Taoka, Kawasaki (JP); Naoki Yamamoto, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/322,608

(22) Filed: May 28, 1999

(30) Foreign Application Priority Data

Jul. 29, 1998 (JP) .......................................... 10-214182

(51) Int. Cl.[7] .............................................. H04L 12/56
(52) U.S. Cl. ................................... 370/395.1; 370/385
(58) Field of Search .............................. 370/395.1, 389, 370/397, 399, 385

(56) References Cited

U.S. PATENT DOCUMENTS

| | | | |
|---|---|---|---|
| 4,802,220 A | * | 1/1989 | Marker, Jr. .................. 380/33 |
| 5,615,213 A | * | 3/1997 | Griefer ....................... 370/412 |
| 5,699,369 A | * | 12/1997 | Guha ......................... 371/141 |
| 5,818,921 A | * | 10/1998 | Vander Meiden et al. .. 379/225 |
| 5,822,524 A | * | 10/1998 | Chen et al. ............. 395/200.33 |
| 6,125,123 A | * | 9/2000 | Furuno ....................... 370/467 |
| 6,314,104 B1 | * | 11/2001 | Spinner ...................... 370/395 |
| 6,467,091 B1 | * | 10/2002 | Lin et al. .................... 725/126 |

FOREIGN PATENT DOCUMENTS

| | | |
|---|---|---|
| JP | 62-189823 | 8/1987 |
| JP | 5-14410 | 1/1993 |
| JP | 5-22332 | 1/1993 |
| JP | 5-191434 | 7/1993 |
| JP | 7-143181 | 6/1995 |
| JP | 8-102743 | 4/1996 |
| JP | 8-163152 | 6/1996 |
| JP | 9-18515 | 1/1997 |

OTHER PUBLICATIONS

William Stallings, ISDN and Brodband. . . , 1999, Princeton Hall, 4th edition, p.72–76.*

* cited by examiner

*Primary Examiner*—Kenneth Vanderpuye
(74) *Attorney, Agent, or Firm*—Katten Muchin Zavis Rosenman

(57) ABSTRACT

A method of transferring data in a connection-type network in which nodes are connected via communication lines and terminals are connected to the nodes includes the steps of sending a request from a first one of the terminals to a second one of the terminals via a connection established on a first communication line, the request requesting transfer of data from the second one of the terminals to the first one of the terminals via a second communication line, establishing a connection on the second communication line between a first one of the nodes having the first one of the terminals attached thereto and a second one of the nodes having the second one of the terminals attached thereto, and transferring all or part of the data via the connection on the second communication line, wherein the second communication line is established to be in existence for a predetermined duration of time or for a time period during which all or part of the data is transferred.

16 Claims, 74 Drawing Sheets

FIG. 6

| TRANSMITTER SIDE | | | RECEIVER SIDE | | | MID | CELL TRANSFER | | | | CALL TYPE |
|---|---|---|---|---|---|---|---|---|---|---|---|
| ADDRESS | VPI | VCI | ADDRESS | VPI | VCI | | TRANSFER DESTINATION | PORT | VPI | VCI | |
| aaa | VPa1 | VCa1 | bbb | VPb1 | VCb1 | α α α | — | ② | — | — | GENERAL |
| FREE | — | — | FREE | — | — | — | — | — | — | — | — |

FIG. 7

| PORT | TYPE |
|---|---|
| PORT A | ORDINARY COMMUNICATION LINE |
| PORT B | BROADBAND COMMUNICATION LINE |
| ⋮ | ⋮ |
| PORT Z | ORDINARY COMMUNICATION LINE |

FIG. 8

| DTE ADDRESS | AUTHORIZATION TO USE BROADBAND |
|---|---|
| AAA | NO |
| BBB | AUTHORIZED |
| ⋮ | ⋮ |
| ZZZ | NO |

FIG. 10

| ELEMENT | ROUTE OF CHOICE | MID | VPI | VCI |
|---|---|---|---|---|
| CONTENT ELEMENT-1 | ORDINARY COMMUNICATION LINE | — | — | — |
| CONTENT ELEMENT-2 | BROADBAND COMMUNICATION LINE | — | — | — |
| ... | ... | ... | ... | ... |
| CONTENT ELEMENT-Z | ORDINARY COMMUNICATION LINE | — | — | — |

FIG. 12

| TRANSMITTER SIDE | | RECEIVER SIDE | | | CELL TRANSFER | | | | CALL TYPE |
|---|---|---|---|---|---|---|---|---|---|
| ADDRESS | VPI | VCI | ADDRESS | VPI | VCI | TRANSFER DESTINATION | PORT | VPI | VCI | |
| aaa | VPa1 | VCa1 | bbb | — | — | ANOTHER STATION | PORT ② | VPx | VCx | GENERAL |
| FREE | — | — | FREE | — | — | FREE | — | — | — | — |

FIG. 13

| TRANSMITTER SIDE | | | RECEIVER SIDE | | | CELL TRANSFER | | | | CALL TYPE |
|---|---|---|---|---|---|---|---|---|---|---|
| ADDRESS | VPI | VCI | ADDRESS | VPI | VCI | TRANSFER DESTINATION | PORT | VPI | VCI | |
| bbb | VPb1 | VCb1 | aaa | — | — | ANOTHER STATION | PORT ⑤ | VPx | VCx | GENERAL |
| FREE | | | FREE | | | FREE | — | — | — | — |

FIG. 14A

| ELEMENT | ROUTE OF CHOICE | MID | VPI | VCI |
|---|---|---|---|---|
| CONTENT ELEMENT-1 | ORDINARY COMMUNICATION LINE | — | — | — |
| CONTENT ELEMENT-2 | BROADBAND COMMUNICATION LINE | — | — | — |
| CONTENT ELEMENT-3 | ORDINARY COMMUNICATION LINE | — | — | — |

FIG. 14B

| ELEMENT | ROUTE OF CHOICE | MID | VPI | VCI |
|---|---|---|---|---|
| CONTENT ELEMENT-1 | ORDINARY COMMUNICATION LINE | ααα | VPIx | VCIx |
| CONTENT ELEMENT-2 | BROADBAND COMMUNICATION LINE | βββ | VPIy | VCIy |
| CONTENT ELEMENT-3 | ORDINARY COMMUNICATION LINE | γγγ | VPIx | VCIx |

FIG. 15

| PORT | TYPE |
|---|---|
| PORT ④ | BROADBAND COMMUNICATION LINE |
| PORT ⑤ | ORDINARY COMMUNICATION LINE |

FIG. 16A

| TRANSMITTER SIDE | | | RECEIVER SIDE | | | CELL TRANSFER | | | | CALL TYPE |
|---|---|---|---|---|---|---|---|---|---|---|
| ADDRESS | VPI | VCI | ADDRESS | VPI | VCI | TRANSFER DESTINATION | PORT | VPI | VCI | |
| bbb | VPb1 | VCb1 | aaa | — | — | ANOTHER STATION | PORT ⑤ | VPx | VCx | GENERAL |
| FREE | — | — | FREE | — | — | FREE | — | — | — | — |

FIG. 16B

| TRANSMITTER SIDE | | | RECEIVER SIDE | | | CELL TRANSFER | | | | CALL TYPE |
|---|---|---|---|---|---|---|---|---|---|---|
| ADDRESS | VPI | VCI | ADDRESS | VPI | VCI | TRANSFER DESTINATION | PORT | VPI | VCI | |
| bbb | VPb1 | VCb1 | aaa | — | — | ANOTHER STATION | PORT ⑤ | VPx | VCx | GENERAL |
| bbb | VPb1 | VCb2 | aaa | — | — | ANOTHER STATION | PORT ④ | VPy | VCy | SPECIAL |

FIG. 17A

| TRANSMITTER SIDE | | | RECEIVER SIDE | | | CELL TRANSFER | | | CALL TYPE |
|---|---|---|---|---|---|---|---|---|---|
| ADDRESS | VPI | VCI | ADDRESS | VPI | VCI | TRANSFER DESTINATION | PORT | VPI | VCI | |
| aaa | VPa1 | VCa1 | bbb | — | — | ANOTHER STATION | PORT ② | VPx | VCx | GENERAL |
| FREE | — | — | FREE | — | — | FREE | — | — | — | — |

FIG. 17B

| TRANSMITTER SIDE | | | RECEIVER SIDE | | | CELL TRANSFER | | | CALL TYPE |
|---|---|---|---|---|---|---|---|---|---|
| ADDRESS | VPI | VCI | ADDRESS | VPI | VCI | TRANSFER DESTINATION | PORT | VPI | VCI | |
| aaa | VPa1 | VCa1 | bbb | — | — | ANOTHER STATION | PORT ② | VPx | VCx | GENERAL |
| aaa | VPa1 | VCa1 | bbb | — | — | ANOTHER STATION | PORT ③ | VPy | VCy | SPECIAL |

FIG. 18A

| ELEMENT | ROUTE OF CHOICE | MID | VPI | VCI |
|---|---|---|---|---|
| CONTENT ELEMENT-1 | ORDINARY COMMUNICATION LINE | — | — | — |
| CONTENT ELEMENT-2 | BROADBAND COMMUNICATION LINE | α α α | — | — |
| CONTENT ELEMENT-3 | ORDINARY COMMUNICATION LINE | — | — | — |

FIG. 18B

| ELEMENT | ROUTE OF CHOICE | MID | VPI | VCI |
|---|---|---|---|---|
| CONTENT ELEMENT-1 | ORDINARY COMMUNICATION LINE | — | VPIx | VCIx |
| CONTENT ELEMENT-2 | BROADBAND COMMUNICATION LINE | α α α | VPIx | VCIx |
| CONTENT ELEMENT-3 | ORDINARY COMMUNICATION LINE | — | VPIx | VCIx |

FIG. 19

| PORT | TYPE |
|---|---|
| PORT ④ | BROADBAND COMMUNICATION LINE |
| PORT ⑤ | ORDINARY COMMUNICATION LINE |

FIG. 20A

| TRANSMITTER SIDE | | | RECEIVER SIDE | | | MID | CELL TRANSFER | | | | CALL TYPE |
|---|---|---|---|---|---|---|---|---|---|---|---|
| ADDRESS | VPI | VCI | ADDRESS | VPI | VCI | | TRANSFER DESTINATION | PORT | VPI | VCI | |
| FREE | — | — | FREE | — | — | — | — | — | — | — | GENERAL |
| FREE | — | — | FREE | — | — | — | — | — | — | — | GENERAL |
| FREE | — | — | FREE | — | — | α α α | — | — | — | — | SPECIAL |

FIG. 20B

| TRANSMITTER SIDE | | | RECEIVER SIDE | | | MID | CELL TRANSFER | | | | CALL TYPE |
|---|---|---|---|---|---|---|---|---|---|---|---|
| ADDRESS | VPI | VCI | ADDRESS | VPI | VCI | | TRANSFER DESTINATION | PORT | VPI | VCI | |
| aaa | — | — | bbb | VPa1 | VCa1 | — | ANOTHER STATION | PORT ⑤ | VPx | VCx | GENERAL |
| FREE | — | — | FREE | — | — | — | — | — | — | — | GENERAL |
| bbb | VPa1 | VCa1 | aaa | — | — | α α α | ANOTHER STATION | PORT ④ | VPy | VCy | SPECIAL |

FIG. 21A

| TRANSMITTER SIDE | | | RECEIVER SIDE | | | MID | CELL TRANSFER | | | | CALL TYPE |
|---|---|---|---|---|---|---|---|---|---|---|---|
| ADDRESS | VPI | VCI | ADDRESS | VPI | VCI | | TRANSFER DESTINATION | PORT | VPI | VCI | |
| FREE | — | — | FREE | — | — | — | — | — | — | — | GENERAL |
| FREE | — | — | FREE | — | — | — | — | — | — | — | GENERAL |
| FREE | — | — | FREE | — | — | ααα | — | — | — | — | SPECIAL |

FIG. 21B

| TRANSMITTER SIDE | | | RECEIVER SIDE | | | MID | CELL TRANSFER | | | | CALL TYPE |
|---|---|---|---|---|---|---|---|---|---|---|---|
| ADDRESS | VPI | VCI | ADDRESS | VPI | VCI | | TRANSFER DESTINATION | PORT | VPI | VCI | |
| aaa | VPa1 | VCa1 | bbb | — | — | — | ANOTHER STATION | PORT⑤ | VPx | VCx | GENERAL |
| FREE | — | — | FREE | — | — | — | — | — | — | — | GENERAL |
| bbb | VPa1 | VCa1 | aaa | — | — | ααα | ANOTHER STATION | PORT④ | VPy | VCy | SPECIAL |

FIG. 22

| PORT | TYPE |
|---|---|
| PORT③ | BROADBAND COMMUNICATION LINE |
| PORT② | ORDINARY COMMUNICATION LINE |

FIG. 23A

| TRANSMITTER SIDE | | | RECEIVER SIDE | | | CELL TRANSFER | | | | CALL TYPE |
|---|---|---|---|---|---|---|---|---|---|---|
| ADDRESS | VPI | VCI | ADDRESS | VPI | VCI | TRANSFER DESTINATION | PORT | VPI | VCI | |
| bbb | VPb1 | VCb1 | aaa | — | — | ANOTHER STATION | PORT⑤ | VPx | VCx | GENERAL |
| FREE | — | — | FREE | — | — | FREE | — | — | — | — |

FIG. 23B

| TRANSMITTER SIDE | | | RECEIVER SIDE | | | CELL TRANSFER | | | | CALL TYPE |
|---|---|---|---|---|---|---|---|---|---|---|
| ADDRESS | VPI | VCI | ADDRESS | VPI | VCI | TRANSFER DESTINATION | PORT | VPI | VCI | |
| bbb | VPb1 | VCb1 | aaa | — | — | ANOTHER STATION | PORT⑤ | VPx | VCx | GENERAL |
| bbb | VPb1 | VCb1 | aaa | — | — | ANOTHER STATION | PORT④ | VPy | VCy | SPECIAL |

FIG. 24A

| TRANSMITTER SIDE | | RECEIVER SIDE | | | CELL TRANSFER | | | | CALL TYPE |
|---|---|---|---|---|---|---|---|---|---|
| ADDRESS | VCI | | ADDRESS | VPI | VCI | TRANSFER DESTINATION | PORT | VPI | VCI | |
| aaa | VPa1 | VCa1 | bbb | — | — | ANOTHER STATION | PORT② | VPx | VCx | GENERAL |
| FREE | — | — | FREE | — | — | FREE | — | — | — | — |

FIG. 24B

| TRANSMITTER SIDE | | | RECEIVER SIDE | | | CELL TRANSFER | | | | CALL TYPE |
|---|---|---|---|---|---|---|---|---|---|---|
| ADDRESS | VPI | VCI | ADDRESS | VPI | VCI | TRANSFER DESTINATION | PORT | VPI | VCI | |
| aaa | VPa1 | VCa1 | bbb | — | — | ANOTHER STATION | PORT② | VPx | VCx | GENERAL |
| aaa | VPa1 | VCa1 | bbb | — | — | ANOTHER STATION | PORT③ | VPy | VCy | SPECIAL |

FIG. 25A

| DTE ADDRESS | AUTHORIZATION TO USE BROADBAND |
|---|---|
| AAA | NO |
| BBB | NO |
| ⋮ | ⋮ |
| ZZZ | NO |

FIG. 25B

| DTE ADDRESS | AUTHORIZATION TO USE BROADBAND |
|---|---|
| AAA | NO |
| BBB | AUTHORIZED |
| ⋮ | ⋮ |
| ZZZ | NO |

FIG. 26A

| ELEMENT | ROUTE OF CHOICE | VPI/VCI | MID |
|---|---|---|---|
| CONTENT ELEMENT-1 | ORDINARY COMMUNICATION LINE | | |
| CONTENT ELEMENT-2 | BROADBAND COMMUNICATION LINE | | |
| CONTENT ELEMENT-3 | ORDINARY COMMUNICATION LINE | | |

FIG. 26B

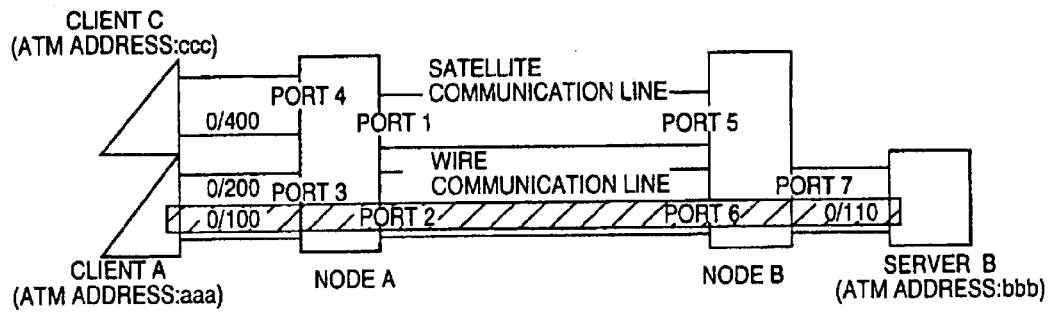

FIG. 26C

| | SOURCE ADDRESS | VPI/VCI | DESTINATION ADDRESS | VPI/VCI | TRANSFER DESTINATION | TRANSFER PORT | VPI/VCI | CALL TYPE |
|---|---|---|---|---|---|---|---|---|
| ① | aaa | 0/100 | bbb | — | ANOTHER STATION | PORT 2 | 1/100 | GENERAL |
| ② | aaa | 0/200 | ccc | 0/400 | — | PORT 4 | — | GENERAL |
| ③ | FREE | — | FREE | — | — | — | — | — |

FIG. 26D

| | SOURCE ADDRESS | VPI/VCI | DESTINATION ADDRESS | VPI/VCI | TRANSFER DESTINATION | TRANSFER PORT | VPI/VCI | CALL TYPE |
|---|---|---|---|---|---|---|---|---|
| ① | bbb | 0/110 | aaa | — | ANOTHER STATION | PORT 6 | 1/100 | GENERAL |
| ② | FREE | — | FREE | — | FREE | — | — | — |

FIG. 31

| PORT | TYPE |
|---|---|
| PORT 5 | SATELLITE COMMUNICATION LINE |
| PORT 6 | WIRE COMMUNICATION LINE |

FIG. 32

| | ADDRESS | VPI/VCI | DESTINATION ADDRESS | VPI/VCI | TRANSFER DESTINATION | TRANSFER PORT | VPI/VCI | CALL TYPE |
|---|---|---|---|---|---|---|---|---|
| ① | bbb | 0/110 | aaa | — | ANOTHER STATION | PORT 6 | 1/100 | GENERAL |
| ② | bbb | 0/210 | aaa | — | ANOTHER STATION | PORT 5 | 1/200 | SPECIAL |

FIG. 34

| | SOURCE ADDRESS | VPI/VCI | DESTINATION ADDRESS | VPI/VCI | TRANSFER PORT | VPI/VCI | CALL TYPE |
|---|---|---|---|---|---|---|---|
| ① | aaa | 0/100 | bbb | — | PORT 2 | 1/100 | GENERAL |
| ② | aaa | 0/200 | ccc | 0/400 | PORT 4 | — | GENERAL |
| ③ | aaa | 0/100 | bbb | — | PORT 1 | 1/200 | SPECIAL |

FIG. 36

| ELEMENT | ROUTE OF CHOICE | VPI/VCI | MID |
|---|---|---|---|
| CONTENT ELEMENT-1 | ORDINARY COMMUNICATION LINE | 0/110 | 002 |
| CONTENT ELEMENT-2 | SATELLITE COMMUNICATION LINE | 0/210 | 001 |
| CONTENT ELEMENT-3 | ORDINARY COMMUNICATION LINE | 0/110 | 003 |

FIG. 37

| | SOURCE ADDRESS | VPI/VCI | DESTINATION ADDRESS | VPI/VCI | TRANSFER PORT | VPI/VCI | CALL TYPE |
|---|---|---|---|---|---|---|---|
| ① | aaa | 0/110 | bbb | — | PORT 2 | 1/100 | GENERAL |
| ② | aaa | 0/200 | ccc | 0/400 | PORT 4 | — | GENERAL |
| ③ | bbb | — | aaa | 0/100 | PORT 1 | 1/200 | SPECIAL |

FIG. 40A

| ELEMENT | ROUTE OF CHOICE | MID | VPI/VCI |
|---|---|---|---|
| CONTENT ELEMENT-1 | ORDINARY COMMUNICATION LINE | — | — |
| CONTENT ELEMENT-2 | SATELLITE COMMUNICATION LINE | 001 | — |
| CONTENT ELEMENT-3 | ORDINARY COMMUNICATION LINE | — | — |

FIG. 40B

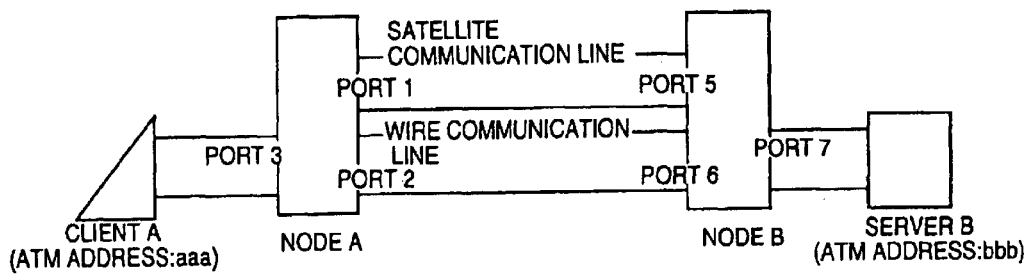

FIG. 40C

| | SOURCE ADDRESS | VPI/VCI | DESTINATION ADDRESS | VPI/VCI | MID | TRANSFER DESTINATION | TRANSFER PORT | VPI/VCI | CALL TYPE |
|---|---|---|---|---|---|---|---|---|---|
| ① | FREE | — | FREE | — | — | — | — | — | — |
| ② | FREE | — | FREE | — | — | — | — | — | — |
| ③ | FREE | — | FREE | — | — | — | — | — | — |
| ④ | FREE | — | FREE | — | 001 | — | — | — | SPECIAL |

FIG. 40D

| | SOURCE ADDRESS | VPI/VCI | DESTINATION ADDRESS | VPI/VCI | MID | TRANSFER DESTINATION | TRANSFER PORT | VPI/VCI | CALL TYPE |
|---|---|---|---|---|---|---|---|---|---|
| ① | FREE | — | FREE | — | — | — | — | — | — |
| ② | FREE | — | FREE | — | — | — | — | — | — |
| ③ | FREE | — | FREE | — | 001 | — | — | — | SPECIAL |

FIG. 43

| | SOURCE ADDRESS | VPI/VCI | DESTINATION ADDRESS | VPI/VCI | MID | TRANSFER DESTINATION | TRANSFER PORT | VPI/VCI | CALL TYPE |
|---|---|---|---|---|---|---|---|---|---|
| ① | aaa | 0/100 | bbb | — | — | ANOTHER STATION | PORT 2 | 1/100 | GENERAL |
| ② | FREE | — | FREE | — | — | — | — | — | — |
| ③ | FREE | — | FREE | — | — | — | — | — | — |
| ④ | FREE | — | FREE | — | 001 | — | — | — | SPECIAL |

FIG. 45

| PORT | TYPE |
|---|---|
| PORT 5 | SATELLITE COMMUNICATION LINE |
| PORT 6 | WIRE COMMUNICATION LINE |

FIG. 46

| | ADDRESS | VPI/VCI | DESTINATION ADDRESS | VPI/VCI | MID | TRANSFER DESTINATION | TRANSFER PORT | VPI/VCI | CALL TYPE |
|---|---|---|---|---|---|---|---|---|---|
| ① | aaa | — | bbb | 0/110 | — | ANOTHER STATION | PORT 6 | 0/100 | GENERAL |
| ② | FREE | — | FREE | — | — | — | — | — | — |
| ③ | bbb | 0/110 | aaa | — | 001 | ANOTHER STATION | PORT 5 | 0/200 | SPECIAL |

FIG. 48

| | ADDRESS | VPI/VCI | DESTINATION ADDRESS | VPI/VCI | MID | TRANSFER DESTINATION | TRANSFER PORT | VPI/VCI | CALL TYPE |
|---|---|---|---|---|---|---|---|---|---|
| ① | aaa | 0/100 | bbb | — | — | ANOTHER STATION | PORT 2 | 0/100 | GENERAL |
| ② | FREE | — | FREE | — | — | — | — | — | — |
| ③ | FREE | — | FREE | — | — | — | — | — | — |
| ④ | aaa | 0/100 | bbb | — | 001 | ANOTHER STATION | PORT 1 | 0/200 | SPECIAL |

FIG. 50

| ELEMENT | ROUTE OF CHOICE | MID | VPI/VCI |
|---|---|---|---|
| CONTENT ELEMENT-1 | ORDINARY COMMUNICATION LINE | — | 0/110 |
| CONTENT ELEMENT-2 | SATELLITE COMMUNICATION LINE | 001 | 0/110 |
| CONTENT ELEMENT-3 | ORDINARY COMMUNICATION LINE | — | 0/110 |

FIG. 58

| PORT | TYPE |
|---|---|
| PORT 1 | SATELLITE COMMUNICATION LINE |
| PORT 2 | WIRE COMMUNICATION LINE |

FIG. 59

| | SOURCE ADDRESS | VPI/VCI | DESTINATION ADDRESS | VPI/VCI | TRANSFER PORT | VPI/VCI | CALL TYPE |
|---|---|---|---|---|---|---|---|
| ① | aaa | 0/110 | bbb | — | PORT 2 | 1/100 | GENERAL |
| ② | aaa | 0/200 | ccc | 0/400 | PORT 4 | — | GENERAL |
| ③ | aaa | 0/100 | bbb | — | PORT 1 | 1/200 | SPECIAL |

FIG. 61

| | ADDRESS | VPI/VCI | DESTINATION ADDRESS | VPI/VCI | TRANSFER DESTINATION | TRANSFER PORT | VPI/VCI | CALL TYPE |
|---|---|---|---|---|---|---|---|---|
| ① | bbb | 0/110 | aaa | — | ANOTHER STATION | PORT 6 | 1/100 | GENERAL |
| ② | bbb | 0/110 | aaa | — | ANOTHER STATION | PORT 5 | 1/200 | SPECIAL |

FIG. 65

| | SOURCE ADDRESS | VPI/VCI | DESTINATION ADDRESS | VPI/VCI | TRANSFER PORT | VPI/VCI | CALL TYPE |
|---|---|---|---|---|---|---|---|
| ① | aaa | 0/110 | bbb | — | PORT 2 | 1/100 | GENERAL |
| ② | aaa | 0/200 | ccc | 0/400 | PORT 4 | — | GENERAL |
| ③ | FREE | FREE | FREE | | | | SPECIAL |

FIG. 67

| | ADDRESS | VPI/VCI | DESTINATION ADDRESS | VPI/VCI | TRANSFER DESTINATION | TRANSFER PORT | VPI/VCI | CALL TYPE |
|---|---|---|---|---|---|---|---|---|
| ① | bbb | 0/110 | aaa | — | ANOTHER STATION | PORT 6 | 1/100 | GENERAL |
| ② | bbb | FREE | FREE | | | | | SPECIAL |

FIG. 68

| DTE ADDRESS | AUTHORIZATION TO USE BROADBAND |
|---|---|
| aaa | NO |
| bbb | NO |
| ccc | NO |
| ddd | NO |

FIG. 69

| DTE ADDRESS | AUTHORIZATION TO USE BROADBAND |
|---|---|
| aaa | AUTHORIZED |
| bbb | NO |
| ccc | NO |
| ddd | NO |

METHOD OF TRANSFERRING DATA VIA BYPASS LINE IN CONNECTION-TYPE NETWORK

BACKGROUND OF THE INVENTION

1. Field of the Invention

The present invention relates to a connection-type communication scheme as well as terminals and nodes used in such a connection-type communication scheme.

2. Description of the Related Art

As functions of a WWW (world-wide web) become ever more sophisticated, all sorts of information such as pictures, moving images, animations, audio data, music, etc., are exchanged through the Internet. Also, there are increases in broadcasting services based on one-to-many communications or downloading services allowing large-volume contents such as a new version of a software product to be downloaded via the Internet.

FIG. 1 is an illustrative drawing for explaining the Internet.

As shown in FIG. 1, when a client 1 in a country A requests a server 2 in a country B to transfer large-volume contents, intervening providers 3 and 4 in countries A and B, respectively, will have many communication lines thereof to be occupied by the transfer of these contents. This affects other communications.

In order to avoid this problem, satellite communication lines having a large capacity are employed to provide downlinks for the Internet. This reduces the load on the surface-system backbone, and, also, has been an effective force to facilitate new services for providing new types of large-volume contents.

FIG. 2 is an illustrative drawing showing use of a satellite communication line as a backbone between providers.

As shown in FIG. 2, data is transmitted from the country A to the country B via a surface communication line whereas data from the country B to the country A goes through the satellite communication line. Such routing is set in the provider's routers. When a request for transfer of large-volume contents is sent from the country A to the server of the country B via the surface communication line, the requested contents are transferred to the provider of the country A via the satellite communication line. Accordingly, the surface communication lines between the provider 3 and the provider 4 are not affected in any manner by the transfer of large-volume contents.

FIG. 3 is an illustrative drawing showing use of a satellite communication line for connecting a provider to a client.

As shown in FIG. 3, a satellite communication line may be used for connecting a provider directly to a user. In this example, the provider's routers are set such that data from the country A to the country B is sent via a surface communication line, and data from the country B to the country A is transferred via the satellite communication line. When a request for transfer of large-volume contents is sent from the country A to the server of the country B via the surface communication line, the requested contents are transferred directly to the client 1 in the country A via the satellite communication line. Accordingly, the surface communication lines between the provider 3 and the provider 4 are not affected in any manner by the transfer of large-volume contents.

ATM (asynchronous transfer mode) networks are used for providing large capacity communication lines.

When the provider's routers are set such as to send data from the country B to the country A via a satellite communication line as shown in FIG. 2, small-volume contents, which need not be transferred via the satellite communication, ends up being transferred also via the satellite communication line. Such squandering use results in a shortage of communication capacities, which could have been used for large-volume data that are worth sending via a satellite communication line. Also, such squandering use results in limiting the number of users who can use such a service.

The configuration in which a provider is directly connected to the user via satellite communication as shown in FIG. 3 requires equipment for using a broadband communication line to be installed on the user side. Such equipment may be a parabola antenna or the like in the case of satellite communication. This increases the costs that the user has to bear.

FIG. 4 is an illustrative drawing showing a configuration which employs an ATM network in place of Internet providers.

As shown in FIG. 4, it will be likely in the future that a connection-type network such as an ATM network provides large-capacity lines in place of the Internet providers for the purpose of exchanging multimedia contents. Even in such a configuration, the same problems as described above will be observed.

Accordingly, there is a need for a connection-type network such as an ATM network which can make efficient use of bypass lines, and can save a user from the burden of excessive investment in equipment.

SUMMARY OF THE INVENTION

Accordingly, it is a general object of the present invention to provide a connection-type network scheme which can satisfy the need described above.

It is another and more specific object of the present invention to provide a connection-type network scheme which can make efficient use of bypass lines, and can save a user from the burden of excessive investment in equipment.

In order to achieve the above objects according to the present invention, a method of transferring data in a connection-type network in which nodes are connected via communication lines and terminals are connected to the nodes includes the steps of sending a request from a first one of the terminals to a second one of the terminals via a connection established on a first communication line, the request requesting transfer of data from the second one of the terminals to the first one of the terminals via a second communication line, establishing a connection on the second communication line between a first one of the nodes having the first one of the terminals attached thereto and a second one of the nodes having the second one of the terminals attached thereto, and transferring all or part of the data via the connection on the second communication line, wherein the second communication line is established to be in existence for a predetermined duration of time or for a time period during which said all or part of the data is transferred.

In this manner, data having a large size can be transferred via a broadband communication line without using the existing ordinary communication line in the connection-type network such as an ATM network, an ISDN network, a frame-relay network, etc. This achieves efficient use of a bypass line, and can save a user from the burden of excessive investment in equipment.

According to one aspect of the present invention, a terminal used in a connection-type network in which nodes are connected via communication lines and terminals are connected to the nodes includes a CPU, a memory storing a program therein for controlling said CPU, and an input/output unit, wherein said program comprises means for receiving a request from another terminal via an existing connection on a first communication line, the request requesting transfer of data to said another terminal via a second communication line, means for sending a message to a node connected to said input/output unit in response to the request, the message requesting for establishment of a connection on the second communication line between the node and one of the nodes connected to said another terminal, and means for transferring all or part of the data via the connection on the second communication line.

The terminal described above is suitable for use in the connection-type network according to the present invention, which achieves efficient use of a bypass line, and saves a user from the burden of excessive investment in equipment.

According to another aspect of the present invention, a node used in a connection-type network in which nodes are connected via communication lines and terminals are connected to the nodes includes a CPU, a memory storing a program therein for controlling said CPU, and a plurality of ports for providing connections, wherein said program comprises means for receiving an establishment message requesting establishment of a connection on a second communication line in addition to a connection on a first communication line already in existence between said node and another one of the nodes, and means for establishing the connection on the second communication line between said node and said another one of the nodes by using the second communication line.

The node described above is suitable for use in the connection-type network according to the present invention, which achieves efficient use of a bypass line, and saves a user from the burden of excessive investment in equipment.

Other objects and further features of the present invention will be apparent from the following detailed description when read in conjunction with the accompanying drawings.

BRIEF DESCRIPTION OF THE DRAWINGS

FIG. 6 is an illustrative drawing showing a configuration of a call-control table;

FIG. 7 is an illustrative drawing showing a configuration of a transit-line-type table;

FIG. 8 is an illustrative drawing showing a configuration of a broadband-communication-line-service-authorization table;

FIG. 10 is an illustrative drawing showing a configuration of a route-determination table;

FIG. 12 is an illustrative drawing showing a configuration of a call-control table of a node A with respect to terminals DTE-a and DTE-b;

FIG. 13 is an illustrative drawing showing a configuration of a call-control table of a node B with respect to terminals DTE-a and DTE-b;

FIGS. 14A and 14B are illustrative drawings showing how a route-determination table is created;

FIG. 15 is an illustrative drawing showing a configuration of a transit-line-type table;

FIGS. 16A and 16B are illustrative drawings showing the way the call-control table is updated with new connection information;

FIGS. 17A and 17B are illustrative drawings showing the way the call-control table is updated with new connection information;

FIGS. 18A and 18B are illustrative drawings showing the route-determination table;

FIG. 19 is an illustrative drawing showing a configuration of the transit-line-type table relating to the terminal DTE-a;

FIGS. 20A and 20B are illustrative drawings showing a call-control table;

FIGS. 21A and 21B are illustrative drawings showing a call-control table;

FIG. 22 is an illustrative drawing showing a configuration of a transit-line-type table;

FIGS. 23A and 23B are illustrative drawings showing a call-control table;

FIGS. 24A and 24B are illustrative drawings showing a call-control table;

FIGS. 25A and 25B are illustrative drawings showing a configuration of a service-authorization table;

FIGS. 26A through 26D are illustrative drawings showing requirements of a first embodiment;

FIG. 31 is an illustrative drawing showing a transit-line-type table;

FIG. 32 is an illustrative drawing showing a call-control table;

FIG. 34 is an illustrative drawing showing a call-control table;

FIG. 36 is an illustrative drawing showing a route-determination table;

FIG. 37 is an illustrative drawing showing a call-control table;

FIGS. 40A through 40D are illustrative drawings showing requirements of a second embodiment;

FIG. 43 is an illustrative drawing showing a configuration of a call-control table;

FIG. 45 is an illustrative drawing showing a transit-line-type table;

FIG. 46 is an illustrative drawing showing a call-control table;

FIG. 48 is an illustrative drawing showing a call-control table;

FIG. 50 is an illustrative drawing showing a route-determination table;

FIG. 58 is an illustrative drawing showing a transit-line-type table;

FIG. 59 is an illustrative drawing showing a call-control table;

FIG. 61 is an illustrative drawing showing a call-control table;

FIG. 65 is an illustrative drawing of a call-control table;

FIG. 67 is an illustrative drawing of a call-control table;

FIG. 68 is an illustrative drawing showing a broadband-communication-line-service-authorization table;

FIG. 69 is an illustrative drawing showing a broadband-communication-line-service-authorization table after a change is made;

DESCRIPTION OF THE PREFERRED EMBODIMENTS

In the following, embodiments of the present invention will be described with reference to the accompanying drawings.

Configuration of ATM Switch

Figure 1:
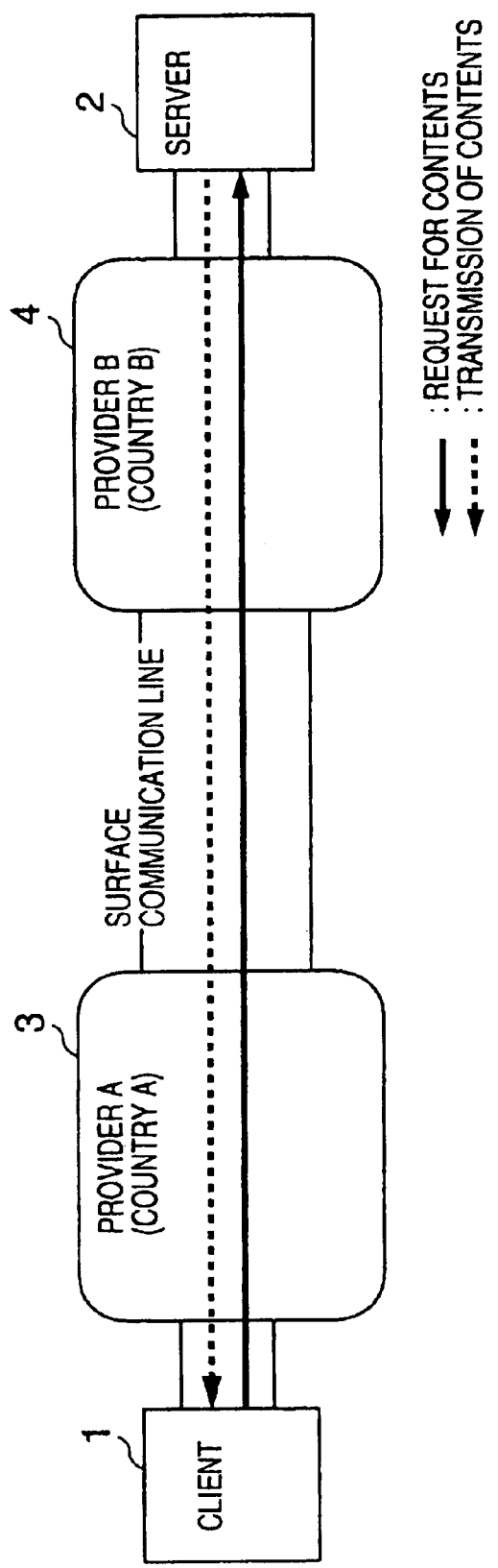
FIG. 1 is an illustrative drawing for explaining the Internet.
Figure 2:
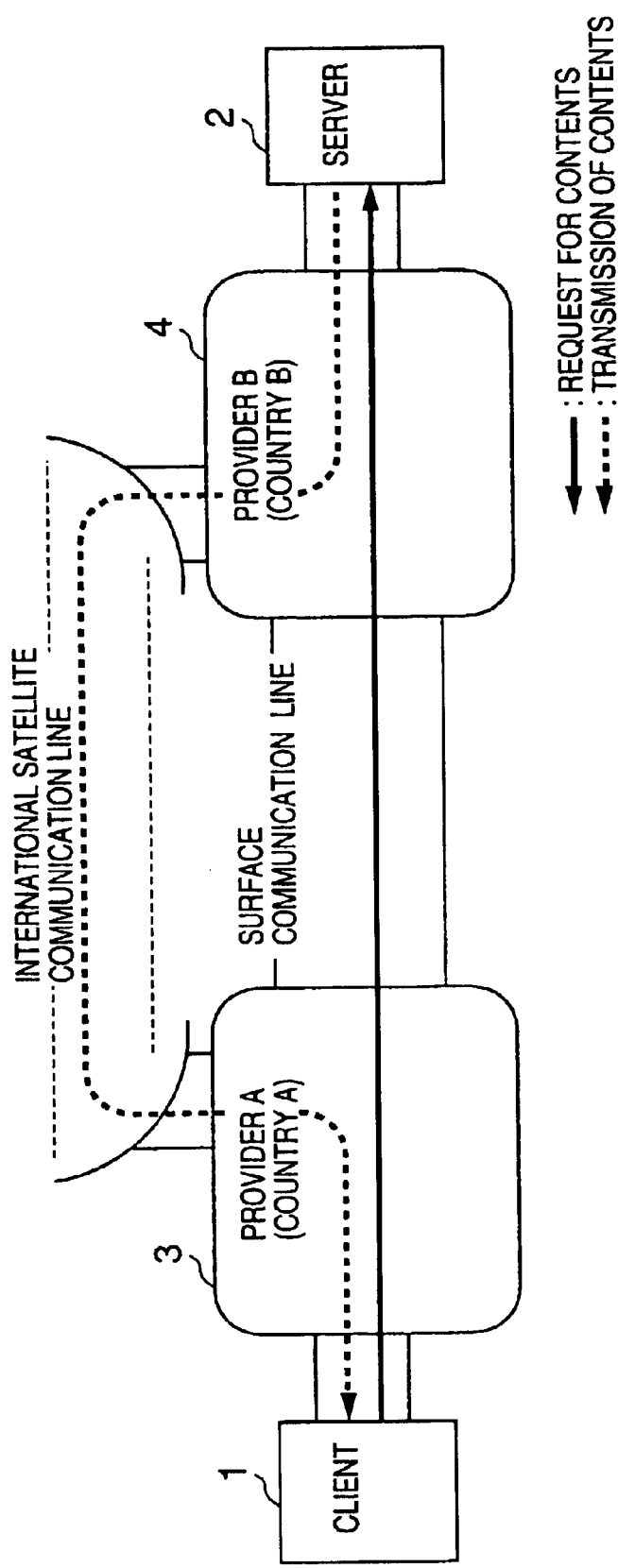
FIG. 2 is an illustrative drawing showing use of a satellite communication line as a backbone between providers.
Figure 3:
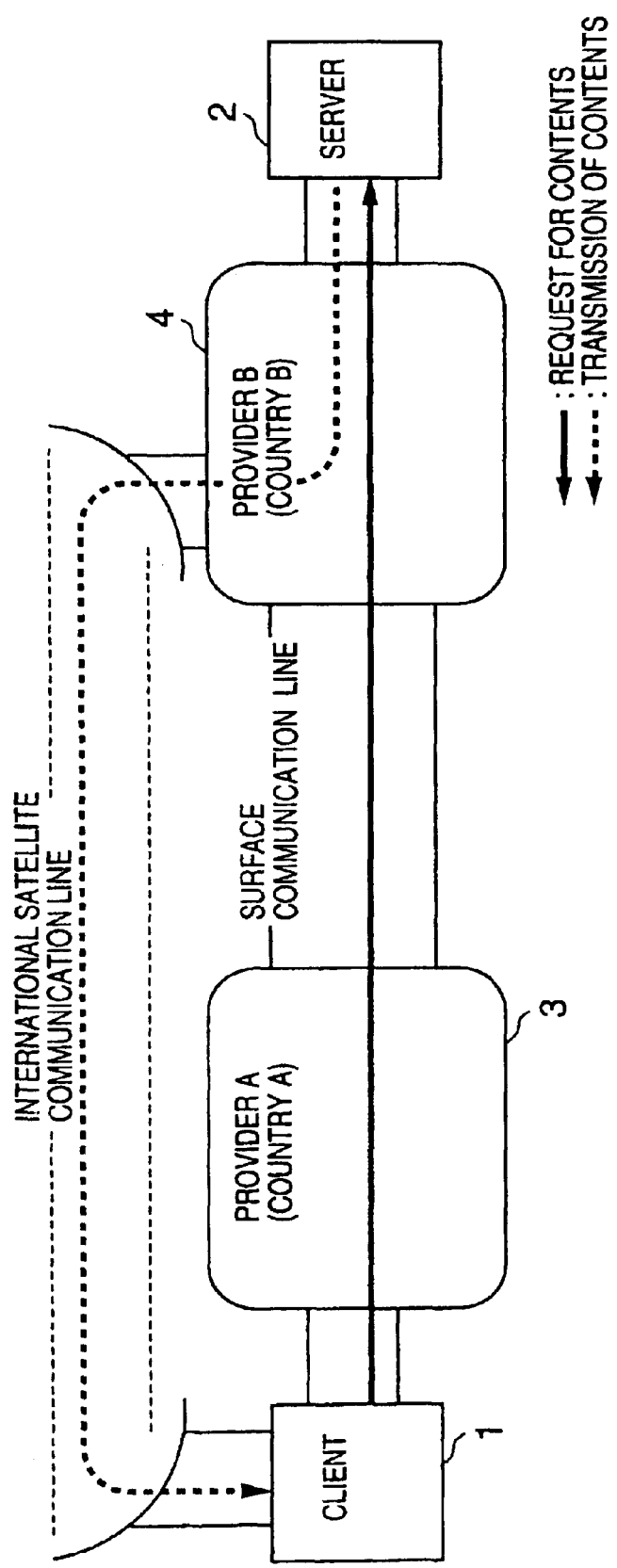
FIG. 3 is an illustrative drawing showing use of a satellite communication line for connecting a provider to a client.
Figure 4:
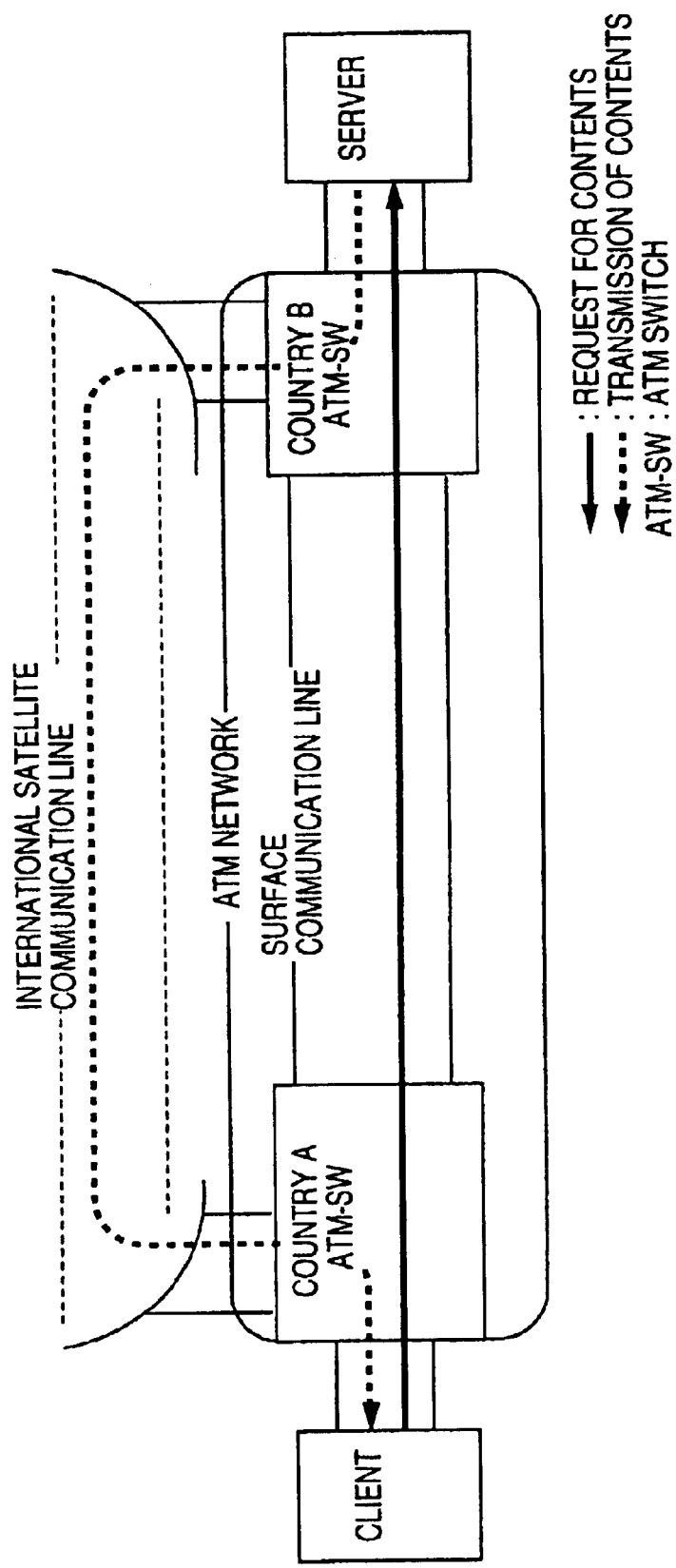
FIG. 4 is an illustrative drawing showing a configuration which employs an ATM network in place of Internet providers.
Figure 5:
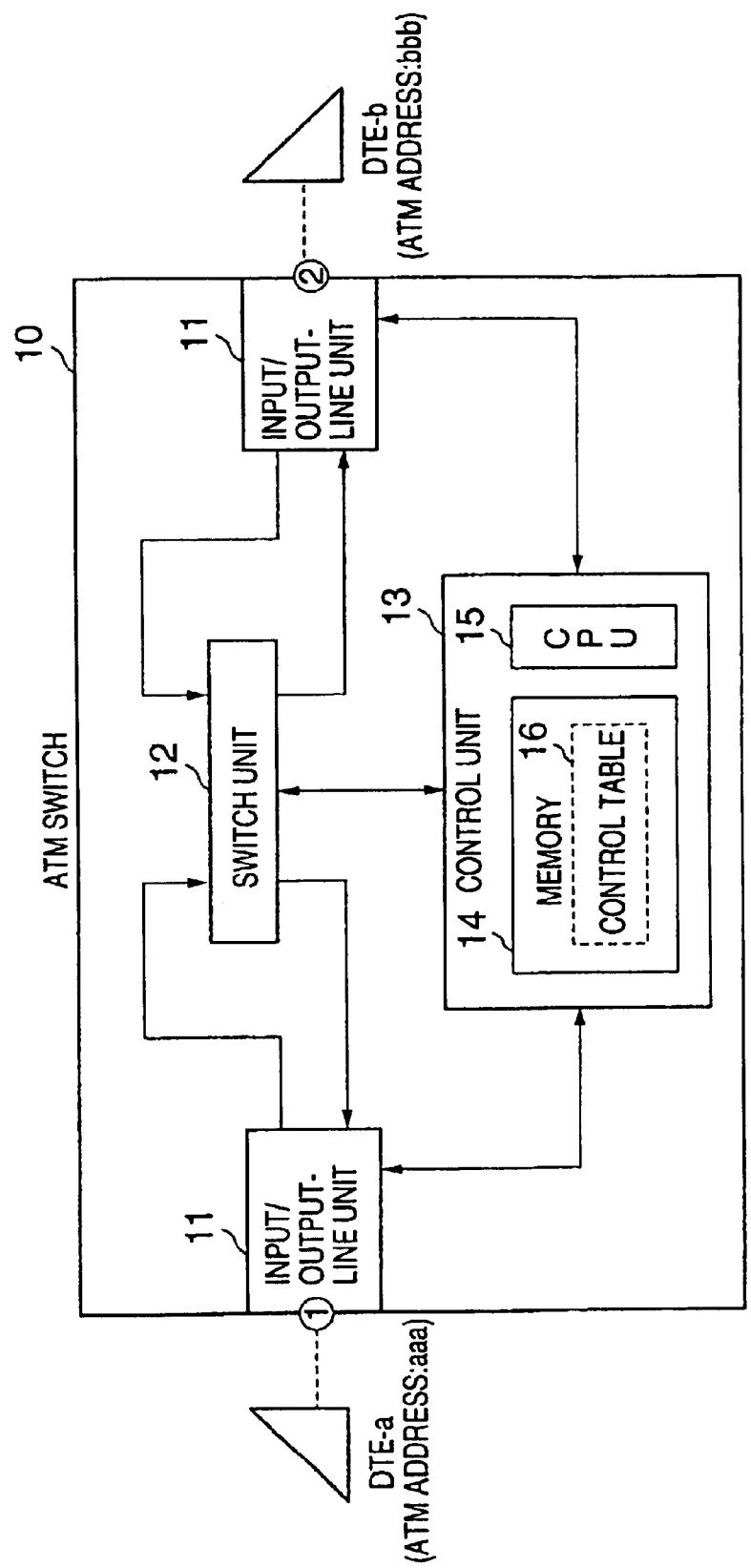
FIG. 5 is a block diagram of an ATM switch according to the present invention.

FIG. 5 is a block diagram of an ATM switch according to the present invention.

The ATM switch 10 connects between a terminal DTE-a and a terminal DTE-b. The terminal DTE-a, the terminal DTE-b, and the ATM switch 10 operate according to ATM protocols. The ATM switch 10 includes an ATM switch 10, input/output-line units 11, a switch unit 12, and a control unit 13.

An input/output-line unit 11 inputs/outputs ATM cells, and attaches an input-port number to ATM cells before sending them to the control unit 13. The switch unit 12 identifies VPI (virtual path identifier)/VCI (virtual channel identifier) provided at the beginning of an ATM cell, and, also, identifies an input-port number attached thereto when the ATM cell is received from the input/output-line unit 11. The switch unit 12 forwards the ATM cell to an appropriate input/output-line unit 11. Further, based on an instruction from the control unit 13, the switch unit 12 can change a destination of the received ATM cell wherein the destination is dependent on the VPI/VCI and the input-port number of the ATM cell. Changing of a destination is referred to as connection control. The control unit 13 includes a memory 14 and a CPU 15. The control unit 13 makes settings to the switch unit 12 with regard to the connection control thereof based on a control table 16 stored in the memory 14. The connection control of the switch unit 12 is set in accordance with the contents of received ATM cells having an input-port number attached thereto. The memory 14 is made up from a magnetic disk, a semiconductor memory, or the like, and stores the control table 16. The CPU 15 sends instructions to the switch unit 12 by consulting the control table 16.

The control table 16 includes a call-control table, a transit-line-type table, and a broadband-communication-line-service-authorization table.

The call-control table is created by the control unit 13, and stores matched pairs of a source VPI/VCI and a destination VPI/VCI. The call-control table also stores an MID (multiplexing identification) of an AAL4 (ATM adaptation layer 4) and an output-port number with respect to transmission cells. In accordance with the contents of this table, settings are made to the connection control of the switch unit 12.

FIG. 6 is an illustrative drawing showing a configuration of a call-control table.

The contents of the call-control table are set when the terminal DTE-a sends a message for requesting setting of connection, for example.

When a message for requesting setting of connection arrives from the terminal DTE-a which the ATM switch (node) 10 contains therein, a source address aaa included in the message is stored in the address field of a transmitter. Also, the VPI/VCI of a communication channel that is used for data exchange with the terminal DTE-a are stored in respective fields of the transmitter (VPIa and VCaI in FIG. 6). A destination address bbb included in the message is store in the address field of a receiver. If the receiver terminal is not contained in the node (ATM switch) 10, a port number of a transit line directed to a data destination is stored, and, also, the VPI/VCI of a communication channel for exchanging data with this port are stored in respective field of the receiver (VPb1 and VCb1 in the FIG. 6).

When a message for requesting setting of connection is received via a transit line, a source address included in the message is stored in the address field of the transmitter. A port number of the transit line through which the message is received and the VPI/VCI of a communication channel through which the message is received are stored in respective field of a cell transfer. A destination address contained in the message is stored in the address field of the receiver. Further, the VPI/VCI of a communication channel which is used for data exchange with the receiver terminal are stored in the respective field of the receiver.

When the message for requesting setting of connection includes a facility indicating use of a broadband communication line, a call type is specified as "special" If no such facility is set in the message, the call type is specified as "general" By referring to the field where the entry "special" is found, data processing is performed on contents data that is supposed to use a broadband communication line.

If the VPI/VCI fields of either the transmitter terminal or the receiver terminal are filled in, it means that either of the terminals having the filled-in VPI/VCI field is contained in the pertinent node. In order to search for a terminal having an established connection for a given node, both the transmitter field and the receiver field should be a target for search in the call-control table.

The MID of the call-control table is generally used as a signal indicating the degree to which data is united. In the present invention, the MID is also used as an identifier for indicating whether to use a broadband communication line.

FIG. 7 is an illustrative drawing showing a configuration of a transit-line-type table.

As shown in FIG. 7, the transit-line-type table shows whether each port uses a broadband communication line or a general communication line. In the example of FIG. 7, a port B is set to broadband communication. When the message for requesting setting of connection includes a facility indicating use of a broadband communication line, and when the target for setting of connection is a terminal contained in a different node, a port that is set to broadband communication is selected as a transit line, and a port number of this port is stored in the call-control table.

FIG. 8 is an illustrative drawing showing a configuration of the broadband-communication-line-service-authorization table.

As shown in FIG. 8, the broadband-communication-line-service-authorization table shows whether each terminal identified by its terminal address is entitled to receive services of the present invention. In the example of FIG. 8, a terminal BBB is entitled to receive the services, whereas terminals AAA and ZZZ cannot enjoy the benefit of the services. Use of this table makes it possible to use a broadband communication line only for terminals which are entitled to receive the services.

Configuration of Terminal

Figure 9:
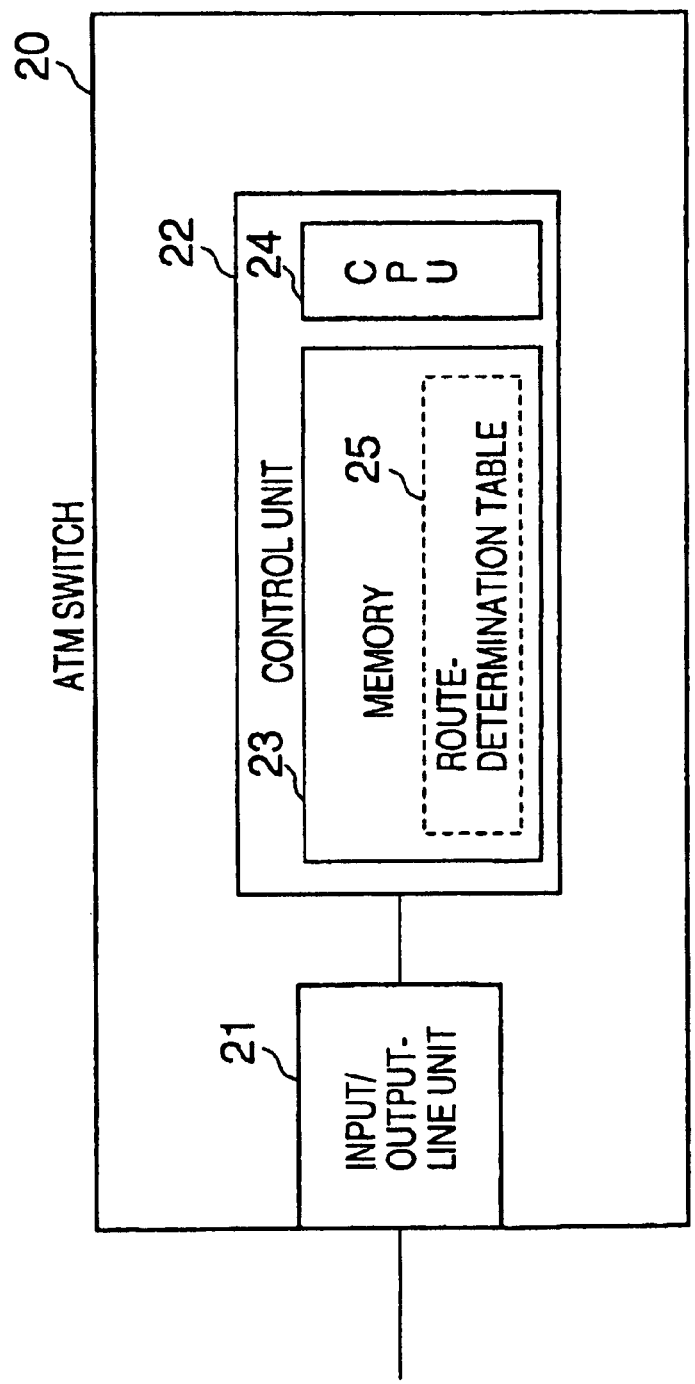
FIG. 9 is an illustrative drawing showing a configuration of an ATM terminal according to the present invention.

FIG. 9 is an illustrative drawing showing a configuration of an ATM terminal according to the present invention.

An ATM terminal 20 includes an input/output-line unit 21 and a control unit 22.

The input/output-line unit 21 attends to exchange of ATM cells, and transfers the ATM cells to the control unit 22. The control unit 22 includes a memory 23, a CPU 24, etc., and attends to management and control of communication channels according to a route-determination table 25. The memory 23 is comprised of a hard drive, a semiconductor memory, or the like, and stores the route-determination table 25. The CPU 24 gives instructions to the control unit 22 in accordance with the contents of the route-determination table 25.

FIG. 10 is an illustrative drawing showing a configuration of the route-determination table 25.

As shown in FIG. 10, the route-determination table 25 stores a list of elements of various contents such as still pictures, moving pictures, animations, audio data, music, etc., and, also, stores a list of assigned routes (e.g., a satellite line, a wire, or the like) along which the respective elements are to be transmitted. In an example of FIG. 10, the content element 1 and content element Z are to be transmitted via ordinary communication lines while a content element 2 is to be transmitted via a broadband communication line.

Basic Configuration and Operation

Figure 11:
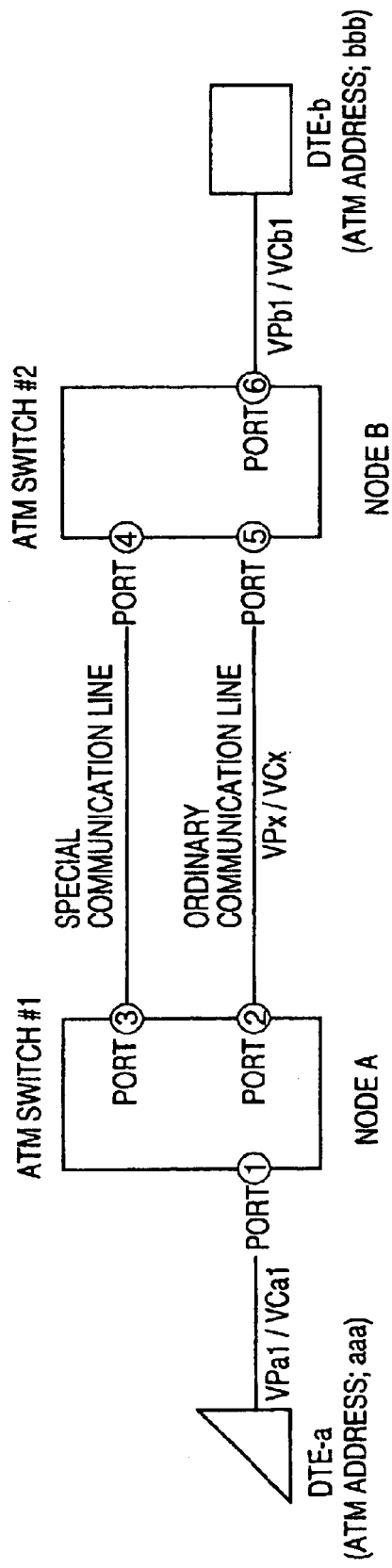
FIG. 11 is an illustrative drawing showing a basic configuration according to the present invention.

FIG. 11 is an illustrative drawing showing a basic configuration according to the present invention.

An ATM switch #1 (hereinafter referred to as a node A) and an ATM switch #2 (hereinafter referred to as a node B) operate according to ATM protocols, and serve as nodes in an ATM network. These nodes are connected to each other via an ordinary communication line that is a narrow band line and via a special communication line that is a broadband line.

A port 1 of the node A is connected to a terminal DTE-a having an ATM address aaa, and ports 2 and 3 are connected to the ordinary communication line and the special communication line, respectively. The node B has a port 6 connected to a terminal DTE-B, which has an ATM address BBB. The node B also have ports 4 and 5 connected to the special communication line and the ordinary communication line, respectively.

The terminal DTE-a and the terminal DTE-b are connected via a path between the terminal DTE-a and the port 1 of the node A, a path between the port 1 and the port 2 of the node A, a path between the port 2 of the node A and the port 5 of the node B, a path between the port 5 and the port 6 of the node B, and a path between the port 6 of the node B and the terminal DTE-b. These path are provided with logical paths VPa1/VCa1, VPx/VCx, and VPb1/VCb1 as shown in FIG. 11. Communications are established via these paths.

FIG. 12 is an illustrative drawing showing a configuration of a call-control table of the node A with respect to the terminals DTE-a and DTE-b. FIG. 13 is an illustrative drawing showing a configuration of a call-control table of the node B with respect to the terminals DTE-a and DTE-b.

The call-control table of FIG. 12 shows the following. The terminal DTE-a serving as a transmitter connected to the node A has an address aaa, and the receiver terminal has an address bbb. A path VPa1/VCa1 is provided between the terminal DTE-a and the node A, and a path VPx/VCx (channel) is laid out between the port 2 of the node A and a node of the other terminal. Further, cells coming from the terminal DTE-a are transferred to the node of the other terminal via the port 2 of the node A. A communication line used for the transfer of these cells is an ordinary communication line.

The call-control table of FIG. 13 shows the following. The terminal DTE-b serving as a transmitter connected to the node B has an address bbb, and the receiver terminal has an address aaa. A path VPb1/VCb1 is provided between the terminal DTE-b and the node B, and a path VPx/VCx is laid out between the port 5 of the node B and a node of the other terminal (i.e., node A). Further, cells coming from the terminal DTE-b are transferred to the node of the other terminal via the port 5 of the node B. A communication line used for the transfer of these cells is an ordinary communication line.

In the following description, a request for delivery of contents, which is a data exchange between terminals after establishment of a connection for use by the users, is referred to as content-delivery-request data. Further, a sequence which is followed when a connection is established or disconnected is referred to as a connection-establishment (disconnection) message.

In the following, basic operations of the configuration of FIG. 11 will be described. In particular, a description will be given with regard to processes of the terminals DTE-a and DTE-b and the nodes A and B as well as signal exchanges therebetween. Further details of operation sequences will be described later.

Basic Operation 1

Using a connection already established on a narrow-band communication line, the terminal DTE-a sends a content-delivery request (hereinafter referred to as content-request data) to the terminal DTE-b. In response, the terminal DTE-b sends requested contents to the node B by using a broadband communication line. Operations performed here are as follows.

1) Operation of Terminal DTE-a

The terminal DTE-a uses a connection already established on a narrow-band communication line, and sends content-request data to the terminal DTE-b so as to request transmission of contents via a broadband communication line.

Via the broadband communication line, the terminal DTE-a receives the contents sent from the terminal DTE-b.

2) Operation of Terminal DTE-b

The terminal DTE-b receives the content-request data form the terminal DTET-a, and performs the following processes.

FIGS. 14A and 14B are illustrative drawings showing how a route-determination table is created. As shown in FIG. 14A, types of routes along which respective contents should be transmitted are provided in a table.

Using this table, the terminal DTE-b looks for a route to be used. If there is more than one content element for which use of a broadband communication line is required, a facility indicative of use of a broadband communication line is attached to a new connection-establishment-request message, which is then sent to the node B. Here, a transmission address of the existing connection is used as a receiver address. If there is no content element for which a broadband communication line is required, the contents are sent to the node B via an ordinary communication line.

Where the new connection-establishment-request message is sent to the node B, the terminal DTE-b receives a connection-establishment-completion message from the node B. In response, the terminal DTE-b sets MID values in the route-determination table with respect to each of the relevant contents as shown in FIG. 14B.

In an example of the FIG. 14B, $\alpha\alpha\alpha$, $\beta\beta\beta$, and ΓΓΓ are set as MID values with respect to a content element 1, a content element 2, and a content element 3, respectively. The content elements 1 and 3 are transmitted via a connection VPIx/VCIx on an ordinary communication line, whereas the content element 2 is transmitted via a connection VPIy/VCI/y established on a broadband communication line.

According to the route-determination table in which MID values are set, each element of the contents are transmitted via the assigned connection.

3) Operation of Node B

The node B receives the content-request data from the node A via an existing connection when the content-request data is directed to the terminal DTE-b to request a transfer of contents via broadband communication line. The node B forwards the content-request data to the terminal DTE-b, and attends to the following processes.

When receiving from the terminal DTE-b the new-connection-establishment-request message with a facility indicative of use of a broadband communication line, the node B analyzes the message, and identifies the message as a request for a connection on a broadband communication line. If it is not for a connection on a broadband communication line, the connection-establishment-request message is transferred to the terminal DTTE-a.

The node B searches in the call-control table. If there is a connection having the same transmitter address and receiver address as those included in the connection-establishment-request message, the node B searches in the transit-line-type table.

FIG. 15 is an illustrative drawing showing a configuration of the transit-line-type table.

From the table, the node B learns that the port 4 is to be used as a broadband communication line. If there is no connection that matches the connection-establishment-request message, the connection-establishment-denial message is sent to the terminal DTE-b.

If the port 4 of the broadband communication line is available, an address of the terminal (i.e., an address of the terminal DTE-b which is going to be used), a channel VPI/VCI (VPb1/VCb2) with the terminal DTE-b, an address of the other terminal (i.e., an address of the terminal DTE-a which is going to be used via the broadband communication line), a channel VPI/VCI (VPy/VCy) with the other terminal, the port number (4), and the call type (special) are stored in the call-control table as new connection information.

FIGS. 16A and 16B are illustrative drawings showing the way the call-control table is updated with the new connection information. The call-control table of FIG. 16A receives new entries of the new connection information, and is updated as shown in FIG. 16B.

If there is no available broadband communication line, the connection-establishment-denial message is sent to the terminal DTE-b.

The connection-establishment-request message received for the node A is transmitted to the terminal DTE-a since a broadband communication line connection is requested.

Then, a connection-establishment-completion/denial message is received from the node A via a broadband communication line.

The connection-establishment-completion message is sent to the terminal DTE-b.

After this, contents transferred from the terminal DTE-b according to the route-determination table of the terminal DTE-b are transmitted to the node A via requested connections.

4) Operation of Node A

The node A receives the content-request data from the terminal DTE-a via an existing connection when the content-request data is directed to the terminal DTE-b to request a transfer of contents via broadband communication line. The node A forwards the content-request data to the node B, and attends to the following processes.

When receiving from the node B the new-connection-establishment-request message with a facility indicative of use of a broadband communication line, the node B analyzes the message, and identifies the message as a request for a connection on a broadband communication line. If it is not for a connection on a broadband communication line, the connection-establishment-request message is transferred to the terminal DTE-b.

The node B searches in the call-control table for a connection having the same transmitter address and receiver address as those included in the connection-establishment-request message. If there is such a connection, an address of the terminal (i.e., an address of the terminal DTE-a which is going to be used), a channel VPI/VCI (VPa1/VCa2) with the terminal DTE-a, an address of the other terminal (i.e., an address of the terminal DTE-b which is going to be used via the broadband communication line), a channel VPI/VCI (VPy/VCy) with the other terminal, the port number (3), and the call type (special) are stored in the call-control table as new connection information.

FIGS. 17A and 17B are illustrative drawings showing the way the call-control table is updated with the new connection information. The call-control table of FIG. 17A receives new entries of the new connection information, and is updated as shown in FIG. 17B.

If there is no connection that matches the request, the connection-establishment-denial message is sent via the node B to the terminal DTE-b.

The connection-establishment-completion message is sent via the node B to the terminal DTE-b, thereby establishing a broadband communication line connection.

After this, contents transferred from the terminal DTE-b via the node B and via respective connections are forwarded to the terminal DTE-a.

Basic Operation 2

The terminal DTE-a sends a connection-establishment-request message with an attached facility indicative of use of a broadband communication line, thereby establishing a connection on a broadband communication line. The node B assigns communication lines to the contents sent from the terminal DTE-b according to the MID values of an AAL type 4. Operations performed here are as follows.

1) Operation of Terminal DTE-a

The terminal DTE-a sends a connection-establishment-request message with an attached facility indicative of simultaneous use of a broadband communication line. The message is directed to the terminal DTE-b, and is sent via an ordinary communication line while there is no existing connection. Then, the terminal DTE-a attends to the following processes.

The terminal DTE-a receives a connection-establishment-completion message via the ordinary communication line from the terminal DTE-b. In response, the terminal DTE-a transmits content-request data to the terminal DTE-b via the ordinary communication line, thereby requesting delivery of contents via a broadband communication line.

After this, the terminal DTE-a receives the requested contents from the terminal DTE-b via a broadband communication line.

2) Operation of Terminal DTE-b

The terminal DTE-b receives from the terminal DTE-a the connection-establishment-request message with the attached facility indicative of simultaneous use of a broadband communication line, and attends to the following processes.

The terminal DTE-b transmits a connection-establishment-acknowledgement message to the terminal DTE-a.

After this, the terminal DTE-b receives content-request data from the terminal DTE-a via an existing connection. In response, the terminal DTE-b looks for a route assigned to each of the requested content elements in the route-determination table.

FIGS. 18A and 18B are illustrative drawings showing the route-determination table.

With respect to a content element that is to be transferred via a broadband communication line, the terminal DTE-b sets an MID $\alpha\alpha\alpha$ as shown in FIG. 18B to send the content element. Here, the MID is registered in advance in the terminal DTE-b according to instructions given by a network vendor. With respect to content elements that are to be transmitted via an ordinary communication line, values other than this MID are set. If there is no content element that requires use of a broadband communication line, all the contents are transmitted to the ordinary communication line.

3) Operation of Node B

The node B receives the connection-establishment-request message from the terminal DTE-a via the node A along with the attached facility indicative of simultaneous use of a broadband communication line. Thereafter, the node B attends to the following processes.

The node B analyzes the connection-establishment request with the attached facility indicating use of a broadband communication line, and detects that a connection for simultaneous use of an ordinary communication line and a broadband communication line is requested. When the request is not for a connection on a broadband communication line, the connection-establishment-request message directed to the terminal DTE-a is sent to the terminal DTE-b via an ordinary communication line. Further, the node B searches in the transit-line-type table relating to the terminal DTE-a.

FIG. 19 is an illustrative drawing showing a configuration of the transit-line-type table relating to the terminal DTE-a.

By searching in the table, the node B learns that the port 4 is to be used as a broadband communication line. If the port 4 has an available space, information about the broadband communication line connection is stored in the call-control table.

FIGS. 20A and 20B are illustrative drawings showing the call-control table. The information about the broadband communication line connection is added to the call-control table of FIG. 20A to generate the call-control table of FIG. 20B. Here, a channel between the node B and the terminal DTE-b uses the same old channel VPa1/VCa1.

If the port 4 does not have an available space, the connection-establishment-request message alone is sent to the terminal DTE-b without the facility indicating use of a broadband communication line. Since it is for a connection on the broadband communication line, the transmitter address and the receiver address in the received connection-establishment-request message are switched with each other, and the message is transmitted to the node A.

After this, the node B receives a connection-establishment-completion/denial message from the node A via a broadband communication line. In response, the node B transfers the connection-establishment-request message from the terminal DTE-a to the terminal DTE-b along with the attached facility indicating use of a broadband communication line.

The node B then receives the connection-establishment-acknowledgement message from the terminal DTE-b that is directed to the terminal DTE-a, and forwards the message to the node A via the ordinary communication line.

Following this, the node B receives the content-request data from the terminal DTE-a via the node A and via the ordinary communication line. The node B forwards the data to the terminal DTE-b.

The node B then receives content data from the terminal DTE-b. If the MID is attached to the data, and if that matches the MID of the relevant connection in the call-control table, the received content data is transmitted via a port having the matched MID. If the MID does not provide a match, the content data is transmitted to the node A via a port which does not have an MID of the relevant connection in the call-control table. If no MID is attached to the content data, the content data is forwarded to the node A via the ordinary communication line.

4) Operation of Node A

The node A receives the connection-establishment-request message with the attached facility indicating simultaneous use of a broadband communication line from the terminal DTE-a, and forwards the message to the node B. Afterwards, the node A attends to the following processes.

The node A receives from the node B the connection-establishment-request message with the attached facility indicating simultaneous use of a broadband communication line. The node A analyzes the connection-establishment-request message, and detects that a connection on a broadband communication line is requested. New connection information is then written in the call-control table.

FIGS. 21A and 21B are illustrative drawings showing the call-control table. The new connection information is added to the call-control table of FIG. 21A to generate the call-control table of FIG. 21B. Here, a channel between the node A and the terminal DTE-a uses the same old channel VPa1/VCa1.

The node A then transmits the connection-establishment-completion message to the node B via the broadband communication line so as to deliver the message to the terminal DTE-b.

After this, the node A receives the connection-establishment-acknowledgement message from the node B via the ordinary communication line, and forwards the message to the terminal DTE-a.

The node A receives the content-request data from the terminal DTE-a, and forwards the content-request data to the node B as the destination of the data specifies.

Basic Operation 3

The terminal DTE-a transmits an instruction to change a communication line currently in use to a broadband communication line. When the presently engaged line is changed to a broadband communication line, the terminal DTTE-a sends a content-delivery request to the terminal DTE-b, requesting delivery of contents via the broadband communication line. In response, the terminal DTE-b transmits the requested contents. Operations involved here are as follows.

An initial condition is the same as that of the basic operation 1. That is, it is assumed that there is an already established connection. After the currently used communication line is changed to a broadband communication line, all contents are transmitted via the broadband communication line. Because of this, there is no route-determination table in the terminal DTE-b.

1) Operation of Terminal DTE-a

The terminal DTE-a uses a signaling channel of an already established connection to transmit content-request data requesting use of a broadband communication line. Thereafter, the terminal DTE-a performs the following processes.

The terminal DTE-a receives a connection-establishment-completion message indicating that an existing connection has been successfully switched to a broadband communication line. In response, the terminal DTE-a sends content-delivery-request data to the terminal DTE-b via the broadband communication line so as to request delivery of contents via the broadband communication line.

The terminal DTE-a then receives the requested contents via the broadband communication line.

2) Operation of Terminal DTE-b

The terminal DTE-b receives the content-delivery-request data from the terminal DTE-a via the broadband communication line connection. In response, the terminal DTE-b transmits requested contents via the broadband communication line connection.

3) Operation of Node B

The node B receives the content-delivery-request data directed to the terminal DTE-b when the data arrives from the node A via the broadband communication line connection. Then, the node B carries out the following processes.

FIG. 22 is an illustrative drawing showing a configuration of a transit-line-type table.

The node B refers to the transit-line-type table of FIG. 22 or the like, and analyzes the received connection-establishment-request message. Based on the analysis, the node B learns that the message is a request for a connection on a broadband communication line. If it is not a request for a connection on a broadband communication line, the connection-establishment-request message is forwarded to the terminal DTE-b.

The node B searches in the call-control table to look for a connection having the same transmitter and receiver addresses as those specified in the connectionestablishment-request message. If there is a matching connection (the transmitter and the receiver are interchangeable to provide a match), new-connection information is written in the call-control table to generate a new call-control table.

FIGS. 23A and 23B are illustrative drawings showing the call-control table. The new connection information is added to the call-control table of FIG. 23A to generate the call-control table of FIG. 23B.

The node B then transmits a connection-establishment-denial message to the node A with a facility attached thereto indicating that the existing connection has been successfully switched to a broadband communication line.

The node B receives the content-request data from the node A via the broadband communication line, and forwards the data to the terminal DTE-b.

After this, the node B receives requested contents from the terminal DTE-b, and transmits the contents to the node A via the connection.

4) Operation of Node A

The node A receives from the terminal DTE-a the content-request message directed to the terminal DTE-b through the signaling channel of an already established connection. The node A transfers the content-request message to the node B, and performs the following processes.

The node A receives from the node B the connection-establishment-denial message having a facility attached thereto indicating that the existing connection has been successfully switched to a broadband communication line. The node A registers new connection information in the call-control table to update the table.

FIGS. 24A and 24B are illustrative drawings showing the call-control table. The new connection information is added to the call-control table of FIG. 24A to generate the call-control table of FIG. 24B.

The node A receives the content-request data from the terminal DTE-a, and forwards the data to the terminal DTE-b via the broadband communication line.

After this, the node A receives requested contents from the node B via the connection, and forwards the contents to the terminal DTE-a.

Basic Operation 4

In this mode of operation, services of the basic operations 1–3 are provided to network users (terminals) only if the users are authorized to use the services by satisfying certain requirements. In the following, a description of this mode of operation will be given.

1) Registration in Node

A node which contains a terminal that receives the services is provided with a service-authorization table indicating whether the broadband-communication services are available.

FIGS. 25A and 25B are illustrative drawings showing a configuration of the service-authorization table.

When receiving a request from a user expressing a desire to use the services, a network vendor changes an entry of the service-authorization table relating to the relevant DTE address in order to authorize use of the services.

2) Decision on Whether to Authorize

When an authorized user (terminal) sends a connection-establishment-request message with an attached facility indicative of use of a broadband communication line as in the basic operations 1–3, the node receiving the message checks whether a facility indicative of use of a broadband communication line is attached. Then, the node refers to the service-authorization table. If the terminal that has sent the message is authorized to use the services, one of the basic operations 1–3 is performed accordingly. If the user is not authorized, a connection-denial message is transmitted to the terminal.

In the following, embodiments of the present invention will be described with reference to each of the basic operations described above.

First Embodiment

Figure 81:
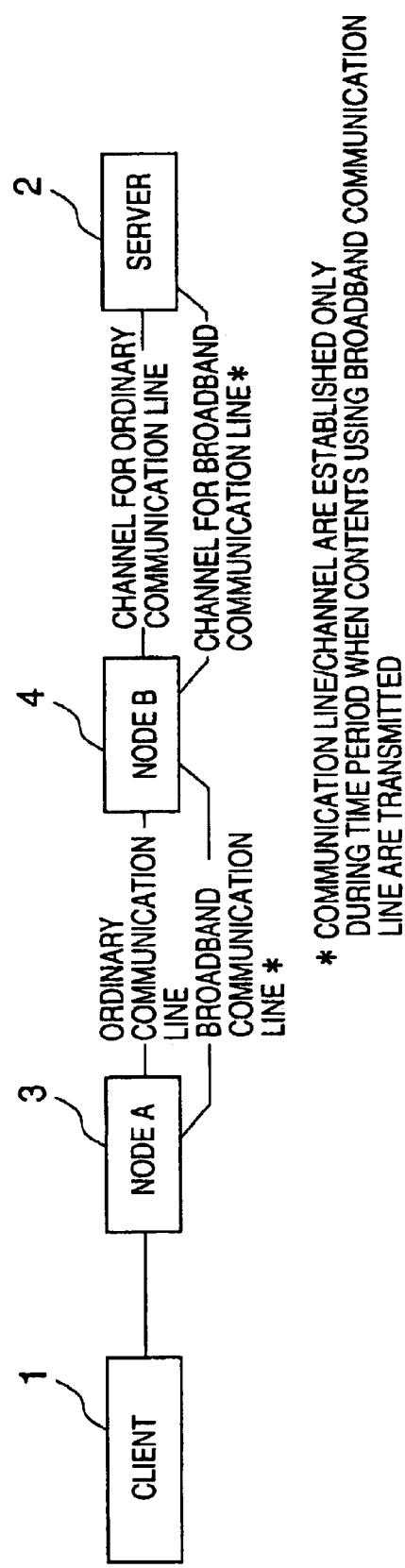
FIG. 81 is an illustrative drawing showing a configuration of communication lines according to the first embodiment of the present invention.

FIG. 81 is an illustrative drawing showing a configuration of communication lines according to a first embodiment of the present invention.

A client 1 requests a server 2 to deliver contents via a satellite line. The server 2 establishes a broadband connection (i.e., a connection on a broadband communication line) between the node A and the node B before delivering the contents. FIG. 81 shows connections established in this manner. The server 2 delivers the requested contents via the broadband communication line that has been newly established.

Requirements of First Embodiment

FIGS. 26A through 26D are illustrative drawings showing requirements (initial conditions) of the first embodiment. The first embodiment has a configuration as shown in FIG. 26B, which includes a client A, (ATM address aaa), a client C (ATM address ccc), nodes A and B, and a server B (ATM address bbb). The nodes A and B may be comprised of an ATM switch.

The sever B has a route-determination table for contents X (which are requested by the client 1). FIG. 26A shows the way the route-determination table appears in the initial condition thereof. As shown in FIG. 26A, the contents X include a content element 1 through a content element 3. The content elements 1 and 3 are delivered via an ordinary communication line, and the content element 2 requires use of a broadband communication line according to the table.

In FIG. 26B, the terminal (client) A contained in the node A has two established connections, which are directed to the address bbb (the server B in the other node) and the address ccc (the client C in the same node), respectively. These connections are implemented by using wire connections (ordinary communication lines: narrow-band communication lines). The connection between the client A and the client B is comprised of a channel 0/100 between the client A and the node A (port 3), a channel 1/100 between the node A (port 2) and the node B (port 6), and a channel 0/110 between the node B (port 7) and the server B. The connection between the client A and the client C is comprised of a channel 0/200 between the client A and the node A (port 3) and a channel 0/400 between the node A (port 4) and the client C.

FIGS. 26C and 26D show the call-control tables of the node A and the node B, respectively. These tables have the above-described connections as entries therein.

The nodes A and B update the call-control tables by automatically adding a new connection when the new connection is established in response to a new-connection-establishment request issued by a terminal.

Sequence of First Embodiment

Figure 27:
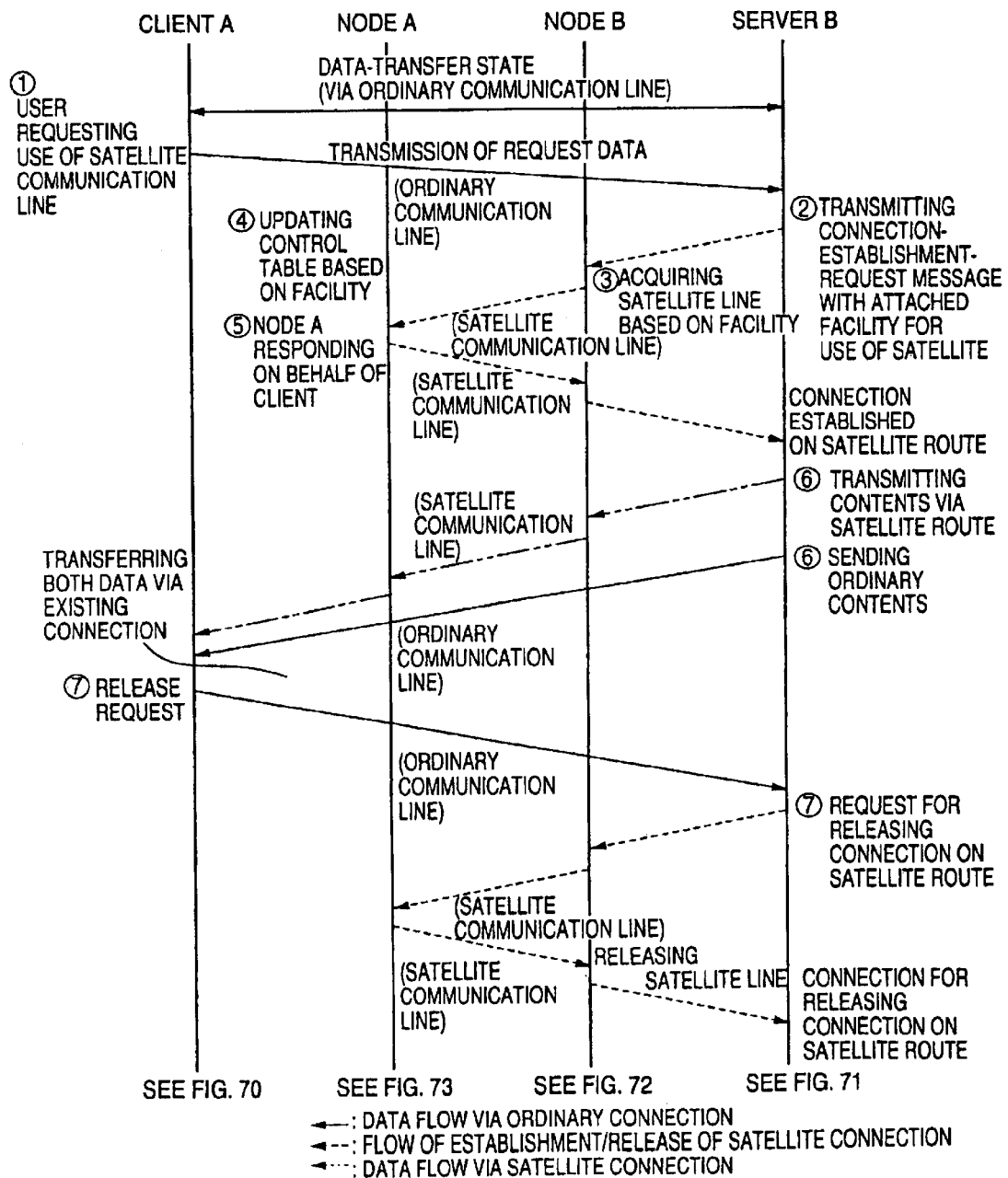
FIG. 27 is a sequence chart showing an operation sequence of the first embodiment of the present invention.

FIG. 27 is a sequence chart showing an operation sequence of the first embodiment of the present invention. In the following description, a number attached to the beginning of each description corresponds a number shown in the figure.

Figure 70:
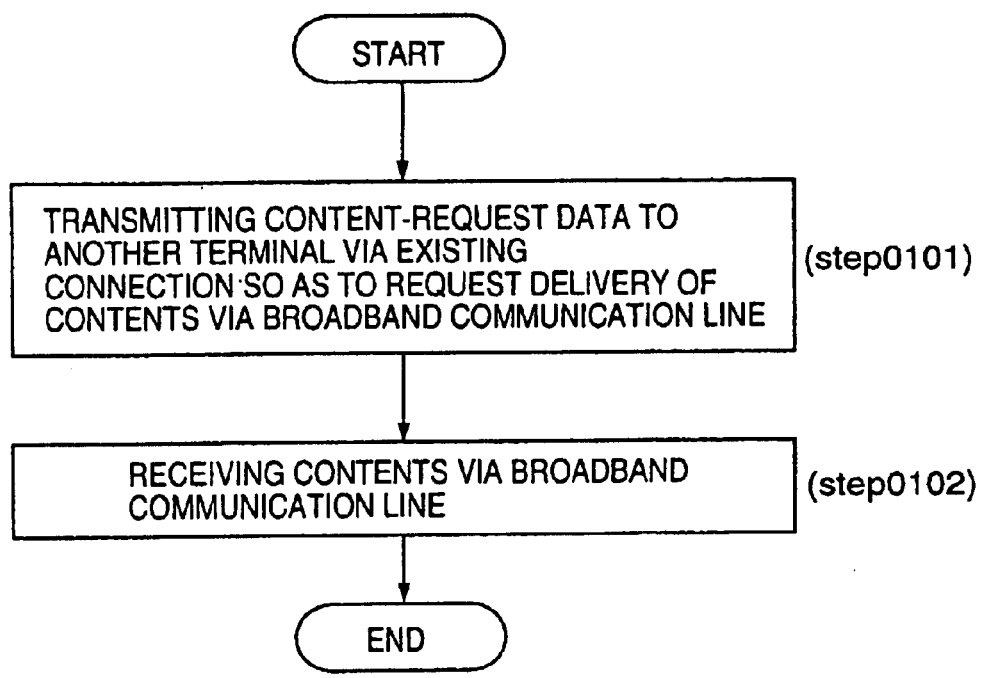
FIG. 70 is a flowchart of an operation of a client according to the first embodiment of the present invention.
Figure 71:
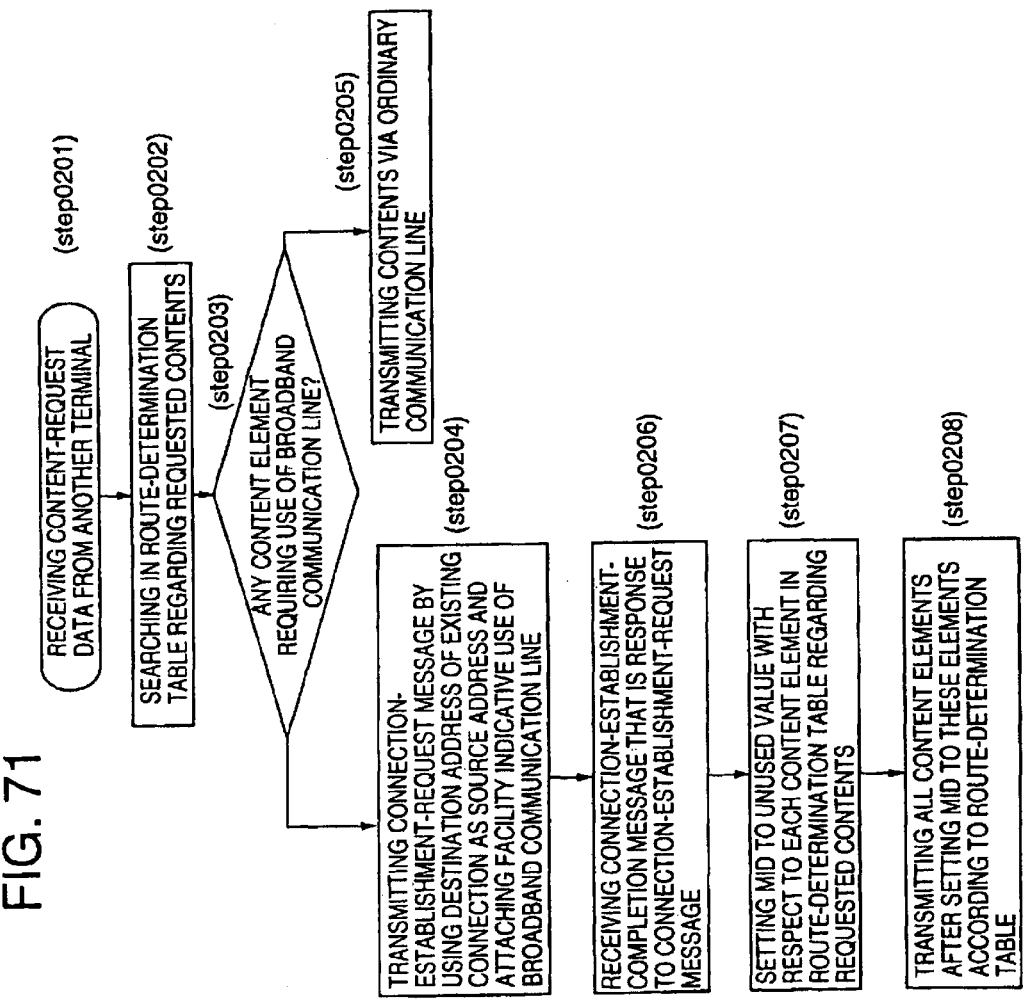
FIG. 71 is a flowchart of an operation of a sever according to the first embodiment of the present invention.
Figure 72:
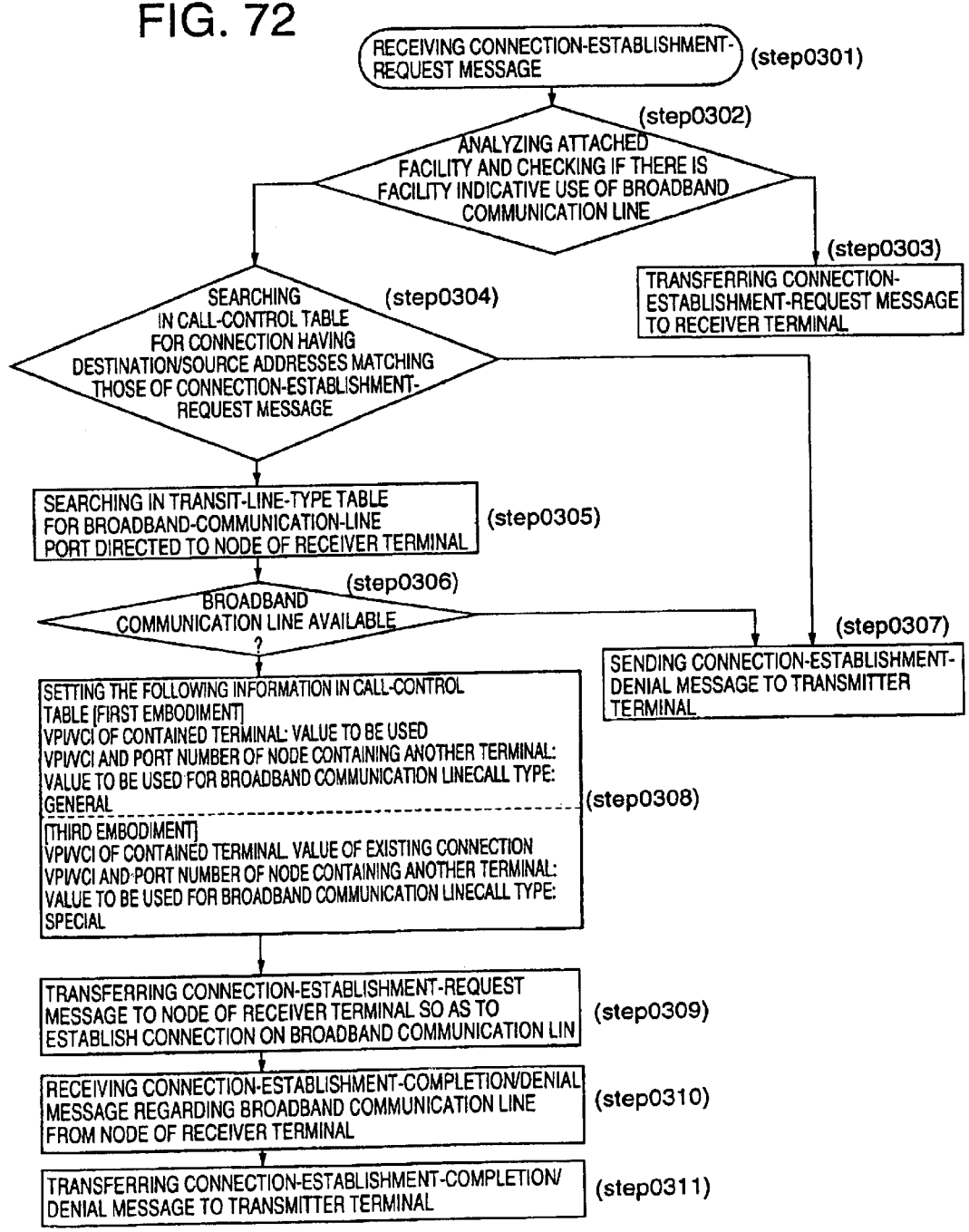
FIG. 72 is a flowchart of an operation of the node B according to the first embodiment of the present invention.
Figure 73:
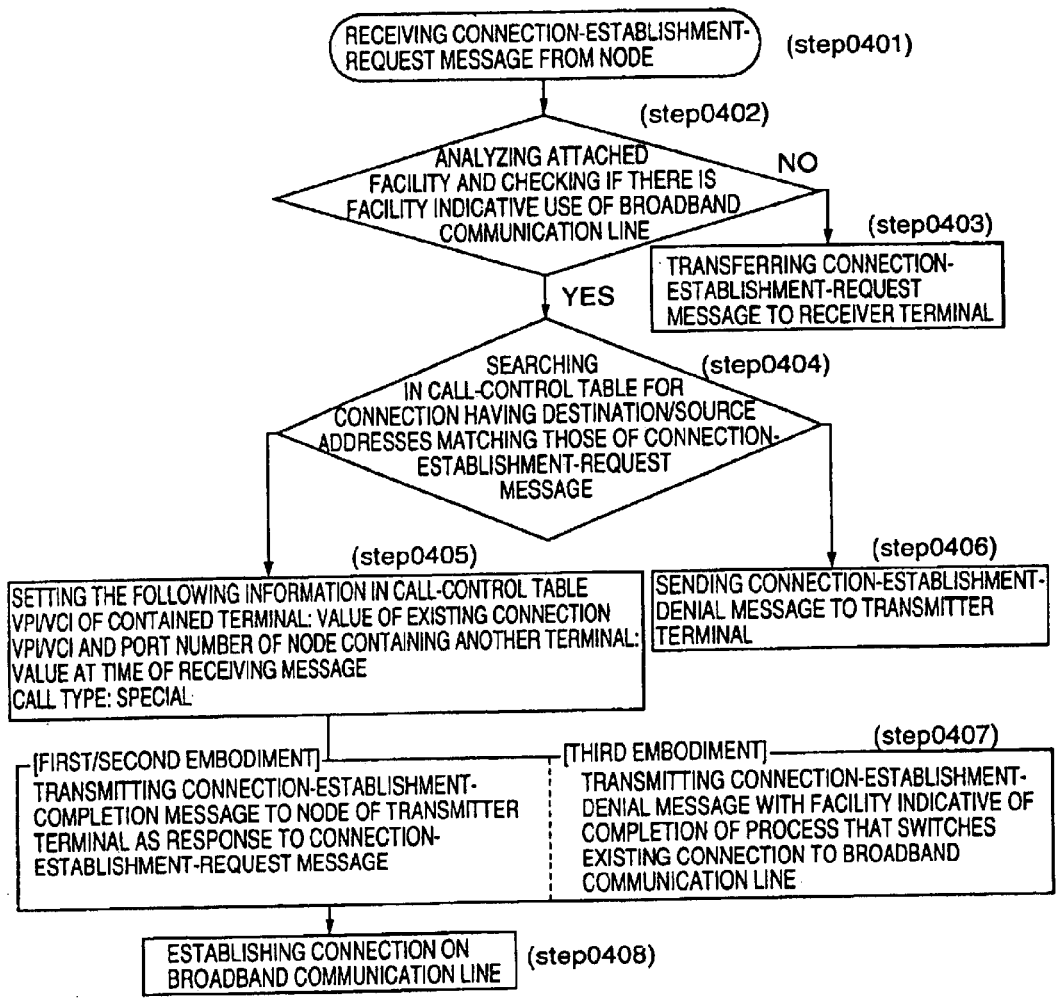
FIG. 73 is a flowchart of an operation of the node A according to the first embodiment of the present invention.

FIG. 70 is a flowchart of an operation of the client A according to the first embodiment of the present invention.
FIG. 71 is a flowchart of an operation of the sever B according to the first embodiment of the present invention.
FIG. 72 is a flowchart of an operation of the node B according to the first embodiment of the present invention.
FIG. 73 is a flowchart of an operation of the node A according to the first embodiment of the present invention.

1) Connection Request

Figure 28:
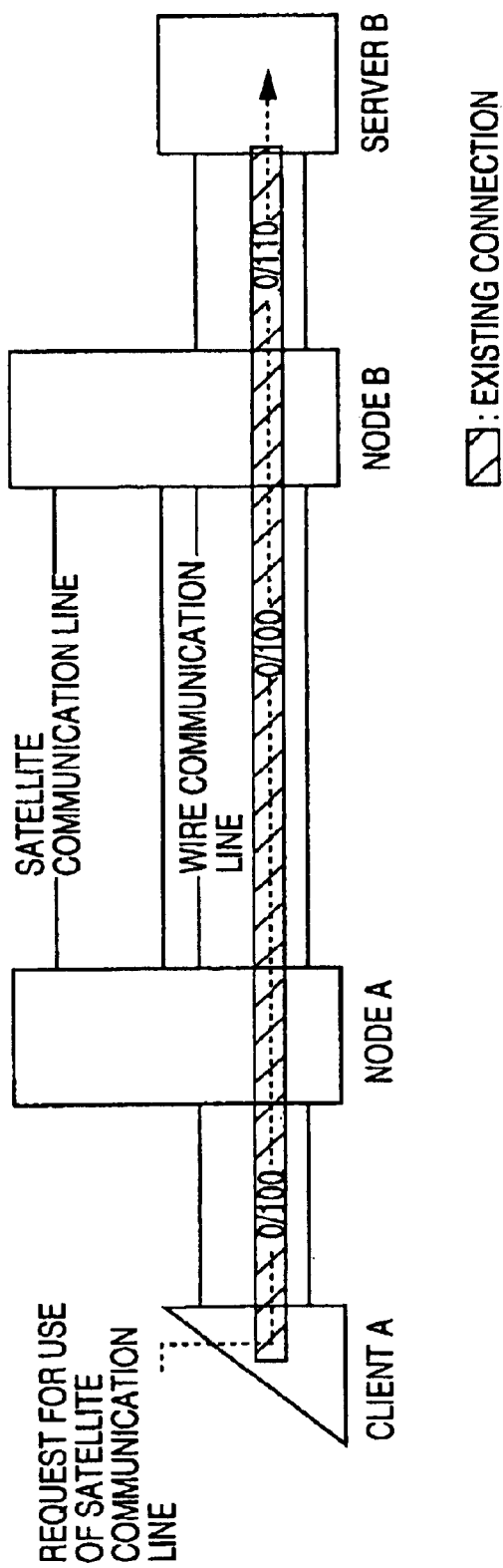
FIG. 28 is an illustrative drawing for explaining a connection request.

FIG. 28 is an illustrative drawing for explaining a connection request.

The client A presents a screen menu or the like which is provided from the server B via an existing connection, and invites an input on the screen menu. In response to a relevant input, the client A sends content-request data to the server B via the existing connection (i.e., a connection on a wire communication line) so as to request delivery of contents X via a satellite communication line. (See step 0101 of FIG. 70.)

The existing connection is made up from the channel 0/100 between the client A and the node A, the channel 1/100 between the node A and the node B, and the channel 0/110 between the node B and the server B.

2) Connection Setting 1

Figure 29:
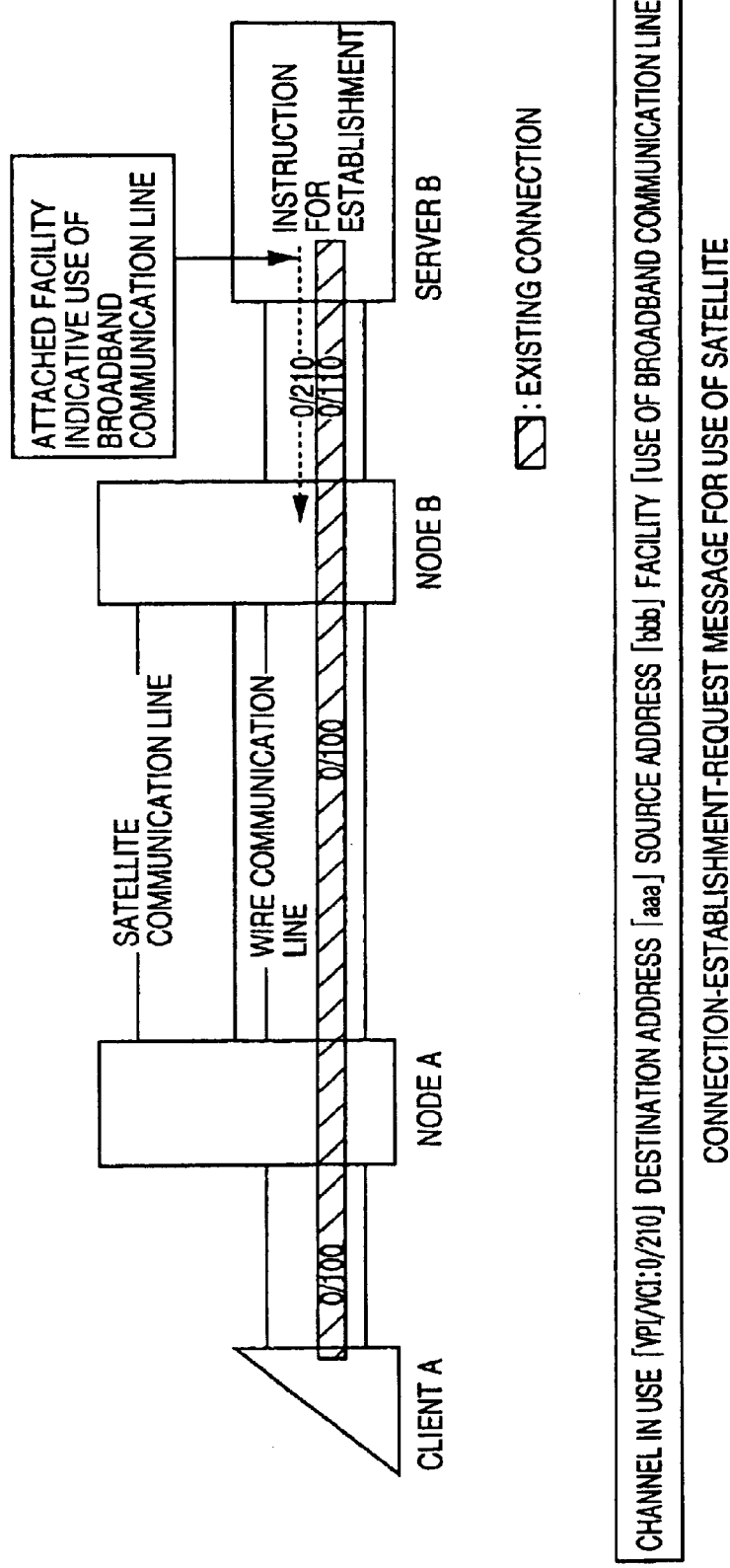
FIG. 29 is an illustrative drawing for explaining setting of a connection.

FIG. 29 is an illustrative drawing for explaining setting of a connection.

Upon receiving the content-request data requesting the delivery of the contents X, the server B searches in the route-determination table for the contents X. (See step 0201 and step 0202 of FIG. 71.)

Based on the route-determination table, a check is made as to whether there is a content element that should be delivered via a broadband communication line. If there is no such a content element, all the contents X are delivered through the existing connection.

In this example, the server B refers to the route-determination table of FIG. 26A, and learns that the content element 2 requires use of the broadband communication line. (See step 0203 of FIG. 71.)

The server B sends a new connection-establishment-request message to the node B in order to prepare for the delivery of the content element 2 via a satellite line. This connection-establishment-request message includes channel information "VPI/VCI:0/210", a receiver address "aaa", a transmitter address "bbb", and a facility information "use of broadband communication line". The receiver address of the client is obtained by using as the receiver address a transmitter address that was specified when an ordinary connection was established. (See step 0204 of FIG. 71.)

Here, a call-request message may be treated as a substitute for the connection-establishment-request message to proceed with the following procedure.

3) Connection Setting 2

Figure 30:
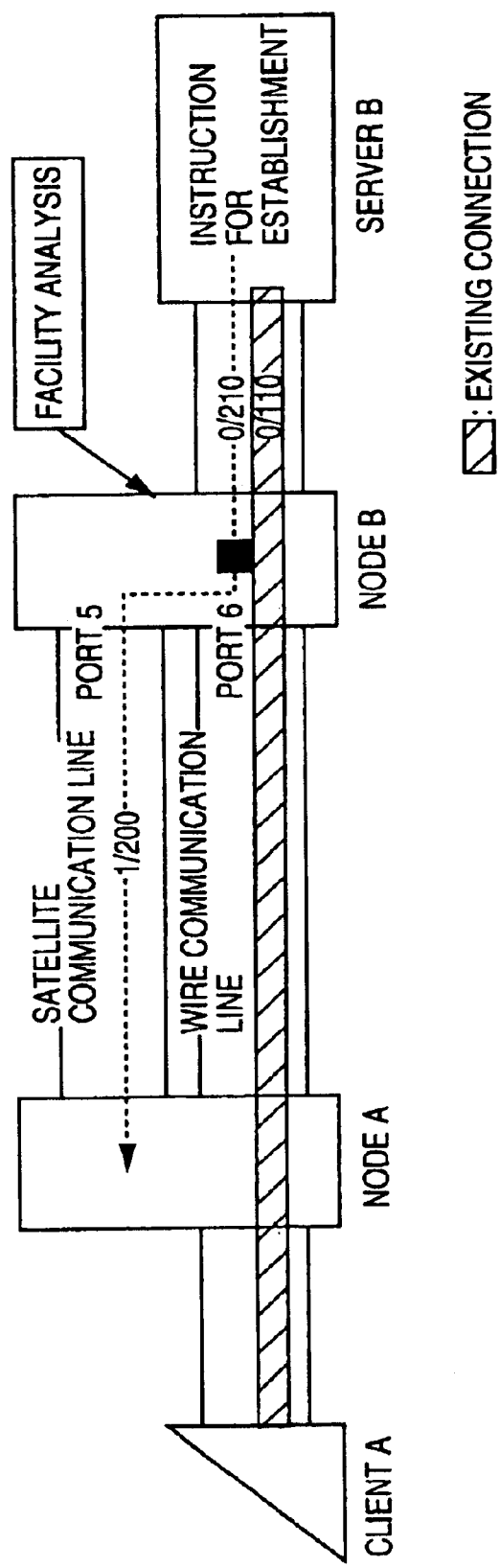
FIG. 30 is an illustrative drawing for explaining setting of a connection.

FIG. 30 is an illustrative drawing for explaining setting of a connection.

The node B receiving the connection-establishment-request message analyzes the attached facility, and learns that the message is a request for a connection on a broadband communication line. If there is no facility indicating use of a broadband communication line, the message is forwarded to the receiver terminal as a general connection-establishment message. (See steps 0301 through step 0303 of FIG. 72.)

The call-control table of the node B is searched by using the transmitter/receiver addresses of the message as search keys. (See step 0304 of FIG. 72.)

If there is an existing connection which provides a match in terms of a combination of addresses (i.e., a transmitter address and a receiver address are interchangeable in determining a match), it is ascertained that the message is a request for a new connection in order to use a broadband communication line in addition to an ordinary communication line. Thus, a search for a port of a satellite communication line is started.

FIG. 31 is an illustrative drawing showing a transit-line-type table.

Consulting the transit-line-type table of FIG. 31, the node B learns that the port 5 can be used for a broadband communication line. Then, the node B checks if there is available space in the satellite communication lines. (See step 0305 and step 0306 of FIG. 72.)

If there is no available space or if there is no appropriate existing connection, a message denying the connection-establishment request is sent to the transmitter terminal. (See step 0307 of FIG. 72.)

Finally, information on the new path using the satellite communication is added to the call-control table. FIG. 32 is an illustrative drawing showing the call-control table. The new path entry is shown in the bottom row. Further, the connection-establishment-request message is transmitted to the node A via the satellite communication line. (See step 0308 and step 0309 of FIG. 72.)

4) Connection Setting 3

Figure 33:
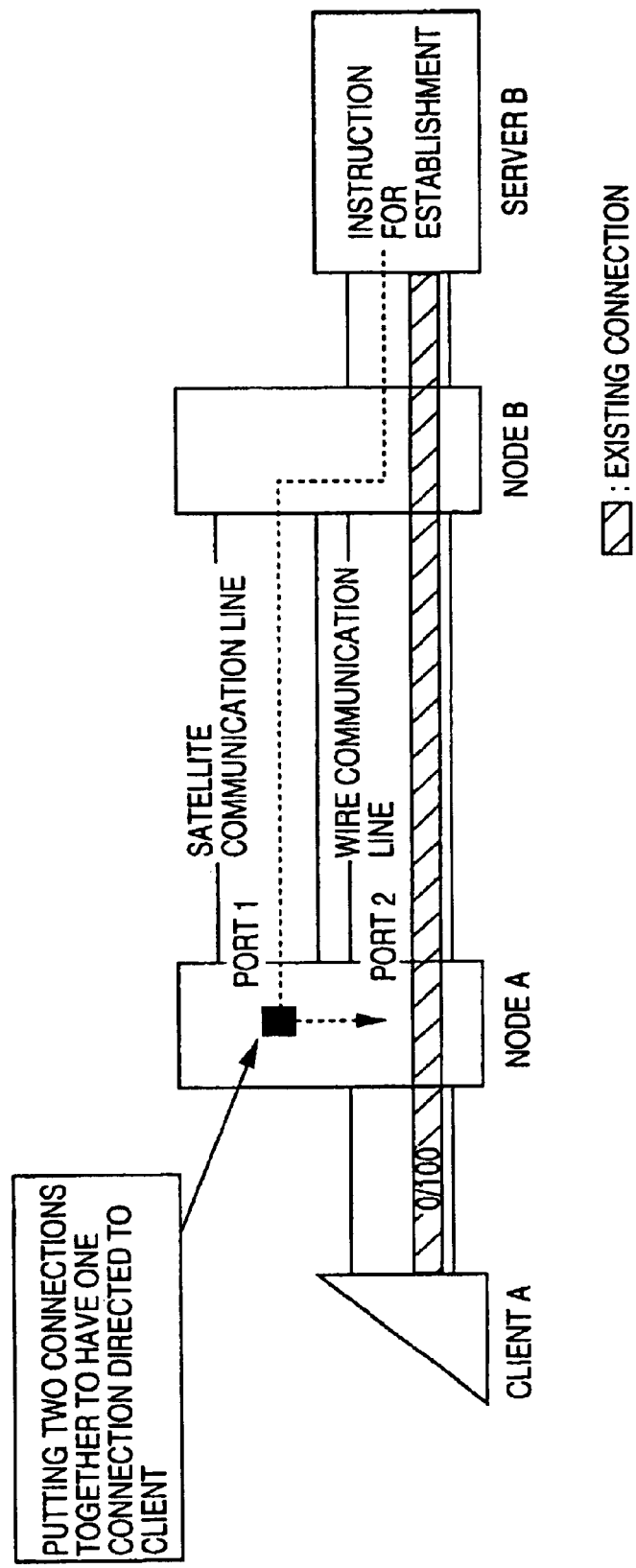
FIG. 33 is an illustrative drawing for explaining setting of a connection.

FIG. 33 is an illustrative drawing for explaining setting of a connection.

When receiving the connection-establishment-request message via the satellite communication line, the node A analyzes the attached facility, and learns that the message is a request for establishing a connection on a broadband communication line. (See step 0401 and step 0402 of FIG. 73.)

If there is no facility requesting use of a broadband communication line, the message is forwarded to the receiver terminal as a general connection-establishment message. (See step 0403 of FIG. 73.)

If the facility requesting use of a broadband communication line is confirmed, the node A searches in the call-control table thereof by using the transmitter and receiver addresses of the message as search keys. (See step 0404 of FIG. 73.)

If a connection that matches the combination of the addresses (without regard to which is the transmitter address and which is the receiver address) is found as a result of the search, the same VPI/VCI as the existing connection is assigned to provide a connection directed to the receiver terminal (client A). As a consequence, the contents traveling through the satellite connection from the server B and the contents traveling through the wire connection from the server B are transferred via the same channel 0/100 between the node A and the client A. Further, the node A adds information on a new broadband-communication-line connection to the call-control table as shown in a step step 0405 of FIG. 73. FIG. 34 is an illustrative drawing showing the call-control table. The additional path entry is shown in the bottom row. Since the new connection is implemented as a satellite communication line, the call-control table of FIG. 34 has the entry "special" in the field for indicating a type at the bottom row. (See step 0405 of FIG. 73.)

If there is no existing connection showing a match, a message denying the connection-establishment request is transmitted to the transmitter terminal. (See step 0406 of FIG. 73).

5) Establishing Connection

Figure 35:
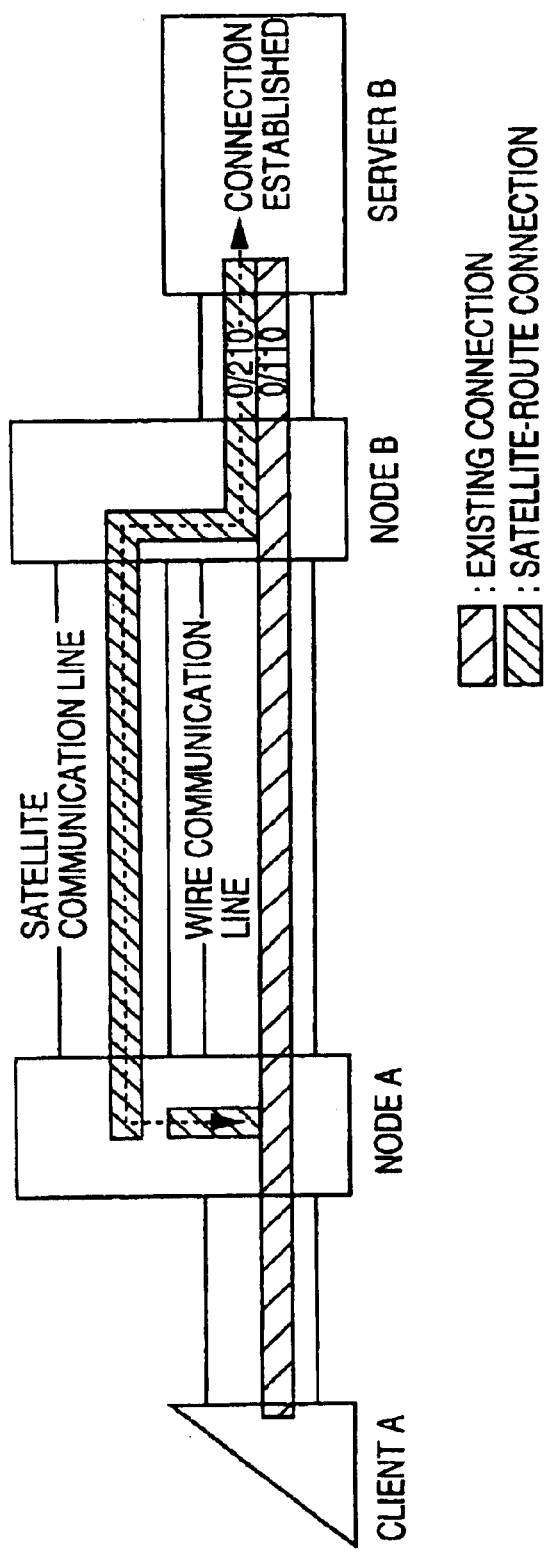
FIG. 35 is an illustrative drawing for explaining connection establishment.

FIG. 35 is an illustrative drawing for explaining connection establishment.

When a connection is to be established in general, a node sends a connection-establishment message to a receiver terminal, which in turn sends a call-establishment-completion message to the transmitter terminal. In the first embodiment, however, the node A does not send to the client A a new connection-establishment-request message with an attached facility indicative of use of a broadband communication line. If the same combination of addresses as the one included in the message is found in the search of the sequence 4) described above, however, the node A transmits a connection-establishment-completion message on behalf of the client A to the transmitter terminal. (See step 0407 and step 0408 of FIG. 73 and step 0310 and step 0311 of FIG. 72.)

Such an arrangement can reduce the processing load on the receiver terminal. Since neither signal exchange between the client A and the node A nor processing by the client A is involved, a connection is promptly established on the broadband communication line.

6) Data Transfer

Figure 38:
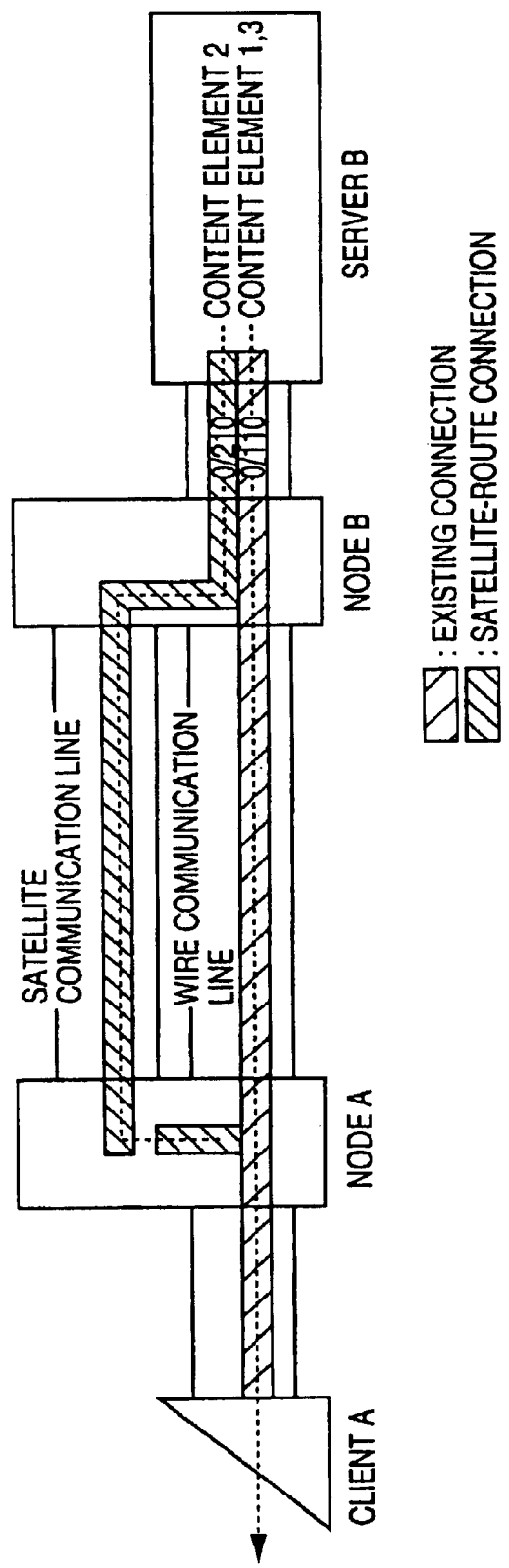
FIG. 38 is an illustrative drawing for explaining data transfer.

FIG. 38 is an illustrative drawing for explaining data transfer.

Upon receiving the connection-establishment-completion message, the server B updates the route-determination table by specifying which connection (channel, VPI/VCI) is to be used with respect to each content element. FIG. 36 is an illustrative drawing showing the route-determination table. Further, in order to insure that the client A will be able to identify a content element upon receipt thereof, a unique MID is assigned to each content element while avoiding use of the MIDs used by the existing connections. (See step 0206 and step 0207 of FIG. 71).

Each content element having the MID attached thereto as specified in FIG. 36 is then transmitted to the client A via a predetermined channel. (See step 0208 of FIG. 71 and step 0102 of FIG. 70.)

In FIG. 36, use of the ordinary communication line or the satellite communication line is specified with respect to each of the content elements. Alternatively, such a setting may be made as to transmit all the content elements via the satellite communication line.

The call-control table of the node B has the settings as shown in FIG. 32. According to the settings, the channel between the node B and the server B is an ordinary communication line as far as the old existing connection is concerned, so that the channel 0/110 is registered in the table. Since the newly established connection is created as a broadband communication line, the channel 0/210 is defined separately from the existing channel. Because of this configuration, the ordinary communication line can accommodate communication without being affected by a massive amount of data transfer. If the ordinary communication line can accommodate the massive amount of data transfer without a serious trouble, there is no need to establish the channel 0/210, and the existing channel 0/110 may be utilized.

FIG. 37 is an illustrative drawing showing a call-control table of the node A.

The node A transfers data in accordance with settings of the call-control table of FIG. 37. According to the call-control table, a message arriving from whichever the port 1 or the port 2 is transmitted to the client A (aaa) via the channel 0/100.

A message from the client A to the server B, however, can be directed to either the first connection (shown as 1 in the figure) or the third connection (shown as 3 in the figure), so that there is a confusion as to which port should be used for transmitting the message. In the present embodiment, a port which has the entry "general" in the field for specifying a type is chosen as a port to transmit the message. The message arriving from the client A is thus sent via the port 2.

7) Release of Broadband Communication Line

Figure 39:
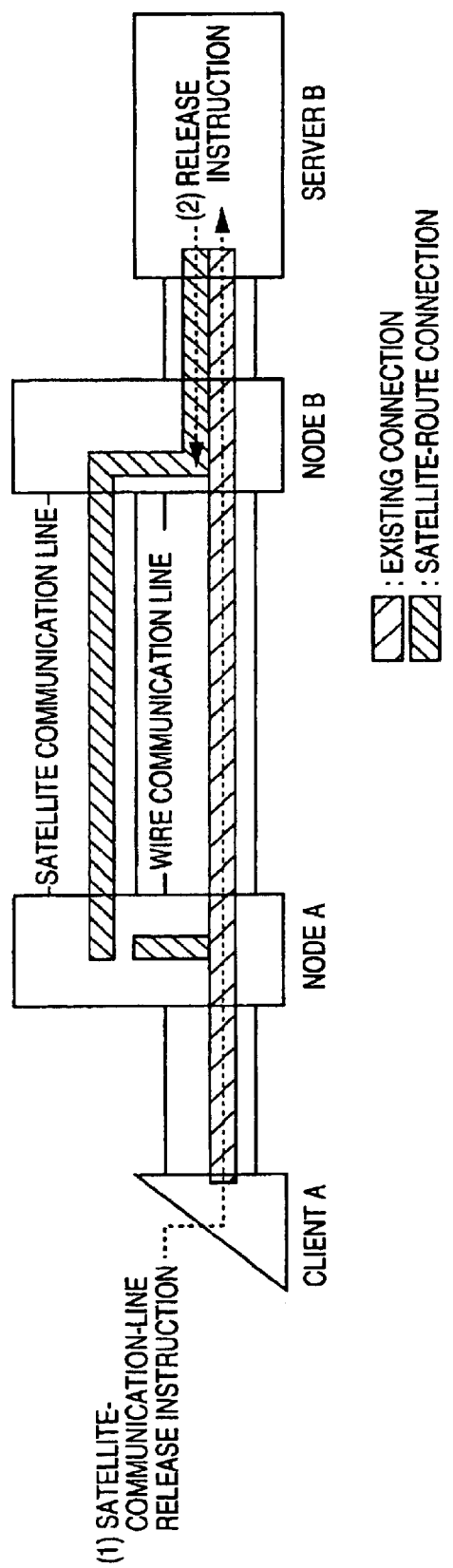
FIG. 39 is an illustrative drawing for explaining release of a broadband communication line according to the first embodiment of the present invention.

FIG. 39 is an illustrative drawing for explaining release of a broadband communication line according to the first embodiment of the present invention.

When use of the satellite line is to be finished, the client A notifies the server B of an intention to do so. Upon receiving this notification, the server B sends the client A a message that indicates releasing of the satellite-route connection.

The nodes A and B receiving the release message from the client A erase information about the satellite-route connection stored in the respective call-control tables. In this case, the node A does not transfers the release message to the client A.

The first embodiment has been described with reference to a case in which the client A requests the server B to deliver the contents X via a satellite ink. Alternatively, the server B may make a decision on its own as to whether to use the satellite connection based on the content-route-determination table regarding contents X shown in FIG. 26A without receiving an instruction from the client A instructing use of the satellite line. In such a case, the server B may ask the client A whether the satellite line should be used.

In the first embodiment, the broadband-communication connection is in existence in accordance with an establishment request and a release request from the server B only during a period when the broadband-communication-line contents are delivered. Alternatively, the broadband-communication connection may be established for a duration of a predetermined time length after a request from the server B for establishing a broadband-communication connection.

Second Embodiment

Figure 82:
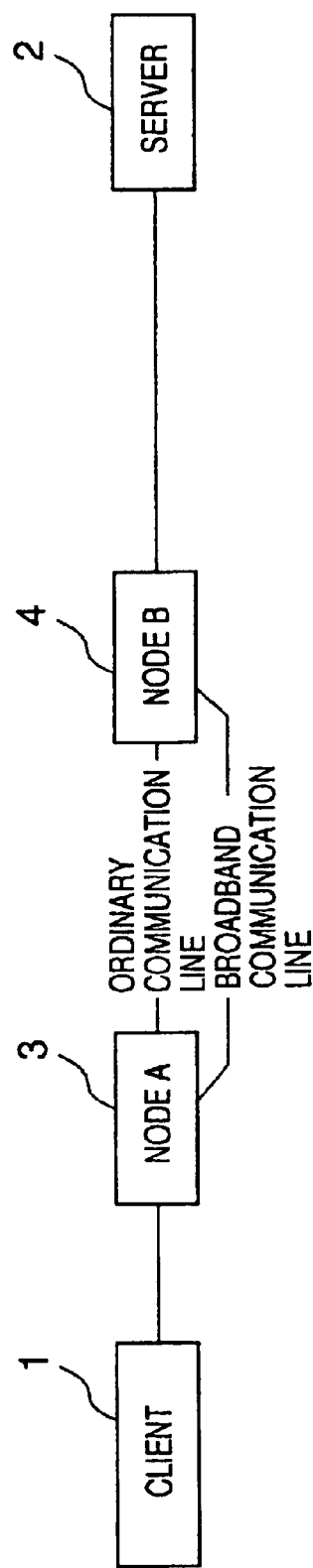
FIG. 82 is an illustrative drawing showing a configuration of communication lines according to the second embodiment of the present invention.

FIG. 82 is an illustrative drawing showing a configuration of communication lines according to a second embodiment of the present invention.

The client 1 requests the server 2 to deliver contents via a satellite line. This request is made via an ordinary-communication line. In response, the node B establishes a line as shown in FIG. 82 between the node A and the node B. When the server 2 is to deliver the requested contents, the server 2 writes an MID value of an AAL type 4 with respect to contents that are to be delivered via the satellite communication line. This MID value indicates use of the satellite communication line. The node B uses the MID of the AAL type 4 as a key to decide which lines are used for transmission of each data.

Requirements of Second Embodiment

FIGS. 40A through 40D are illustrative drawings showing requirements (initial conditions) of the second embodiment.

A description of the second embodiment will be given with reference to a configuration disclosed in FIG. 40B.

The node A has a call-control table as shown in FIG. 40C. The call-control table is used for controlling VPI/VCI regarding a source address and a destination address, and is used for controlling which port is to be used as a transmission outlet for a given signal input to a given input port. In order to distinguish connections in the call-control table, a connection type is provided as an entry, and all the ordinary connections are registered as a "general" type. When a satellite line is to be used, a "special" type is indicated.

When a new connection is created, the new connection is written in the table for the control purposes. The node B has a call-control table of the same format as shown in FIG. 40D. In each node, a new connection is registered in the call-control table as a request for the new connection is issued.

The server B has a route-determination table as shown in FIG. 40A, which defines what route (either a satellite line or a wire line) is used for a particular content element (e.g., moving pictures, audio data, text data, or the like). When contents are to be transmitted via the satellite communication line, a MID value of an ALL type 4 specified by the network vendor is registered in the table. The MID value of an ALL type 4 in this example is "001". Such an MID value is used by the network vendor to assign each data to either the satellite communication line or the wire communication line. In general, all the content elements are transmitted via a single connection.

In the initial condition, the client A and the server B in the second embodiment have no established connection therebetween as shown in FIGS. 40A through 40D.

Sequence of Second Embodiment

Figure 41:
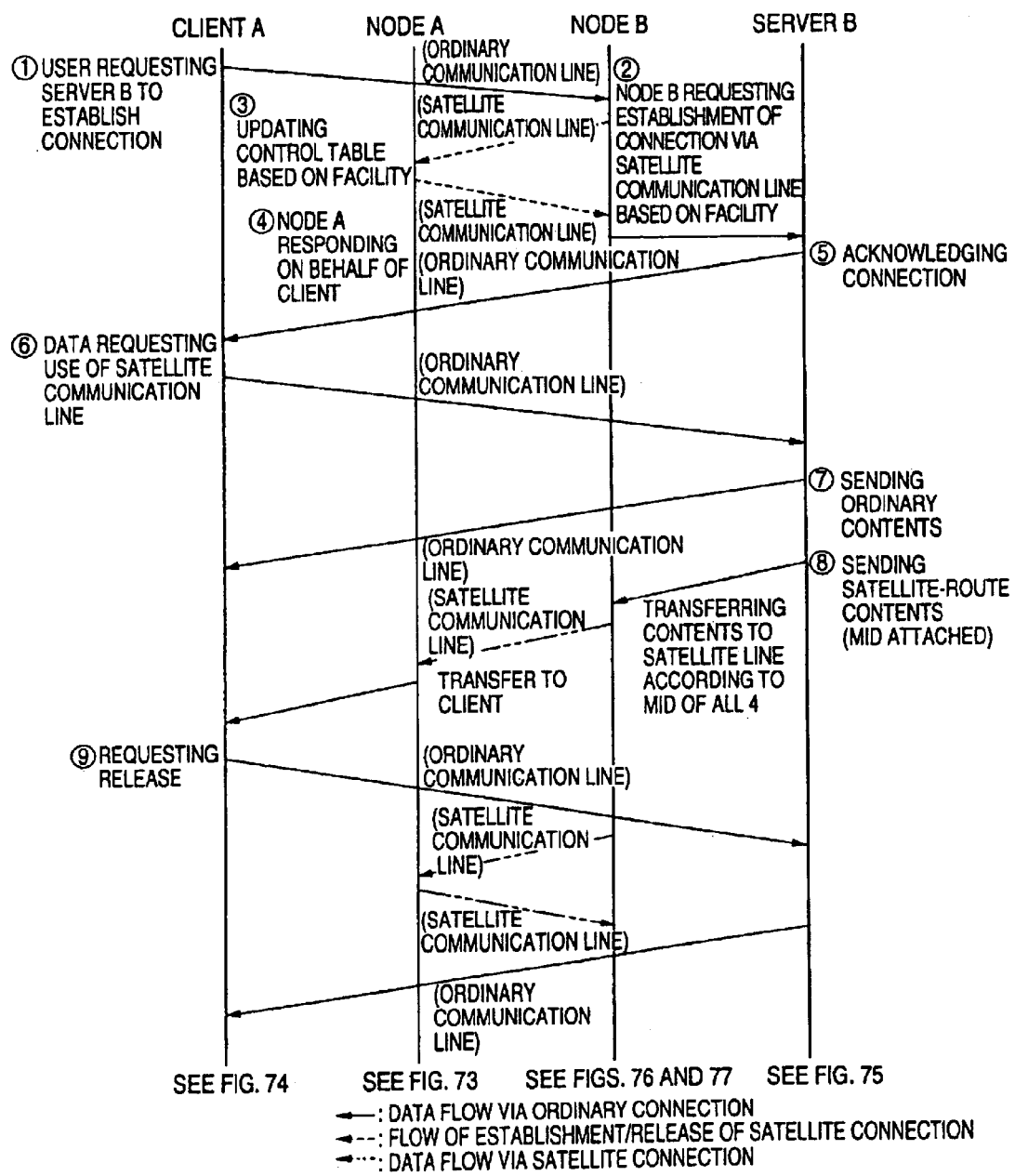
FIG. 41 is a sequence chart showing an operation sequence of the second embodiment of the present invention.

FIG. 41 is a sequence chart showing an operation sequence of the second embodiment of the present invention. In the following description, a number attached to the beginning of each description corresponds a number shown in the figure.

Figure 74:
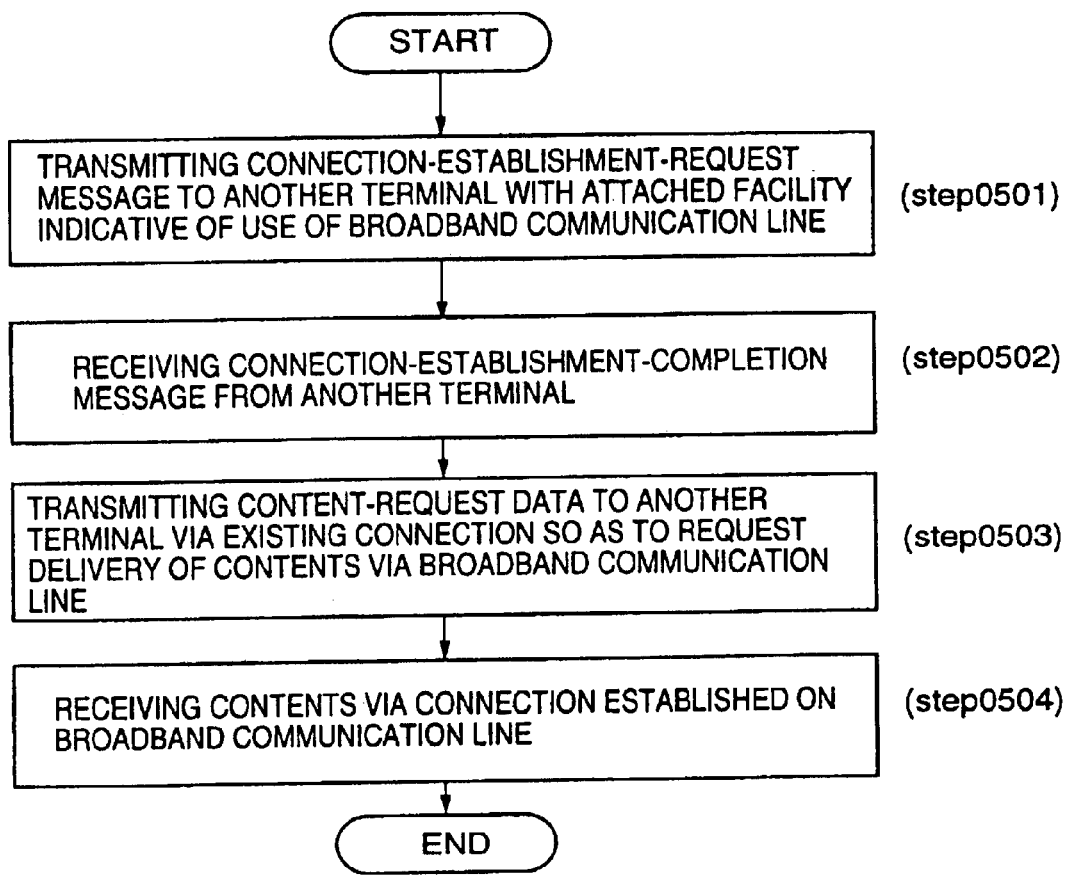
FIG. 74 is a flowchart of an operation of the client A according to the second embodiment of the present invention.
Figure 75:
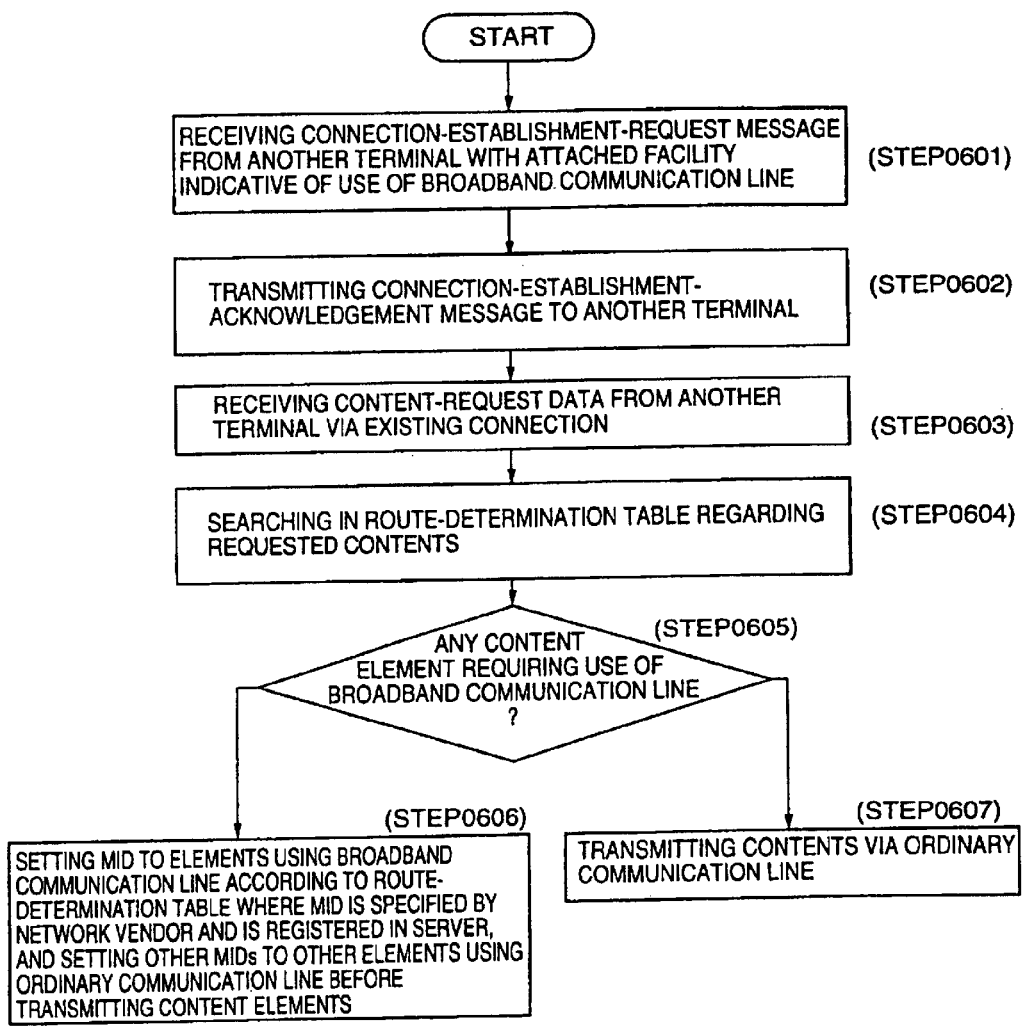
FIG. 75 is a flowchart of an operation of the sever B according to the second embodiment of the present invention.
Figure 76:
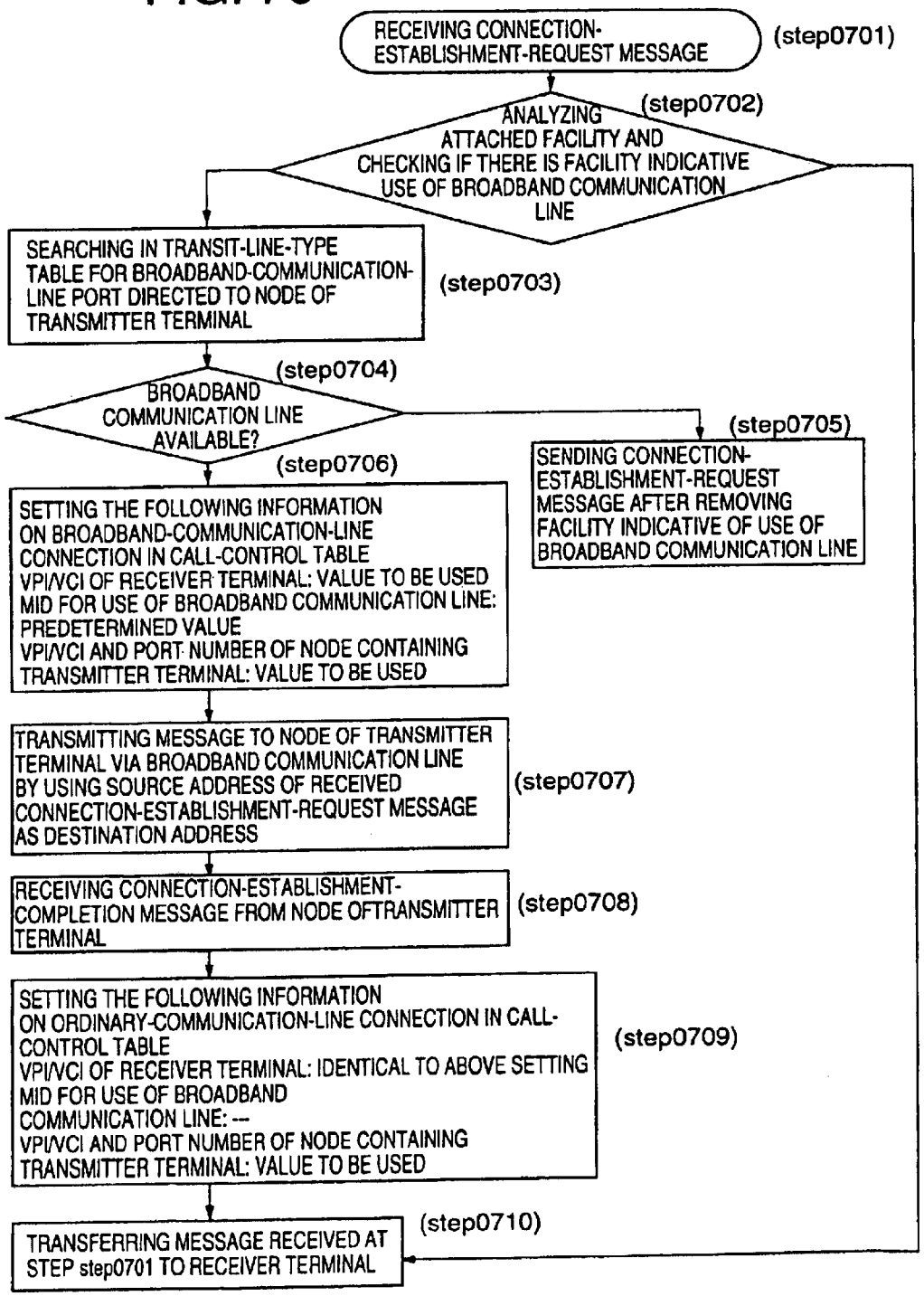
FIG. 76 is a flowchart of an operation of the node B at a time of connection establishment according to the second embodiment of the present invention.
Figure 77:
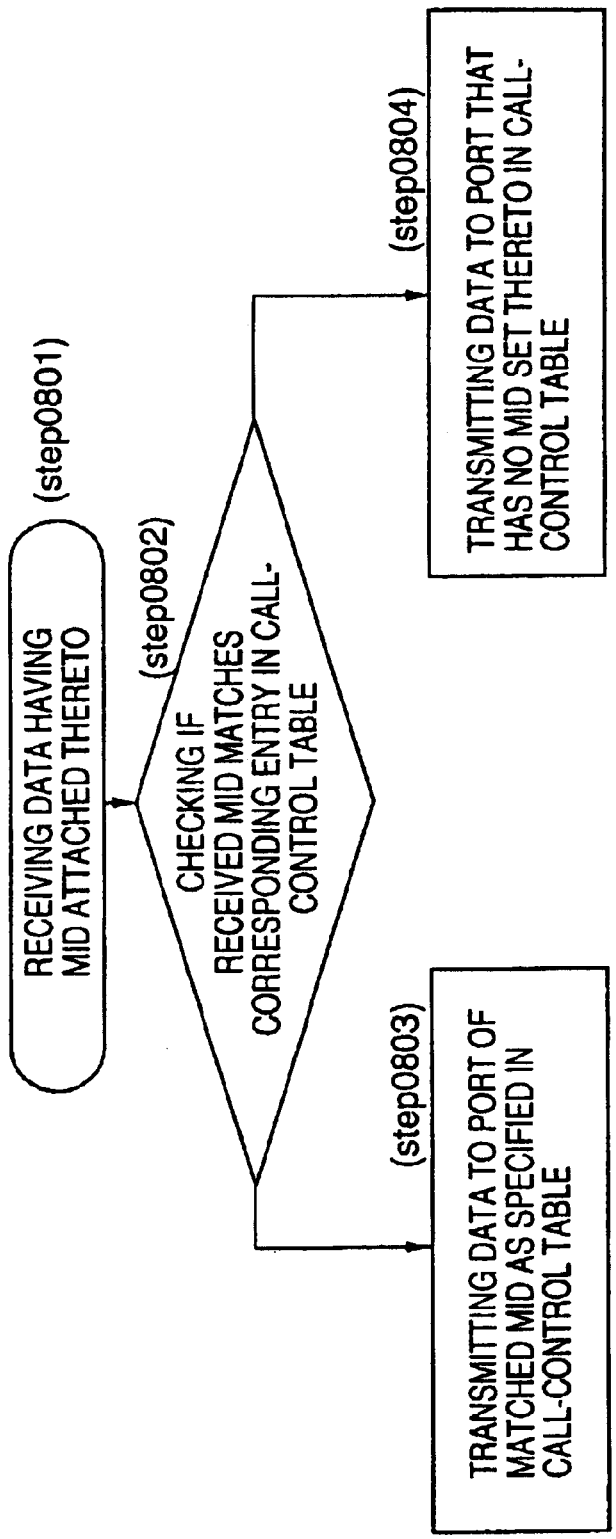
FIG. 77 is a flowchart of an operation of the node B at a time of data transfer according to the second embodiment of the present invention.

FIG. 74 is a flowchart of an operation of the client A according to the second embodiment of the present invention. FIG. 75 is a flowchart of an operation of the sever B according to the second embodiment of the present invention. FIG. 76 is a flowchart of an operation of the node B at a time of connection establishment according to the second embodiment of the present invention. FIG. 77 is a flowchart of an operation of the node B at a time of data transfer according to the second embodiment of the present invention. FIG. 73 shows the same flowchart as that used in the first embodiment since the same flowchart is applicable for describing the operation of the node A in the second embodiment.

1) Satellite-Route Connection Setting 1

Figure 42:
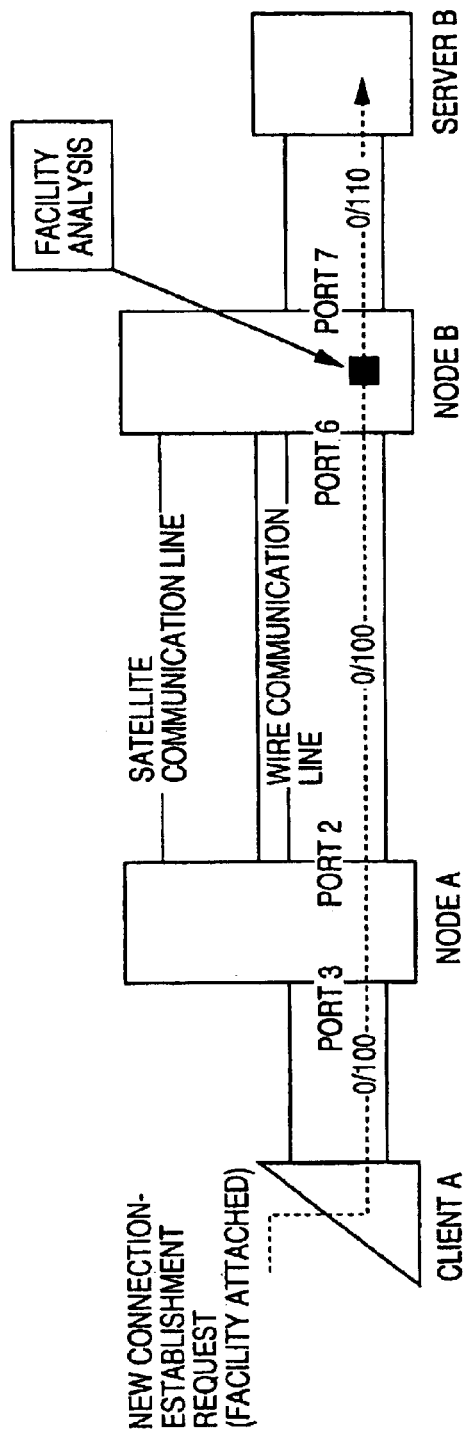
FIG. 42 is an illustrative drawing for explaining connection setting.

FIG. 42 is an illustrative drawing for explaining connection setting.

The client A with an ATM address aaa (source address) transmits a connection-establishment-request message to the server B having an ATM address bbb (destination address) in order to arrange delivery of contents. This connection-establishment-request message reaches the server B via a channel 0/100 between the client A and the node A (port 3), a channel 0/100 between the node A (port 2) and the node B (port 6), and a channel 0/110 between the node B (port 7) and the server B. As the message passes through each node, relevant information is written in the call-control table of each node. For example, the call-control tables of the node A and the node B have information written therein as shown in a first row of FIG. 43 in response to the passage of the connection-establishment-request message. Here, the client A attaches a facility to the connection-establishment-request message so as to indicate simultaneous use of a satellite communication line.

2) Satellite-Route Connection Setting 2

Figure 44:
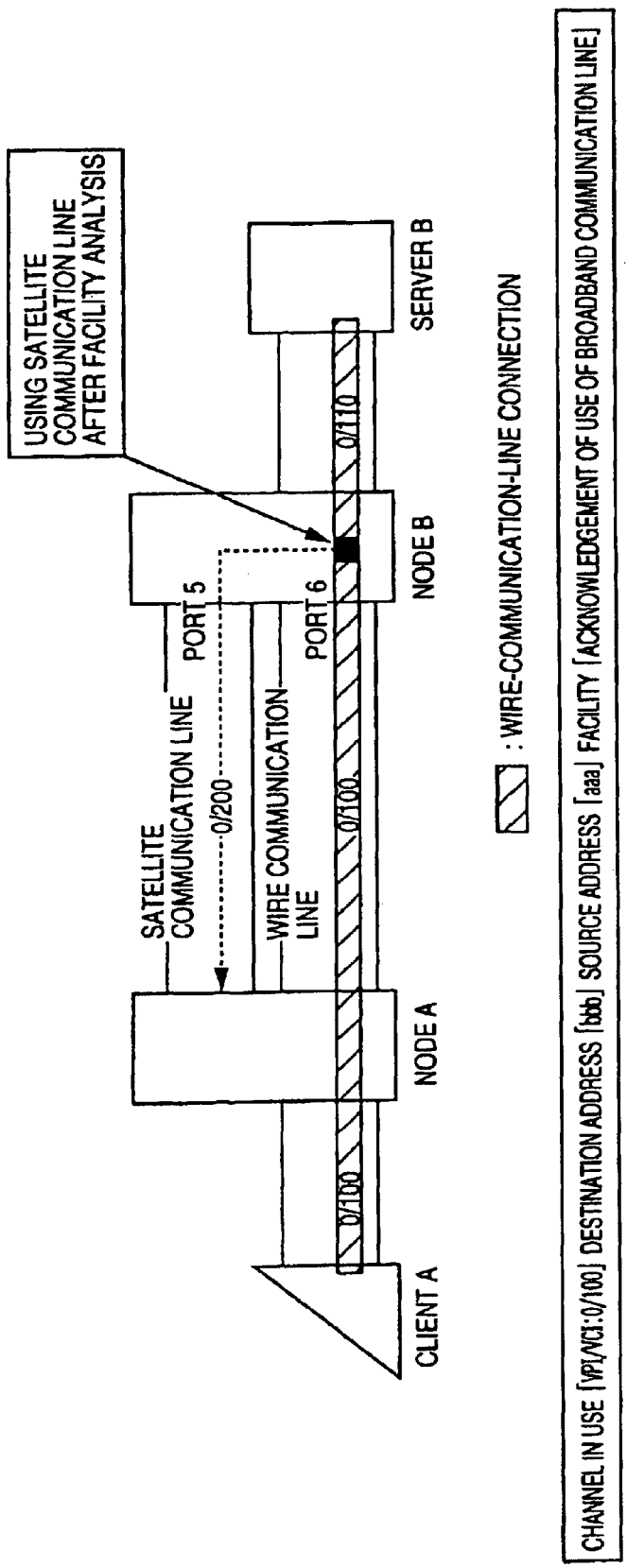
FIG. 44 is an illustrative drawing for explaining connection setting.

FIG. 44 is an illustrative drawing for explaining connection setting.

Having received the connection-establishment-request message, the node B analyzes the attached facility, and learns that a broadband communication line (satellite line) is to be used simultaneously. (See step 0701 and step 0702 of FIG. 76.)

If there is no facility indicating use of a broadband communication line, the message is forwarded to the receiver terminal as a general connection-establishment message. (See step 0710 of FIG. 76.)

If it turns out that a broadband communication line is to be used, a search begins to find a port for a broadband communication line (satellite line). By referring to a transit-line-type table of FIG. 45, it is learned that the port 5 can be used for the broadband communication line. (See step 0703 of FIG. 76.) FIG. 31 is an illustrative drawing showing the transit-line-type table.

Following this, a check is made as to whether there is available space in the satellite communication line. (See step 0704 of FIG. 76.)

If there is no available space, the connection-establishment-request message is sent to the receiver terminal after removing the facility indicating use of the broadband communication line. (See step 0705 of FIG. 76.)

If there is available space in the satellite communication line, a connection-establishment-request message is sent to the node A via the satellite communication line along with an attached facility indicative of use of the satellite communication line. A destination address of the connection-establishment-request message is a source address of an ordinary communication-establishment message that has been previously received. Further, the node B stores information about the broadband-communication connection in the call-control table as shown at a step step 0706 in FIG. 76. FIG. 46 is an illustrative drawing showing the call-control table. The new path entry in the call-control table is shown in the bottom row. (See step 0706 and step 0707 of FIG. 72.)

A channel used at this time between the node B and the server B is a channel 0/110 of an ordinary communication connection.

3) Satellite-Route Connection Setting 3

Figure 47:
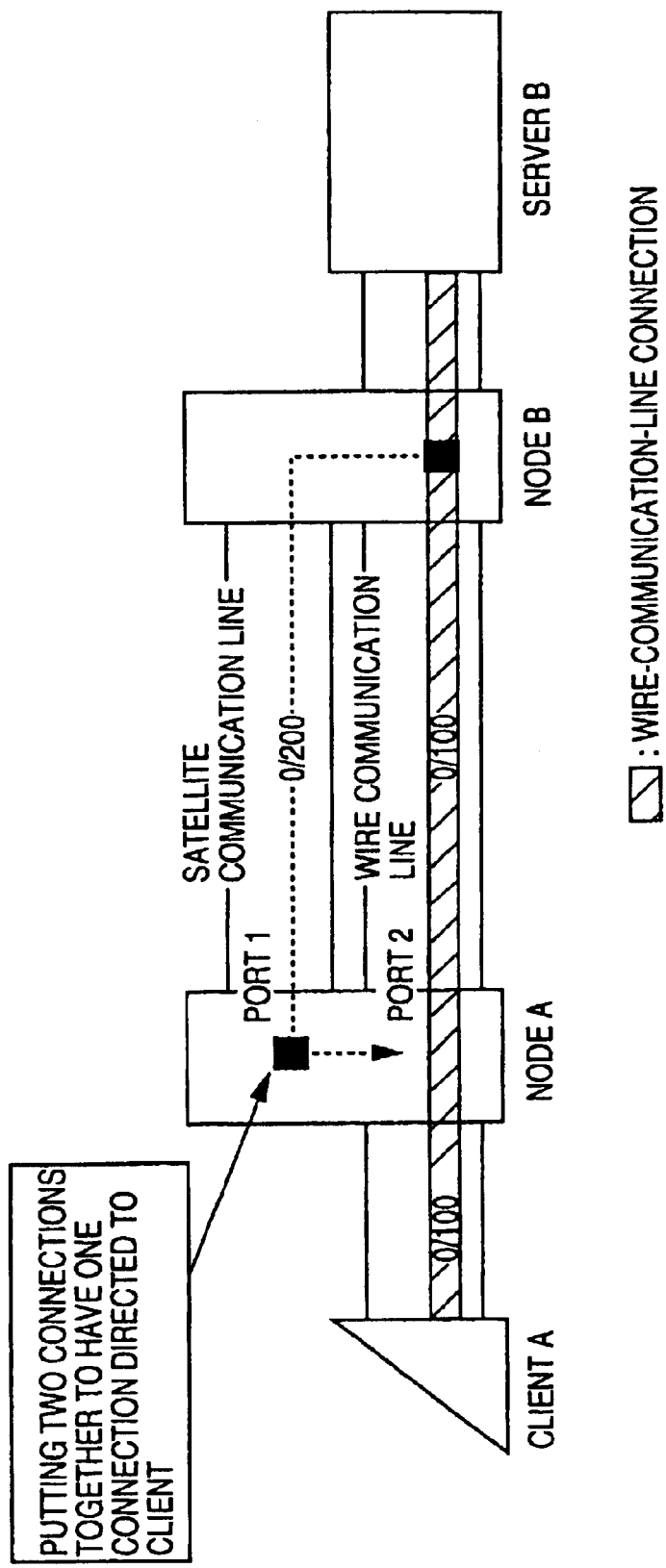
FIG. 47 is an illustrative drawing for explaining connection setting.

FIG. 47 is an illustrative drawing for explaining connection setting.

When receiving the connection-establishment-request message via the satellite communication line, the node A analyzes the attached facility, and learns that the message is a request for establishing a connection on a broadband communication line. (See step 0401 and step 0402 of FIG. 73.)

If there is no facility requesting use of a broadband communication line, the message is forwarded to the receiver terminal as a general connection-establishment message. (See step 0403 of FIG. 73.)

If the facility requesting use of a broadband communication line is confirmed, the node A searches in the call-control table thereof by using the transmitter and receiver addresses of the message as search keys. (See step 0404 of FIG. 73.)

If a connection that matches the combination of the addresses (without regard to which is the transmitter address and which is the receiver address) is found as a result of the search, the same VPI/VCI as the existing connection is assigned to provide a connection directed to the receiver terminal (client A). As a consequence, the contents traveling through the satellite connection from the server B and the contents traveling through the wire connection from the server B are transferred via the same channel 0/100 between the node A and the client A. Further, the node A adds information on a new broadband-communication connection to the call-control table as shown in a step step 0405 of FIG. 73. FIG. 48 is an illustrative drawing showing the call-control table. The additional path entry is shown in the bottom row. Since the new connection is implemented as a satellite communication line, the call-control table of FIG. 48 has the entry "special" in the field for indicating a type at the bottom row. (See step 0405 of FIG. 73.)

If there is no existing connection showing a match, a message denying the connection-establishment request is transmitted to the transmitter terminal. (See step 0406 of FIG. 73).

5) Establishing Satellite-Link Connection

Figure 49:
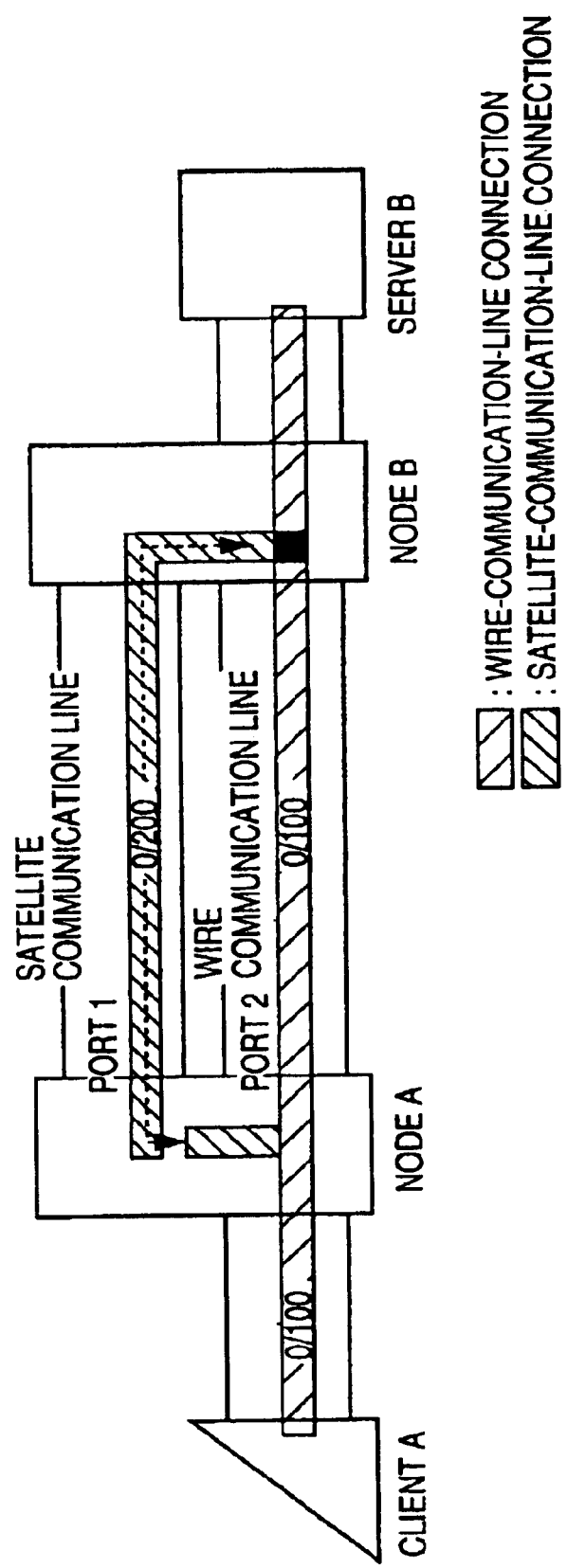
FIG. 49 is an illustrative drawing for explaining connection establishment.

FIG. 49 is an illustrative drawing for explaining connection establishment.

If the same combination of addresses as the one included in the message is found in the search of the sequence 4) described above, the node A transmits a connection-establishment-completion message on behalf of the client A to the transmitter terminal. (See step 0407 and step 0408 of FIG. 73 and step 0708 of FIG. 76.)

The node B receives the connection-establishment-completion message from the node A. With this, a broadband communication connection is established between the node A and node B. The connection-establishment-request message that has been sent from the client A via an ordinary communication line is then transmitted to the server B. At this point of time, the ordinary communication connection has settings thereof made as shown in the top row of FIG. 46.

Namely, by the time the connection-establishment-request message from the client A reaches the server B, a path of the broadband communication line has been already established between the node A and the node B. (See step 0709 and step 0710 of FIG. 76.)

5) Establishing Normal Communication Connection

Having received the connection-establishment-request message from the node B with the attached facility indicative of use of a broadband communication line, the server B transmits a connection-establishment-acknowledgement message to the client A (See step 0601 and step 0602 of FIG. 75 and step 0502 of FIG. 74.)

6) Transmission of Requested Content Data

Figure 51:
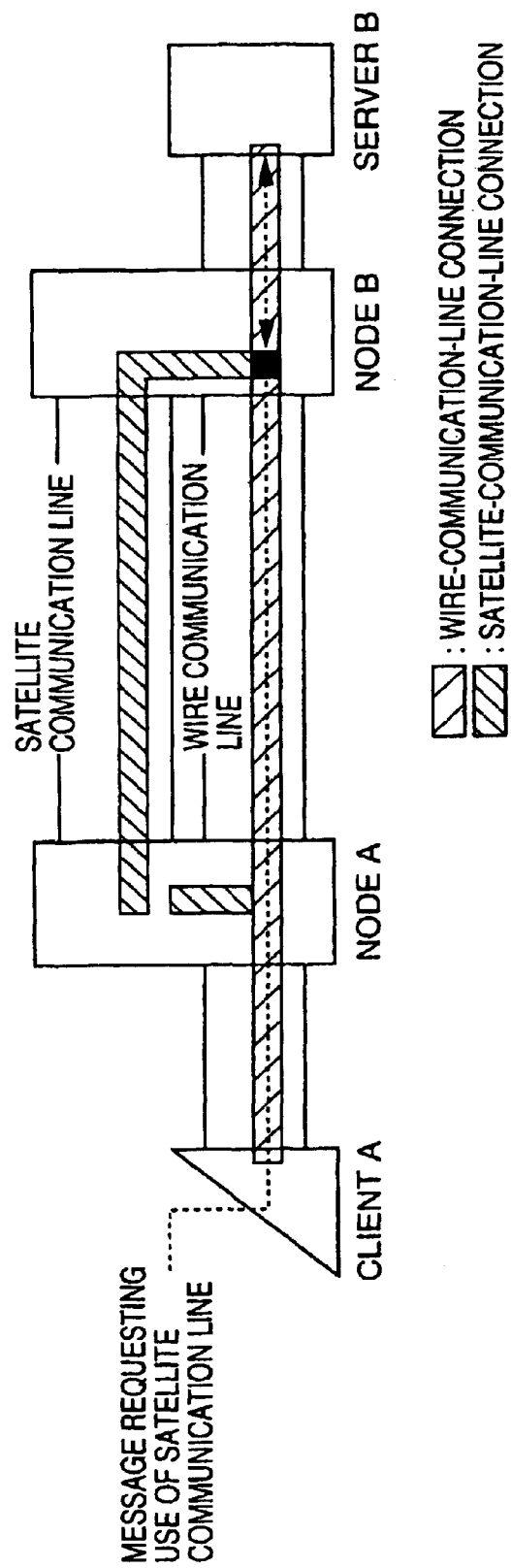
FIG. 51 is an illustrative drawing for explaining transmission of requested contents.

FIG. 51 is an illustrative drawing for explaining transmission of requested contents.

The client A issues a request via the ordinary communication connection to request delivery of contents X that require use of the broadband communication line. (See step 0503 of FIG. 74 and step 0603 of FIG. 75.)

7) & 8) Data Transfer (transfer of contents requiring use of an ordinary communication line)

Figure 52:
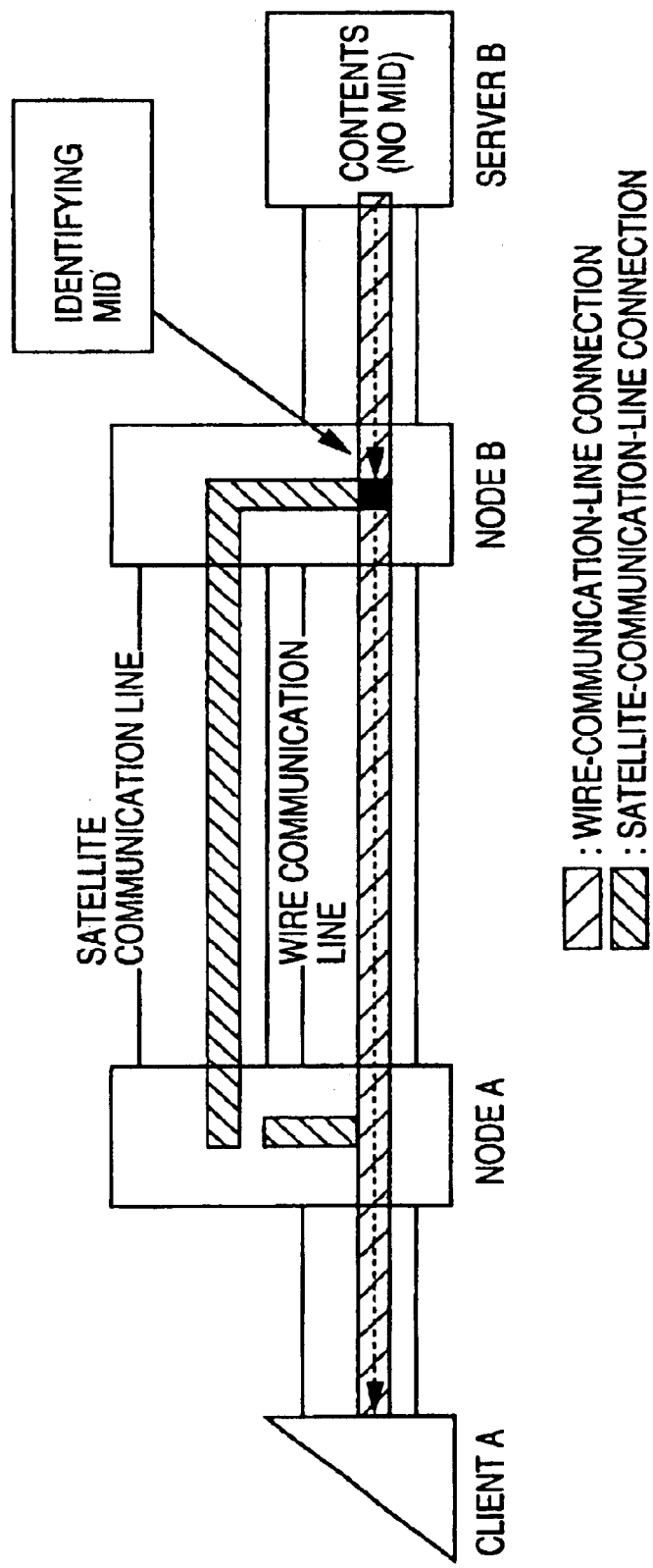
FIG. 52 is an illustrative drawing for explaining transfer of contents requiring use of an ordinary communication line.

FIG. 52 is an illustrative drawing for explaining transfer of contents requiring use of an ordinary communication line.

As will be described later, the server B attaches a special MID value to contents if the contents require use of the broadband communication line. As for other contents that require use of an ordinary communication line, the node B checks an MID value of these contents, and transfers them via the wire communication line to the node A after learning that they do not require use of the satellite communication line.

Data Transfer (transfer of contents requiring use of a broadband communication line)

Figure 53:
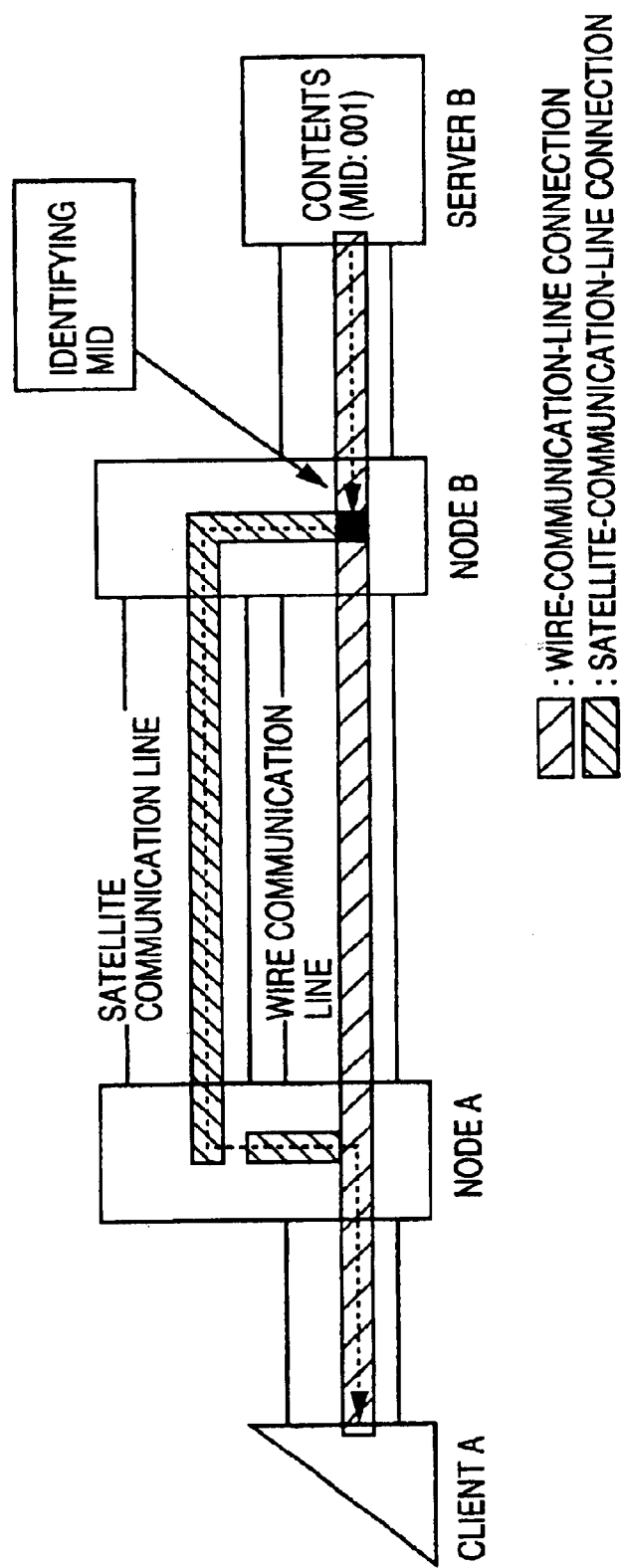
FIG. 53 is an illustrative drawing for explaining transfer of contents requiring use of a broadband communication line.

FIG. 53 is an illustrative drawing for explaining transfer of contents requiring use of a broadband communication line.

Upon receiving content-request data requesting transfer of contents X, the server B searches in the route-determination table relevant to the contents X in order to check if there is a content element that requires use of the broadband communication line. If there is none, all the contents X are transmitted with an ordinary MID attached thereto. In an example of the route-determination table for the contents X of the server B as shown in FIG. 50, content element 1 and content element 3 are supposed to be transmitted via an ordinary communication line whereas content element 2 is supposed to be transferred via a broadband communication line. (See step 0604 and step 0605 of FIG. 75.)

In this example, the ordinary channel 0/110 is used between the server B and the node B with respect to the content element 2 requiring use of the broadband communication line.

When sending the content element 1 or the content element 3, the server B sets an MID value to any value other than that specified by the network vendor ("001" in this example) before sending the content elements to the node B (step 0607 of FIG. 75).

The node B monitors the MID all the time. When data has an MID that is different from the one ("001") that is registered in the call-control table, the data is transmitted to the ordinary communication line (wire line in this configuration) based on the call-control table. (See step 0801, step 0802, and step 0804 of FIG. 77.)

When sending the content element 2, the server B sets an MID value to the one ("001") that is specified by the network vendor (step 0606 of FIG. 75).

The node B monitors the MID all the time. When data has the MID ("001") that is registered in the call-control table, the data is transmitted to the satellite communication line according to the call-control table (step 0803 of FIG. 77).

Figure 54:
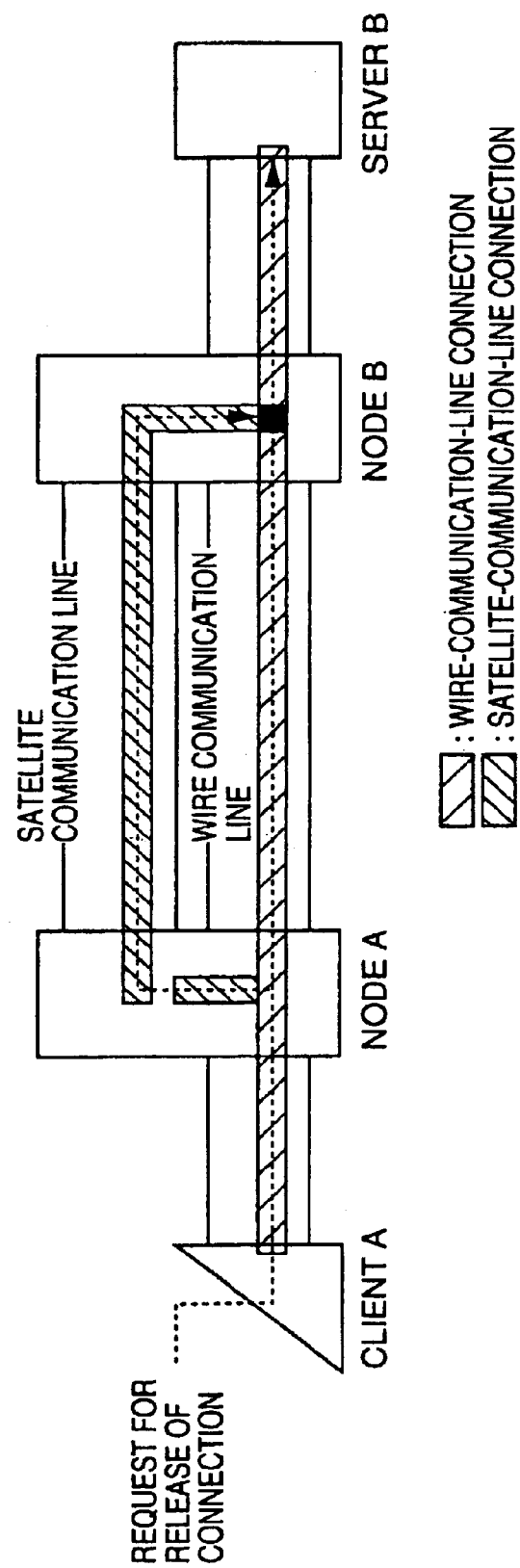
FIG. 54 is an illustrative drawing for explaining release of communication connections.

The node A forwards data received from the node B to the client A without making any change to the data (step 0504 of FIG. 74). ps 9) Release Request FIG. 54 is an illustrative drawing for explaining release of communication connections.

The ordinary-communication-line connection is released in response to a connection-release request from the client A. In association with the releasing of the ordinary communication connection, a satellite-communication-line connection is also released at the same time.

Third Embodiment

Figure 83:
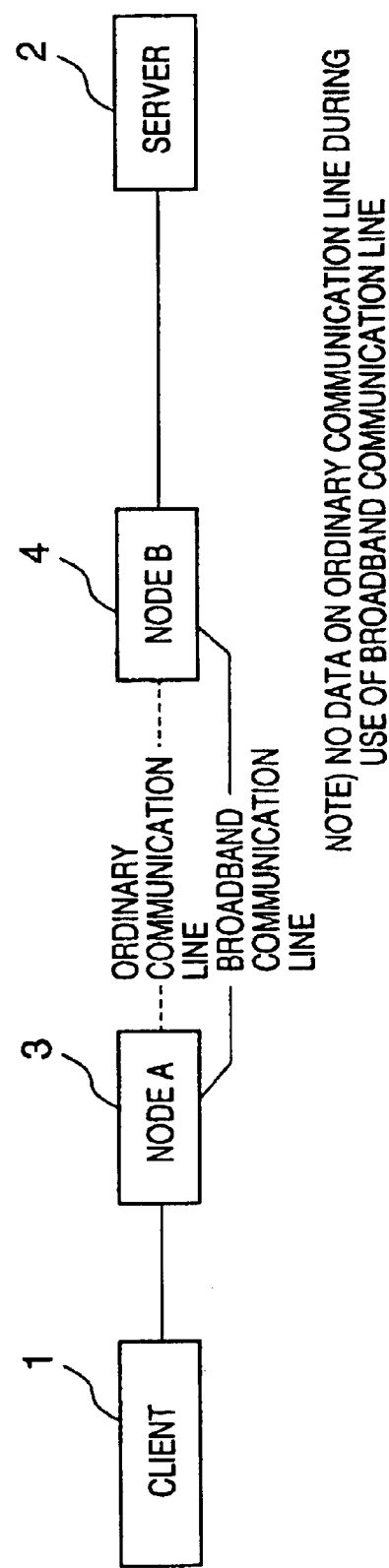
FIG. 83 is an illustrative drawing showing a configuration of communication lines according to the third embodiment of the present invention.

FIG. 83 is an illustrative drawing showing a configuration of communication lines according to a third embodiment of the present invention.

The client 1 issues a request via an ordinary-communication-line to the server 2 to request delivery of contents via a satellite line. In response, the node B establishes a line as shown in FIG. 83 between the node A and the node B by switching an existing connection to a broadband-communication-line connection. After this, the client 1 requests the server 2 to deliver specified contents. In response, the server 2 transmit the specified contents via the broadband communication line.

Requirements of Third Embodiment

Initial conditions (requirements) are the same as those of the first embodiment as shown in FIGS. 26B through 26D. Since use of a broadband communication line is initiated by the client, the route-determination table in the server is not used in the third embodiment.

Sequence of Third Embodiment

Figure 55:
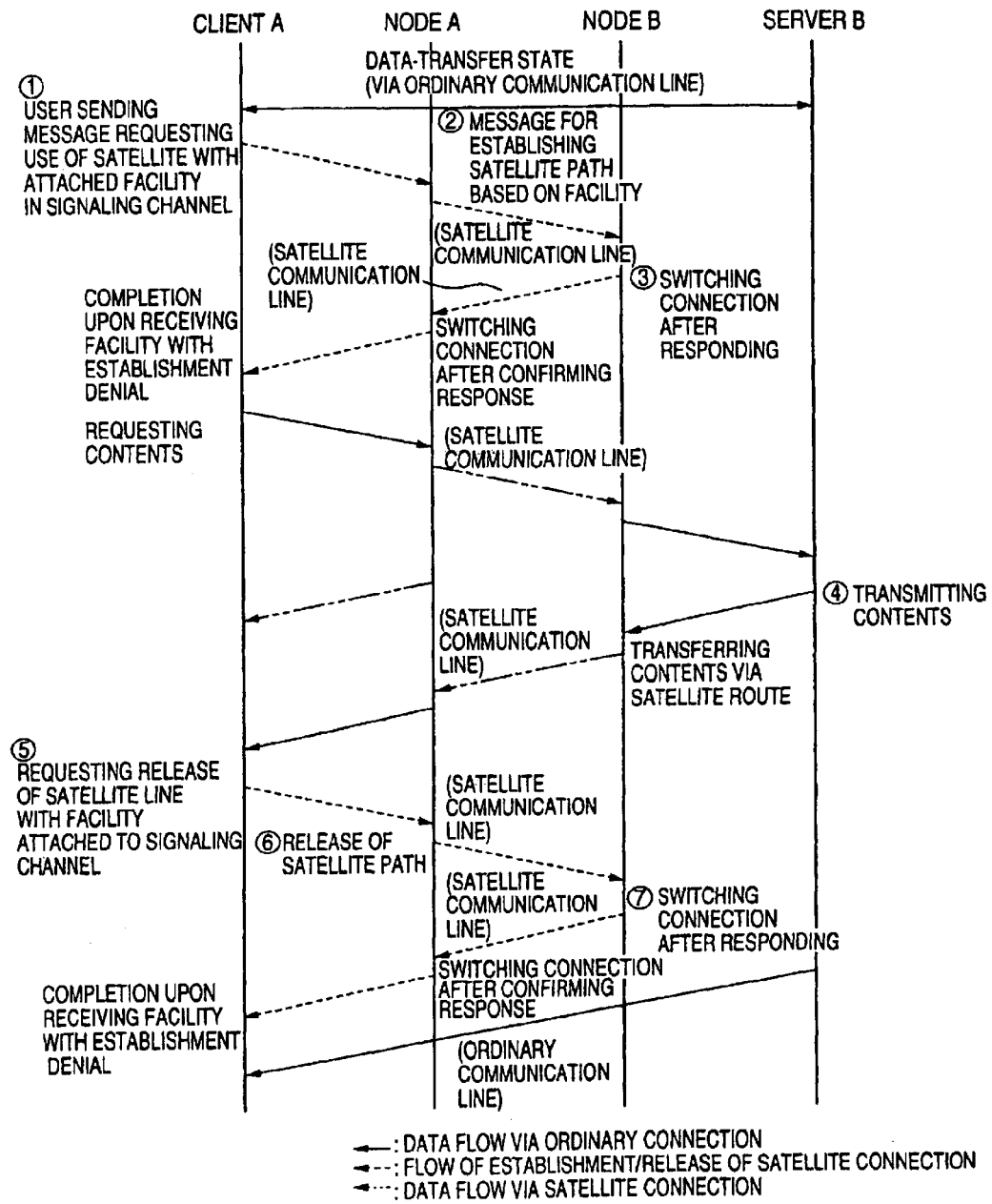
FIG. 55 is a sequence chart showing an operation sequence of a third embodiment of the present invention.

FIG. 55 is a sequence chart showing an operation sequence of the third embodiment of the present invention.

In the following description, a number attached to the beginning of each description corresponds a number shown in the figure.

Figure 78:
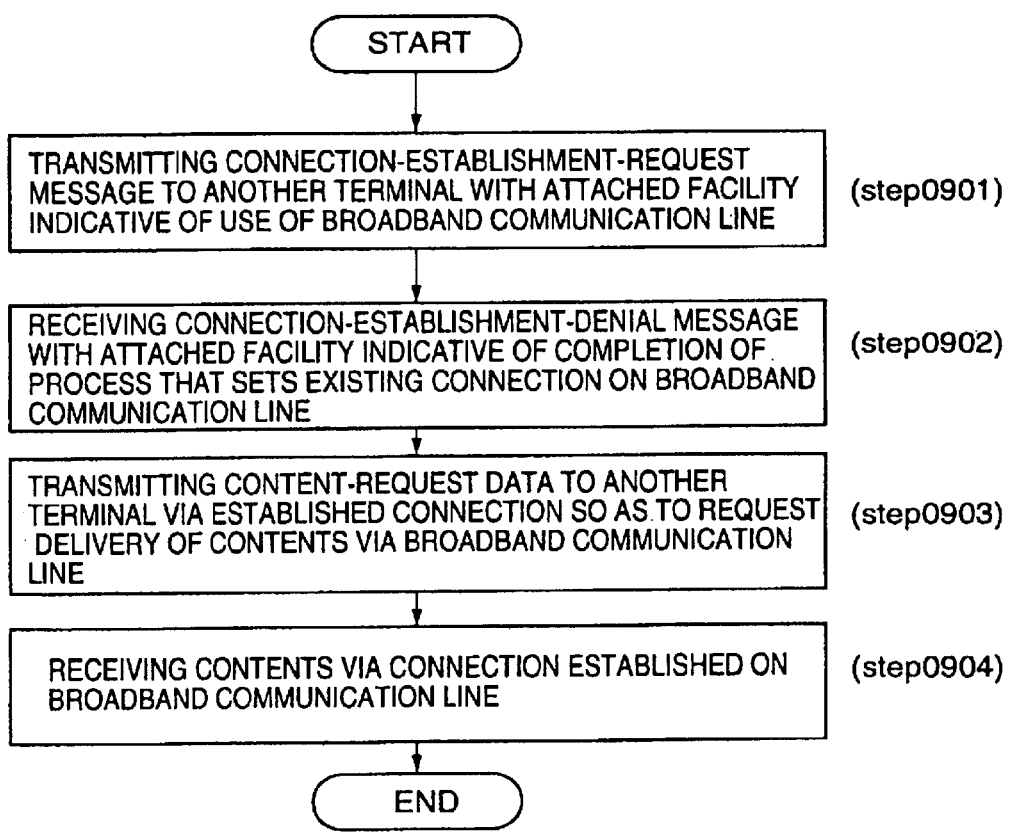
FIG. 78 is a flowchart of an operation of the client A according to the third embodiment of the present invention.
Figure 79:
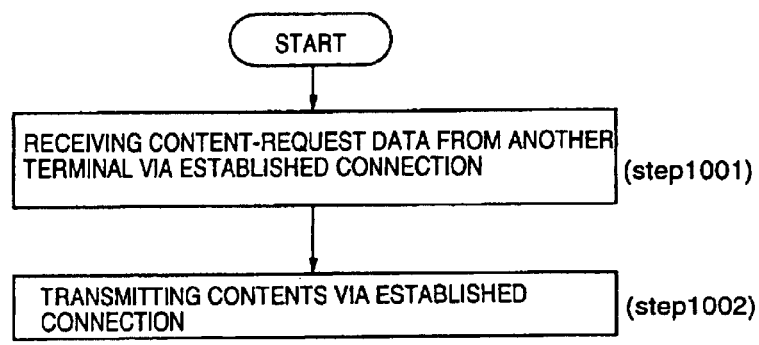
FIG. 79 is a flowchart of an operation of the server B according to the third embodiment of the present invention.
Figure 80:
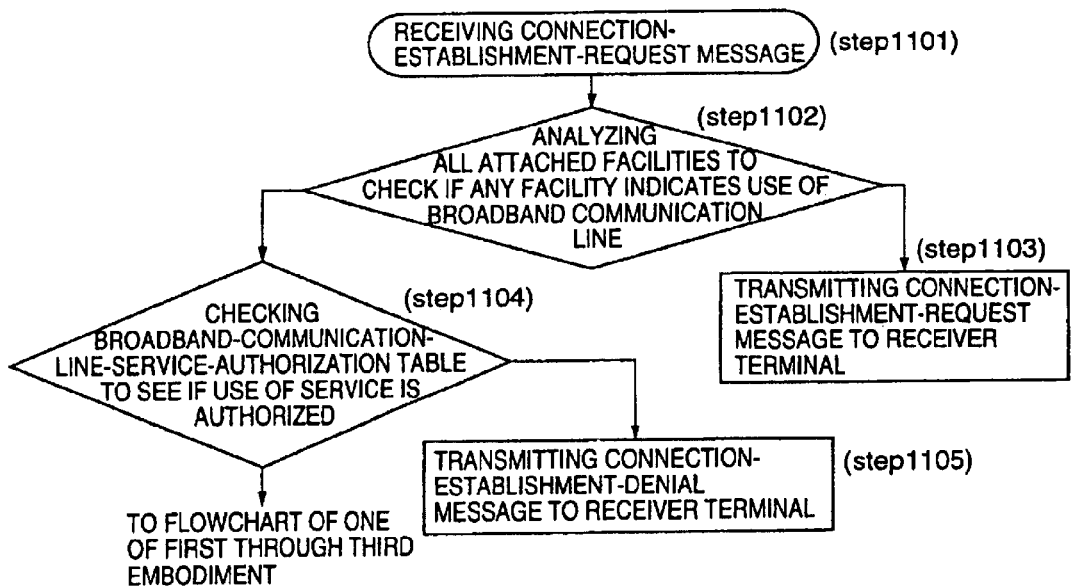
FIG. 80 is a flowchart of an operation of the node B at a time of connection establishment according to the third embodiment of the present invention.

FIG. 78 is a flowchart of an operation of the client A according to the third embodiment of the present invention. FIG. 79 is a flowchart of an operation of the server B according to the third embodiment of the present invention. FIG. 80 is a flowchart of an operation of the node B at a time of connection establishment according to the third embodiment of the present invention. FIG. 72 and FIG. 73 were used in connection with the description of the first embodiment, and are also used as flowcharts of operations of the node B and the node A, respectively, of the third embodiment.

1) Connection Request

Figure 56:
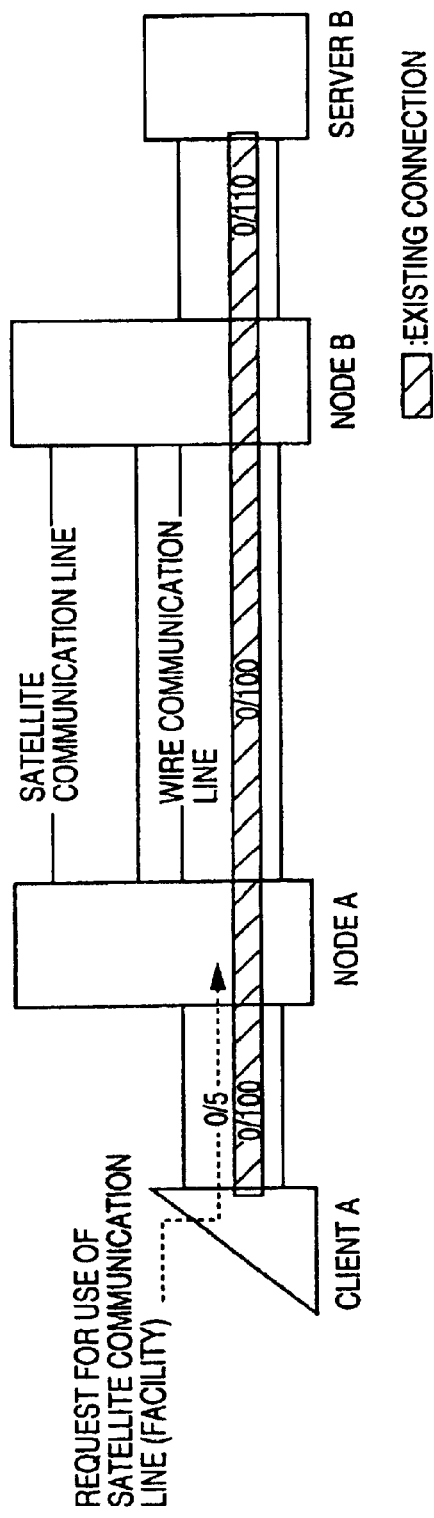
FIG. 56 is an illustrative drawing for explaining a connection request.

FIG. 56 is an illustrative drawing for explaining a connection request.

The client A with an ATM address aaa (source address) presents a screen menu or the like which is provided from the server B via an existing connection, and invites an input on the screen menu. In response to a relevant input, the client A sends a request for a switch from a wire line to a satellite line. Namely, the client A sends a connection-establishment-request message to the server B having an ATM address bbb (destination address) by using a signaling channel (VPI=0, VCI=5) along with an attached facility indicating use of a broadband communication line and a switch from an ordinary communication line to a broadband communication line. (See step 0901 of FIG. 78.)

2) Satellite-Route Connection Setting 1

Figure 57:
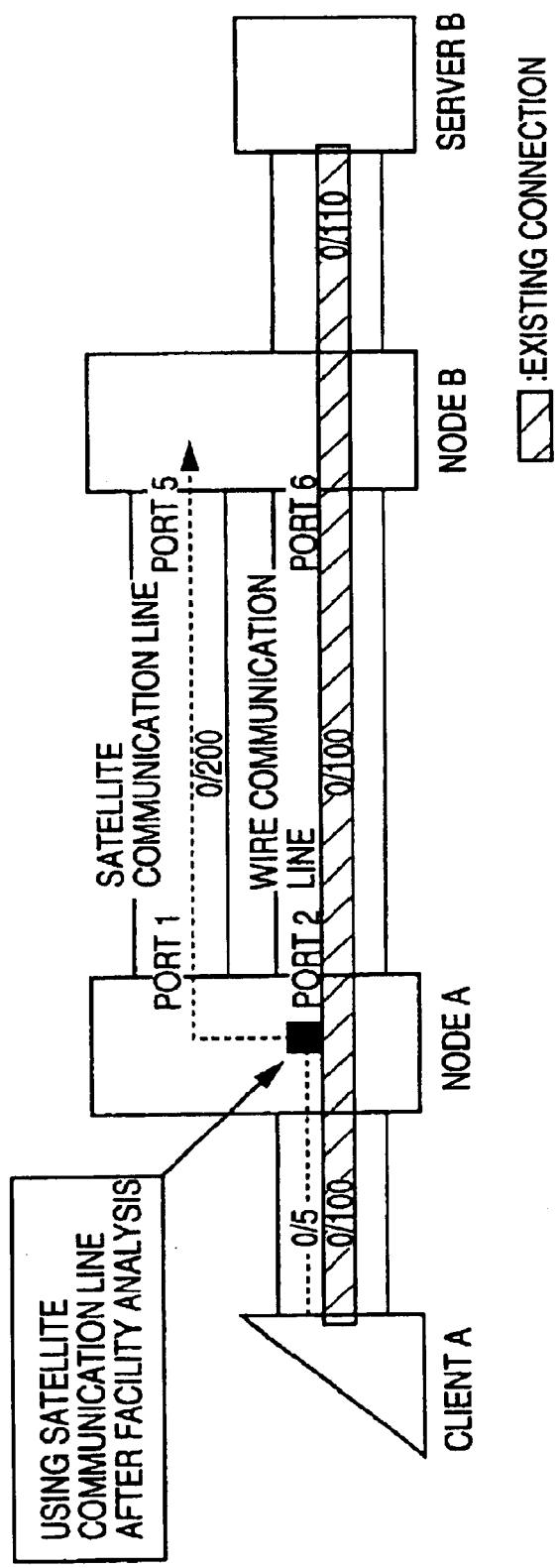
FIG. 57 is an illustrative drawing for explaining connection setting.

FIG. 57 is an illustrative drawing for explaining connection setting.

Having received the connection-establishment-request message, the node B analyzes the attached facility, and learns that a broadband communication line is to be used. If there is no facility indicating use of a broadband communication line, the message is forwarded to the receiver terminal as a general connection-establishment message. (See step 0301–step 0303 of FIG. 72.)

The call-control table of the node B is then searched by using the transmitter/receiver addresses of the message as search keys. (See step 0304 of FIG. 72.)

If there is an existing connection which provides a match in terms of a combination of addresses (i.e., a transmitter address and a receiver address are interchangeable in determining a match), it is ascertained that the message is a request for a new connection in order to use a broadband communication line in addition to an ordinary communication line. Thus, a search for a port of a satellite communication line is started.

FIG. 58 is an illustrative drawing showing a transit-line-type table.

Consulting the transit-line-type table of FIG. 58, the node B learns that the port 1 can be used for a broadband communication line. Then, the node B checks if there is available space in the satellite communication line. (See step 0305 and step 0306 of FIG. 72.)

If there is no available space or if there is no appropriate existing connection, a message denying the connection-establishment request is sent to the transmitter terminal. (See step 0307 of FIG. 72.)

Finally, information on the new path using the satellite communication line is added to the call-control table. FIG. 59 is an illustrative drawing showing the call-control table. The new path entry is shown in the bottom row. Further, the connection-establishment-request message is transmitted to the node A via the satellite communication line. (See step 0308 and step 0309 of FIG. 72.)

3) Satellite-Route Connection Setting 2

Figure 60:
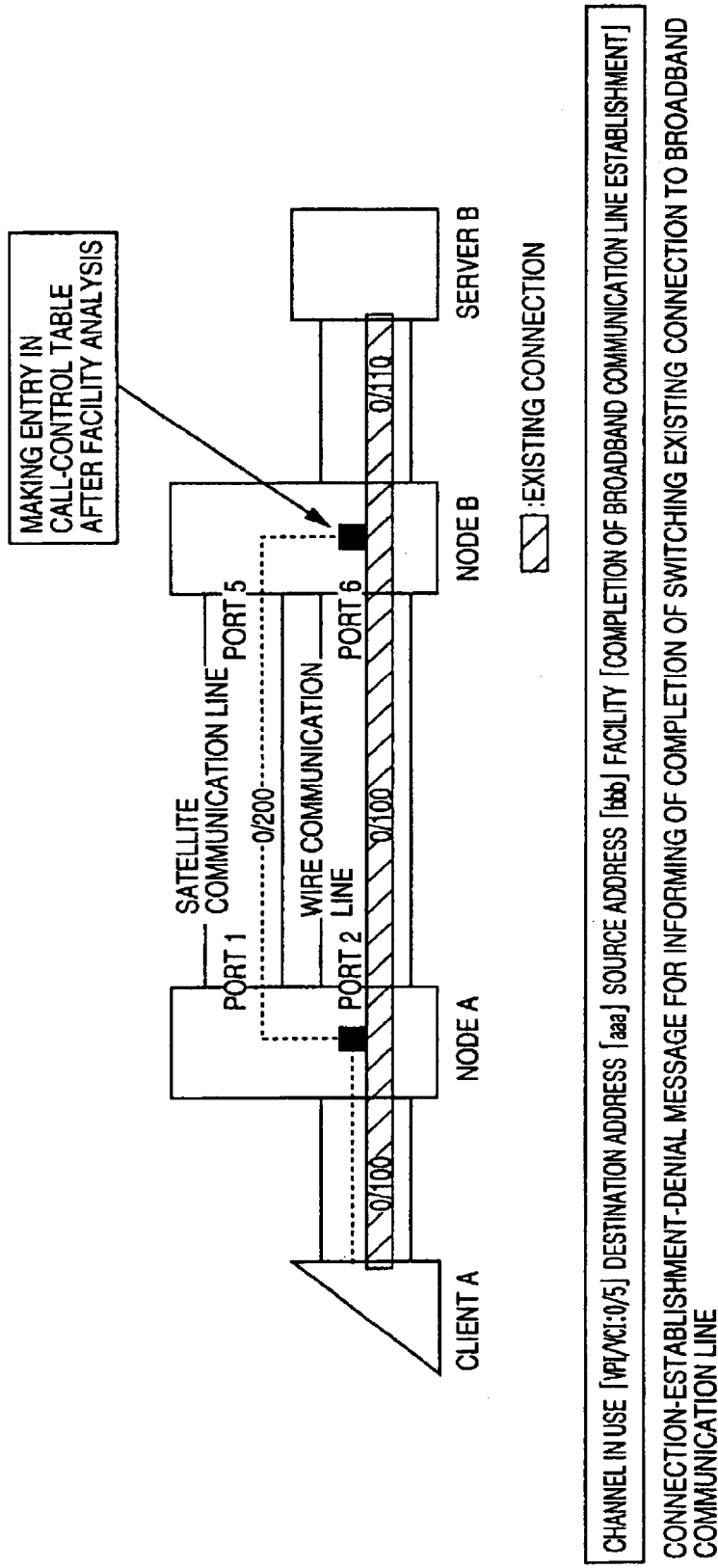
FIG. 60 is an illustrative drawing for explaining setting of a satellite-route connection.

FIG. 60 is an illustrative drawing for explaining setting of a satellite-route connection.

When receiving the connection-establishment-request message via the satellite communication line, the node A analyzes the attached facility, and learns that the message is a request for establishing a connection on a broadband communication line. (See step 0401 and step 0402 of FIG. 73.)

If there is no facility requesting use of a broadband communication line, the message is forwarded to the receiver terminal as a general connection-establishment message. (See step 0403 of FIG. 73.)

If the facility requesting use of a broadband communication line is confirmed, the node A searches in the call-control table thereof by using the transmitter and receiver addresses of the message as search keys. (See step 0404 of FIG. 73.)

If a connection that matches the combination of the addresses (without regard to which is the transmitter address and which is the receiver address) is found as a result of the search, the node A adds information on a new broadband-communication-line connection to the call-control table (step 0405 of FIG. 73). FIG. 61 is an illustrative drawing showing the call-control table. The additional path entry is shown in the bottom row of the table.

If there is no existing connection showing a match, a message denying the connection-establishment request is transmitted to the transmitter terminal. (See step 0406 of FIG. 73).

Further, a connection-establishment-denial message having a facility indicative of completion of a process that switches to a broadband communication line is sent to the client A via the node A. A connection-establishment-completion message of an ordinary kind is not transmitted in this case. If such a connection-establishment-completion message is delivered to the client A, the client A may be mislead to believe that a new connection has been established. Because of this reason, the connection-establishment-denial message having a facility indicative of completion of a process that switches to a broadband communication line is used for notifying the client A that a satellite-communication connection has been established between the nodes. (See step 0407 and step 0408 of FIG. 73 and step 0902 of FIG. 78.)

4) Data Transfer

Figure 62:
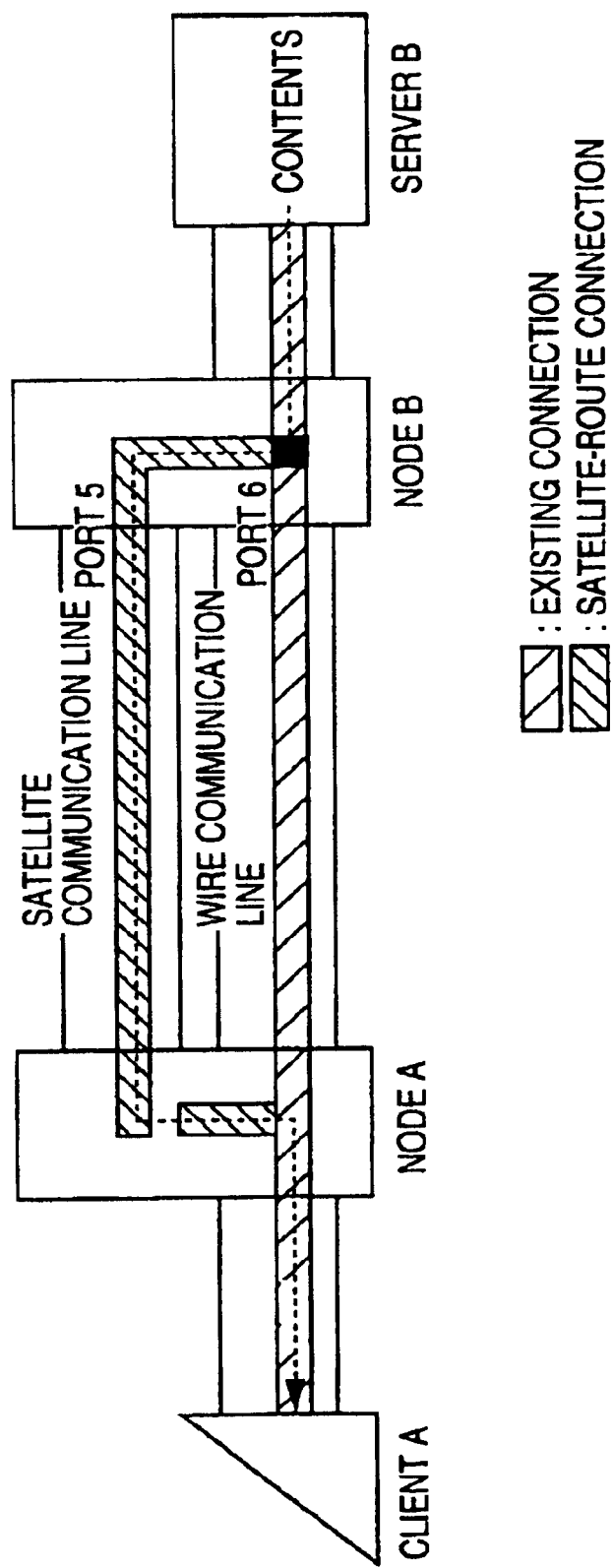
FIG. 62 is an illustrative drawing for explaining data transfer.

FIG. 62 is an illustrative drawing for explaining data transfer.

The server B having received content-request data from the client A transmits the requested contents to the node B via the existing connection.

The node B then transmits the contents from the server B to a line (satellite line) that has a type "special" in the field for specifying a type in the call-control table. (See step 1010 and step 1002 of FIG. 79).

5) Request for Release of Satellite Connection

Figure 63:
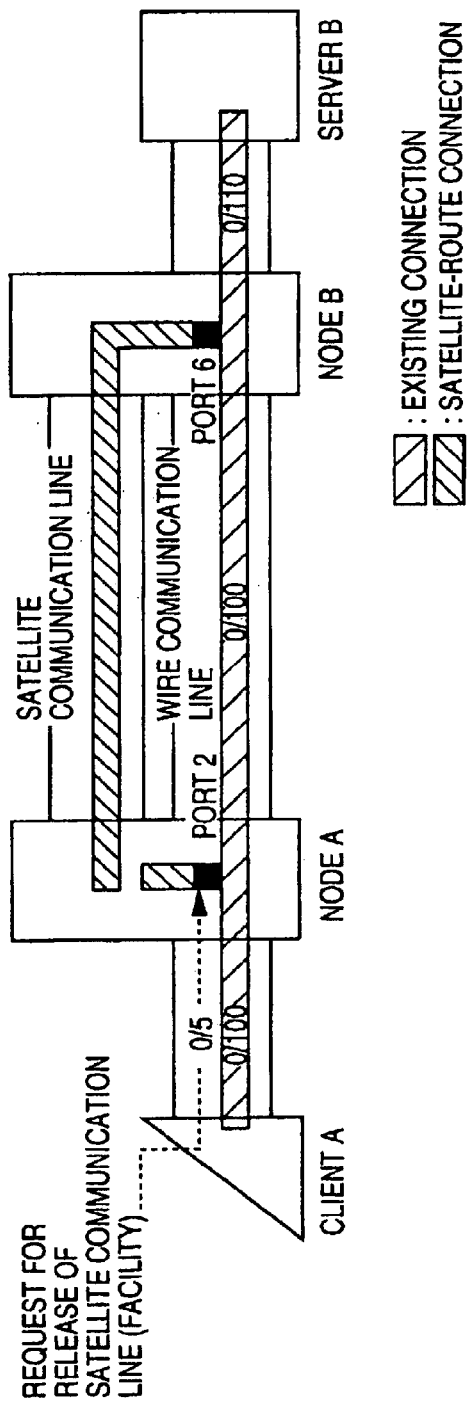
FIG. 63 is an illustrative drawing for explaining release of a satellite-communication connection.

FIG. 63 is an illustrative drawing for explaining release of a satellite-communication connection.

In order to release the satellite communication line, the client A sends the node A a connection-release-request message with an attached facility requesting the release thereof by using a signaling channel.

6) Release of Satellite-Route Connection 1

Figure 64:
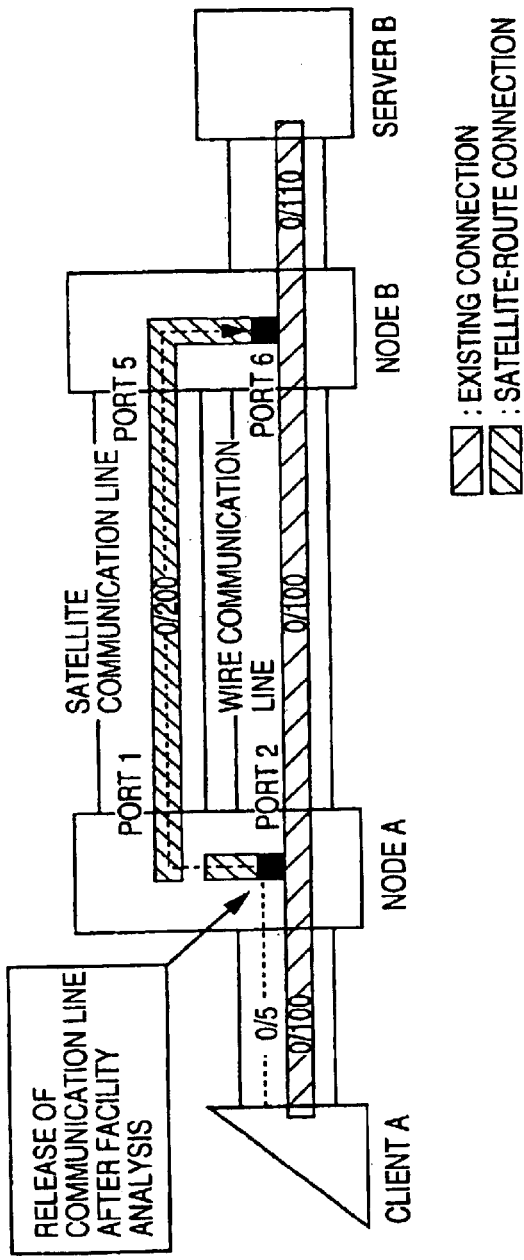
FIG. 64 is an illustrative drawing for explaining release of a satellite-route connection.

FIG. 64 is an illustrative drawing for explaining release of a satellite-route connection.

The node A analyzes the facility requesting release of the satellite-communication connection, and learns that it is requested to release the satellite line between the node A and the node B. The node A sends a connection-release message with a facility attached thereto to the node B via the satellite line. Further, relevant information is removed from the call-control table. FIG. 65 is an illustrative drawing of the call-control table, from which a relevant entry is removed as shown in the bottom row.

7) Release of Satellite-Route Connection 2

Figure 66:
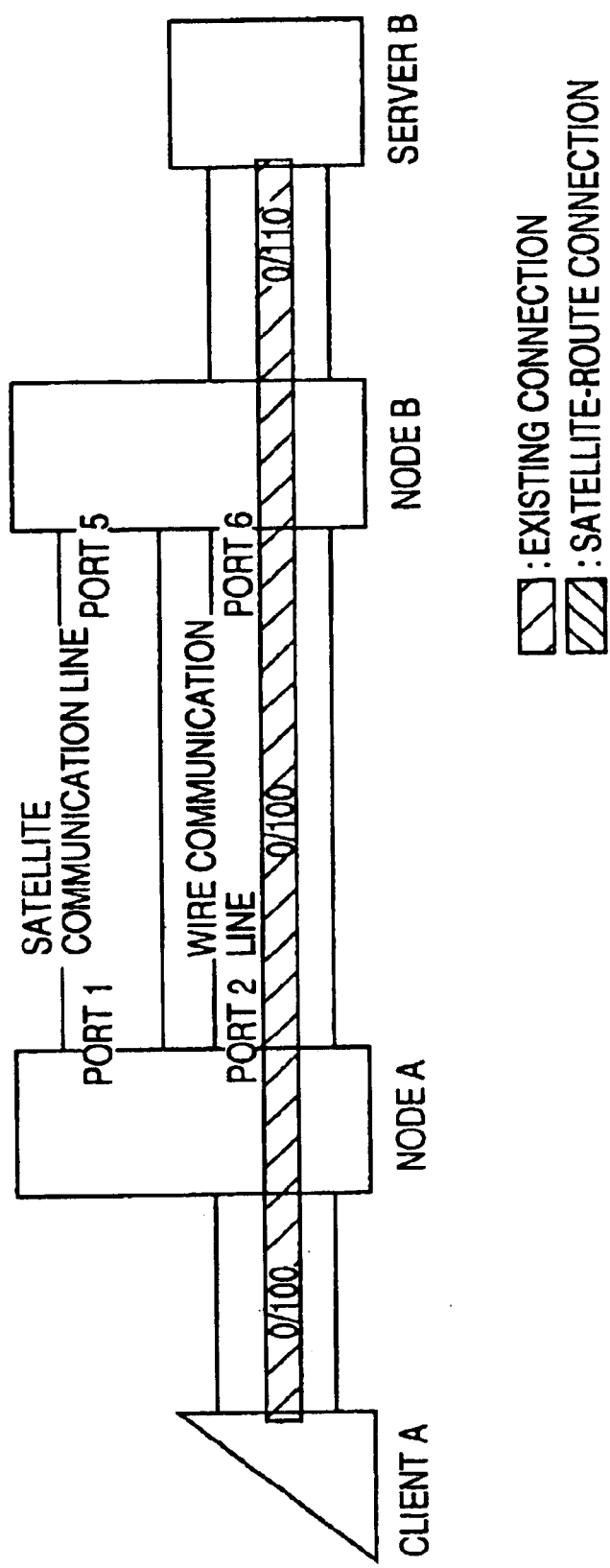
FIG. 66 is an illustrative drawing for explaining release of a satellite-route connection.

FIG. 66 is an illustrative drawing for explaining release of a satellite-route connection.

Upon receipt of the connection-release message with the attached facility via the satellite communication line, the node B releases a relevant connection. Further, the node B erases relevant information from the call-control table. FIG. 67 is an illustrative drawing of the call-control table, from which a relevant entry is removed as shown in the bottom row. After this, the node B sends a release acknowledgement to the node A, and uses a wire connection to send all subsequent data from the server B to the client A.

By the same token, the node A having received the release acknowledgement from the node B uses a wire connection for transmitting all subsequent data from the client A to the server B.

A connection-release-completion message is sent to the client A along with a facility indicative of completion of releasing of a broadband communication line. Since the facility of the connection-release-completion message indicates that it is the broadband communication line which has been released, the client A does not release the existing connection that is an ordinary communication line.

Fourth Embodiment

In the following, a description will be given with regard to how to provide services only to those who are authorized when the services of the above-described embodiments 1–3 are rendered to network users (terminals).

Registration in Node

FIG. 68 is an illustrative drawing showing a broadband-communication-line-service-authorization table. A table such as shown in FIG. 68 is provided in a node that renders services to terminals.

A network vendor receives a request for use of services from a user, and changes the contents of the table so as to indicate that the user can use the services.

For example, when a request for use of services is submitted by a user using a terminal with a DTE address "aaa", the node that stores this terminal changes the broadband-communication-line-service-authorization table thereof such that the authorization field for the DTE address "aaa" newly indicates an authorized status. FIG. 69 is an illustrative drawing showing a broadband-communication-line-service-authorization table after a change is made.

Check as to Whether to Render Service

FIG. 80 is a flowchart of an operation performed by a node when the node checks whether to render services.

1) An authorized user (terminal) sends the node a connection-establishment-request message with an attached facility indicative of use of a broadband communication line as in the first through third embodiments as previously described.

2) Upon receiving the message, the node checks whether a facility indicative of use of a broadband communication line is provided. Also, the node refers to a broadband-communication-line-service-authorization table. If the table indicates an authorized status of the user, the operations of one of the first through third embodiments will be carried out. If the user is not authorized, a connection-establishment-denial message is sent to the transmitter terminal (user).

The first through third embodiments were described with reference to a case in which a satellite line is used as a broadband communication line. The present invention, however, is not limited to use of a satellite communication line, but is applicable to use of a large capacity cable line such as a line using an optical fiber.

Further, the broadband communication line may be replaced by a line with a fast transmission speed, and/or may be a line that is provided separately from ordinary communication lines. For example, it may be a bypass line or a line that is provided between nodes for special dedicated purposes with or without a fee charge.

Although the first through third embodiments have been described with regard to an example in which the client A and the server B are directly connected to the node A and the node B, respectively, the node A and the node B may not be directly connected to the client A and the server B, respectively.

According to the present invention as described above, a communication line (satellite line, wire line, or the like) that is provided separately from an ordinary communication line is used as a bypass line between nodes in a connection-type network (e.g., ATM network). In this connection-type network, contents are delivered via a bypass line that is established only for a certain duration of time in response to a user request. Only those contents which are specified by a user may be delivered by the bypass line with all the other contents being delivered through an ordinary communication line. Such a configuration makes efficient use of the bypass line, and makes it possible for a user to receive contents of a large size without requiring the user to invest in facilities such as a parabola antenna or the like.

Further, the present invention is not limited to these embodiments, but various variations and modifications may be made without departing from the scope of the present invention.

The present application is based on Japanese priority application No. 10-214182 filed on Jul. 29, 1998, with Japanese Patent Office, the entire contents of which are hereby incorporated by reference.

What is claimed is:

1. A method of transferring data in a connection-type network in which nodes are connected via communication lines and terminals are connected to the nodes, said method comprising the steps of:

sending a request from a first one of the terminals to a second one of the terminals via a connection established on a first communication line, the request requesting transfer of data from the second one of the terminals to the first one of the terminals via a second communication line;

deciding by the second one of the terminals whether to use the second communication line for transfer of the data with respect to each element of the data by referring to a table that shows whether to use the second communication line with respect to each element of the data;

establishing a connection on the second communication line between a first one of the nodes having the first one of the terminals attached thereto and a second one of the nodes having the second one of the terminals attached thereto, wherein the second communication line is established on a route separate from a route of the first communication line; and transferring all or part of the data via the connection on the second communication line, wherein the second communication line is established to be in existence for a predetermined duration of time or for a time period during which said all or part of the data is transferred.

2. The method as claimed in claim 1, further comprising a step of establishing a connection for transferring the data between the second one of the nodes and the second one of the terminals.

3. The method as claimed in claim 1, wherein said step of establishing a connection on the second communication line is performed via the second communication line by the first and second ones of the nodes in response to an establishment message for establishing a connection on the second communication line.

4. The method as claimed in claim 3, further comprising a step of using an existing connection between the first one of the nodes and the first one of the terminals for transfer of the data.

5. The method as claimed in claim 3, further comprising a step of sending a completion message indicating completion of establishment of the connection on the second communication line from the first one of the nodes to the second one of the nodes, the completion message originating from the first one of the nodes and being sent therefrom when the first one of the nodes receives the establishment message, the first one of the nodes refraining from sending the establishment message to the first one of the terminals.

6. The method as claimed in claim 1, further comprising a step, performed by the second one of the terminals, of setting a MID value of an AAL4 of a cell to a value that is not used by existing connections if the cell is that of the data transferred through the second communication line, wherein the connection-type network comprises an ATM network.

7. The method as claimed in claim 1, further comprising a step, performed by the second one of the terminals, of attaching an indication to the data to indicate use of the second communication line before sending the data to the second one of the nodes.

8. The method as claimed in claim 7, wherein the connection-type network comprises an ATM network, and the indication includes an MID value of an AAL4 that is set to a specific value with respect to cells of the data.

9. A terminal used in a connection-type network in which nodes are connected via communication lines and terminals are connected to the nodes, said terminal comprising:
a CPU;
a memory storing a program therein for controlling said CPU; and
an input/output unit, wherein said program comprises:
means for receiving a request from another terminal via an existing connection on a first communication line, the request requesting transfer of data to said another terminal via a second communication line;
means for deciding whether to use the second communication line for transfer of the data with respect to each element of the data by referring to a table that shows whether to use the second communication line with respect to each element of the data;
means for sending a message to a node connected to said input/output unit in response to the request, the message requesting for establishment of a connection on the second communication line between the node and one of the nodes connected to said another terminal, wherein the second communication line is established on a route separate from a route of the first communication line; and
means for transferring all or part of the data via the connection on the second communication line.

10. The terminal as claimed in claim 9, wherein the connection-type network comprises an ATM network, and said program further comprises means for setting an MID value of an AAL4 of a cell to a value that is not used by existing connections if the cell is that of the data transferred through the second communication line.

11. The terminal as claimed in claim 9, wherein the connection-type network comprises an ATM network, and said program further comprises means foe setting an MID value of an AAL4 of a cell to a specific value in order to indicate that the cell is that of the data transferred through the second communication line.

12. A node used in a connection-type network in which nodes are connected via communication lines and terminals are connected to the nodes, said node comprising:
a CPU;
a memory storing a program therein for controlling said CPU; and
a plurality of ports for providing connections, wherein said program comprises:
means for receiving an establishment message requesting establishment of a connection on second communication line in addition to a connection on a first communication line already in existence between said node and another one of the nodes, wherein the second communication line is established on a route separate from a route of the first communication line; and
means for establishing the connection on the second communication line between said node and said another one of the nodes by using the second communication line;
wherein said memory further includes a table stored therein that shows whether to use the second communication line with respect to each element of data to be transferred, and said program further comprises means for deciding whether to use the second communication line for transfer of the data with respect to each element of the data by referring to said table.

13. The node as claimed in claim 12, wherein said program further comprises means for using an existing connection between said node and a terminal connected thereto for transfer of data that is received via the connection on the second communication line.

14. The node as claimed in claim 13, wherein said program further comprises means for sending a completion message indicating completion of establishment of the connection on the second communication line to said another one of the nodes when said node receives the establishment message, said program refraining from sending the establishment message to the terminal.

15. The node as claimed in claim 12, wherein said program further comprises:
means for receiving data from a terminal connected to said nodes;
means for checking if the data has an indication attached thereto for indicating use of the second communication line; and
means for transferring the data via the second communication line only if the data has the indication indicating use of the second communication line.

16. The node as claimed in claim 12, wherein said program further comprises:
means for receiving data from a terminal connected to said nodes;
means for checking if the data has an MID value of AAL4 that is set to a specific value; and
means for transferring the data via the second communication line only if the data has the MID value of AAL4 that is the specific value.

* * * * *